(12) United States Patent
Kurashige et al.

(10) Patent No.: US 10,523,902 B2
(45) Date of Patent: *Dec. 31, 2019

(54) SCANNER DEVICE AND DEVICE FOR MEASURING THREE-DIMENSIONAL SHAPE OF OBJECT

(71) Applicant: DAI NIPPON PRINTING CO., LTD., Tokyo (JP)

(72) Inventors: Makio Kurashige, Tokyo (JP); Kazutoshi Ishida, Tokyo (JP); Tomoe Takanokura, Tokyo (JP); Yasuyuki Oyagi, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/021,969

(22) Filed: Jun. 28, 2018

(65) Prior Publication Data

US 2018/0309961 A1  Oct. 25, 2018

Related U.S. Application Data

(62) Division of application No. 14/799,038, filed on Jul. 14, 2015, which is a division of application No.
(Continued)

(51) Int. Cl.
*G01B 11/24* (2006.01)
*G01B 11/25* (2006.01)
(Continued)

(52) U.S. Cl.
CPC .............. *H04N 7/18* (2013.01); *G01B 11/24* (2013.01); *G01B 11/25* (2013.01);
(Continued)

(58) Field of Classification Search
CPC .. G01B 11/24; G01B 11/2522; G01B 11/2518
(Continued)

(56) References Cited

U.S. PATENT DOCUMENTS 4,299,437 A * 11/1981 Ono ............................... 359/17
4,416,505 A * 11/1983 Dickson ........................ 359/12
(Continued)

FOREIGN PATENT DOCUMENTS

CN   101203802 A   6/2008
CN   101233443 A   7/2008
(Continued)

OTHER PUBLICATIONS

European Search Report dated Jun. 13, 2018 for Application No. EP 16 178 008.5.
(Continued)

*Primary Examiner* — Jeremiah C Hallenbeck-Huber
(74) *Attorney, Agent, or Firm* — Ladas & Parry LLP

(57) ABSTRACT

A laser beam (L50) is reflected by a light beam scanning device (60) and irradiated onto a hologram recording medium (45). On the hologram recording medium (45), an image (35) of a linear scatter body is recorded as a hologram by using reference light that converges on a scanning origin (B). The light beam scanning device (60) bends the laser beam (L50) at the scanning origin (B) and irradiates the laser beam onto the hologram recording medium (45). At this time, by changing a bending mode of the laser beam with time, an irradiation position of the bent laser beam (L60) on the hologram recording medium (45) is changed with time. Diffracted light (L45) from the hologram recording medium (45) produces a reproduction image (35) of the linear scatter body on a light receiving surface (R) of the stage 210. When an object is placed on the light receiving surface (R), a line pattern is projected by hologram reproduction light, so that
(Continued)

the projected image is captured and a three-dimensional shape of the object is measured.

10 Claims, 22 Drawing Sheets

Related U.S. Application Data

13/702,027, filed as application No. PCT/JP2010/065690 on Sep. 7, 2010, now Pat. No. 9,116,504.

(51) Int. Cl.
| | |
|---|---|
| H04N 7/18 | (2006.01) |
| G03H 1/00 | (2006.01) |
| G03H 1/22 | (2006.01) |
| G03H 1/32 | (2006.01) |
| G03H 1/04 | (2006.01) |
| G02B 27/48 | (2006.01) |

(52) U.S. Cl.
CPC .......... *G01B 11/2518* (2013.01); *G02B 27/48* (2013.01); *G03H 1/0005* (2013.01); *G03H 1/0443* (2013.01); *G03H 1/2286* (2013.01); *G03H 1/32* (2013.01); *G03H 2001/0033* (2013.01); *G03H 2001/0413* (2013.01); *G03H 2001/0415* (2013.01); *G03H 2001/0439* (2013.01); *G03H 2001/2231* (2013.01); *G03H 2001/2234* (2013.01); *G03H 2001/2255* (2013.01); *G03H 2001/2292* (2013.01); *G03H 2210/11* (2013.01); *G03H 2210/20* (2013.01); *G03H 2222/36* (2013.01); *G03H 2222/42* (2013.01); *G03H 2222/54* (2013.01); *G03H 2222/56* (2013.01); *G03H 2223/14* (2013.01)

(58) Field of Classification Search
USPC .............................................. 348/135; 359/1
See application file for complete search history.

(56) References Cited

U.S. PATENT DOCUMENTS

| | | | |
|---|---|---|---|
| 4,790,612 A * | 12/1988 | Dickson .......................... 359/12 |
| 4,979,815 A | 12/1990 | Tsikos |
| 5,155,371 A | 10/1992 | Burggraf et al. |
| 5,659,408 A | 8/1997 | Wenyon |
| 5,668,631 A | 9/1997 | Norita et al. |
| 5,737,084 A | 4/1998 | Ishihara |
| 5,946,100 A | 8/1999 | Ishihara |
| 6,108,090 A | 8/2000 | Ishihara |
| 6,250,778 B1 | 6/2001 | Doumuki |
| 6,373,978 B1 | 4/2002 | Ishihara |
| 7,515,319 B2 | 4/2009 | Adibi et al. |
| 8,007,133 B2 | 8/2011 | Yamauchi et al. |
| 8,016,428 B2 | 9/2011 | Kasazumi et al. |
| 8,025,410 B2 | 9/2011 | Chen |
| 8,192,030 B2 | 6/2012 | Mizushima et al. |
| 8,350,789 B2 | 1/2013 | Furuya et al. |
| 8,727,543 B2 | 5/2014 | Kurashige et al. |
| 8,848,267 B2 | 9/2014 | Kurashige |
| 9,341,760 B2 | 5/2016 | Kurashige |
| 9,348,149 B2 | 5/2016 | Kurashige et al. |
| 9,423,546 B2 | 8/2016 | Kurashige |
| 2002/0001109 A1 | 1/2002 | Hamano et al. |
| 2002/0039187 A1 | 4/2002 | Keranen |
| 2002/0141065 A1 | 10/2002 | Cowan et al. |
| 2003/0052252 A1 | 3/2003 | Sugiyama et al. |
| 2004/0150837 A1* | 8/2004 | Sugiyama .................... 356/603 |
| 2005/0030489 A1 | 2/2005 | Togino |
| 2005/0173618 A1 | 8/2005 | Sugiyama et al. |
| 2005/0174612 A1 | 8/2005 | Sugiyama et al. |
| 2005/0189417 A1* | 9/2005 | Dickson et al. ............. 235/454 |
| 2005/0275919 A1 | 12/2005 | Tanaka et al. |
| 2006/0255243 A1 | 11/2006 | Kobayashi et al. |
| 2007/0019067 A1 | 1/2007 | Tsubaki et al. |
| 2007/0058143 A1 | 3/2007 | Penn et al. |
| 2007/0085978 A1 | 4/2007 | Yamauchi |
| 2007/0147065 A1 | 6/2007 | Nagata |
| 2007/0183011 A1 | 8/2007 | Yamauchi et al. |
| 2007/0273848 A1 | 11/2007 | Fan et al. |
| 2008/0186512 A1 | 8/2008 | Kee et al. |
| 2008/0247022 A1 | 10/2008 | Yamauchi et al. |
| 2008/0247167 A1 | 10/2008 | Matsubara et al. |
| 2008/0252863 A1 | 10/2008 | Kojima et al. |
| 2008/0284920 A1 | 11/2008 | Facius et al. |
| 2008/0297731 A1 | 12/2008 | Powell et al. |
| 2009/0021801 A1 | 1/2009 | Ishihara |
| 2009/0040467 A1 | 2/2009 | Yamauchi et al. |
| 2009/0168134 A1 | 7/2009 | Nojima |
| 2009/0168424 A1 | 7/2009 | Yamauchi et al. |
| 2010/0020291 A1 | 1/2010 | Kasazumi et al. |
| 2010/0053565 A1 | 3/2010 | Mizushima et al. |
| 2010/0110524 A1 | 5/2010 | Gollier |
| 2010/0165307 A1 | 7/2010 | Mizushima et al. |
| 2011/0002019 A1 | 1/2011 | Routley et al. |
| 2011/0043876 A1 | 2/2011 | Kurashige et al. |
| 2013/0088763 A1 | 4/2013 | Kurashige |
| 2014/0177018 A1 | 6/2014 | Kurashige et al. |
| 2014/0347715 A1 | 11/2014 | Kurashige |
| 2014/0347858 A1 | 11/2014 | Kurashige |
| 2016/0327907 A1 | 11/2016 | Kurashige |

FOREIGN PATENT DOCUMENTS

| | | |
|---|---|---|
| CN | 101276062 A | 10/2008 |
| CN | 101363967 A | 2/2009 |
| EP | 0 589 179 A1 | 3/1994 |
| EP | 1 976 303 A1 | 10/2008 |
| EP | 2 128 694 A1 | 12/2009 |
| GB | 2 456 170 A | 7/2009 |
| JP | 61-50003 A | 3/1986 |
| JP | 61 260108 A | 11/1986 |
| JP | H5-346508 A | 12/1993 |
| JP | 6-202575 A | 7/1994 |
| JP | 6-208089 A | 7/1994 |
| JP | 6-2080890 A | 7/1994 |
| JP | 7-77924 A | 3/1995 |
| JP | 7-091927 A | 4/1995 |
| JP | 7-091930 A | 4/1995 |
| JP | 7-261648 A | 10/1995 |
| JP | 9-222513 A | 8/1997 |
| JP | 9 257440 A | 10/1997 |
| JP | 11-174377 A | 7/1999 |
| JP | 2000-19641 A | 1/2000 |
| JP | 2000-259069 A | 9/2000 |
| JP | 2001-012942 A | 1/2001 |
| JP | 2001-255125 A | 9/2001 |
| JP | 2002-165231 A | 6/2002 |
| JP | 2003-15079 A | 1/2003 |
| JP | 2003-050112 A | 2/2003 |
| JP | 2004-38012 A | 4/2004 |
| JP | 2004-144936 A | 5/2004 |
| JP | 2004 233177 A | 8/2004 |
| JP | 2004-264512 A | 9/2004 |
| JP | 2005-62012 A | 3/2005 |
| JP | 2005-62251 A | 3/2005 |
| JP | 2005-62312 A | 3/2005 |
| JP | 2005 172622 A | 6/2005 |
| JP | 2006-53495 A | 2/2006 |
| JP | 2006 333493 A | 12/2006 |
| JP | 2007-41504 A | 2/2007 |
| JP | 2008-256824 A | 10/2008 |
| JP | 2008-262029 A | 10/2008 |
| JP | 2009-42372 A | 2/2009 |
| JP | 2009-163901 A | 7/2009 |
| JP | 2009-169012 A | 7/2009 |
| JP | 2009-186647 A | 8/2009 |
| JP | 2009-294249 A | 12/2009 |
| JP | 2010-014505 A | 1/2010 |
| JP | 2011-35899 A | 2/2011 |
| JP | 2011-43603 A | 3/2011 |
| JP | 2011-508911 A | 3/2011 |

(56) References Cited

FOREIGN PATENT DOCUMENTS

| JP | 4816819 B1 | 11/2011 |
| JP | 4894966 B1 | 3/2012 |
| WO | 2006/137326 A1 | 12/2006 |
| WO | 2008/114502 A1 | 9/2008 |
| WO | 2010/048960 A1 | 5/2010 |
| WO | 2012/032670 A1 | 3/2012 |

OTHER PUBLICATIONS

Korean Office Action dated Jun. 30, 2018 for Application No. KR 10-2016-7017014 with English translation.
Chinese Office Action dated Jul. 26, 2018 for Chinese Patent Application No. 2017 1015 46505 with English translation.
European Search Report dated Aug. 8, 2018 for Application No. EP 18 182 384.0.
Speckle Phenomena in Optics; Joseph W. Goodman; Includes bibliographical references and index; ISBN 0-9747077-9-1; 2006.
International Preliminary Report on Patentability dated Apr. 9, 2013 for Application No. PCT/JP2010/065690.
International Search Report dated Nov. 2, 2010 for Application No. PCT/JP2010/065691.
International Preliminary Report on Patentability dated Apr. 9, 2013 for Application No. PCT/JP2010/065691.
International Search Report dated Dec. 14, 2010 for Application No. PCT/JP2010/065692.
International Preliminary Report on Patentability dated Apr. 18, 2013 for Application No. PCT/JP2010/065692.
Espacenet English abstract of JP 2009-163901 A dated Jul. 2009.
Espacenet English abstract of WO 2008/114502 A1 dated Sep. 2008.
Patent Abstracts of Japan English abstract of JP 2008-262029 A dated Oct. 2008.
Patent Abstracts of Japan English abstract of JP 2004-264512 A dated Sep. 2004.
Patent Abstracts of Japan English abstract of JP 6-208089 A dated Jul. 1994.
Patent Abstracts of Japan English abstract of JP 2004-144936 A dated May 2004.
Espacenet English abstract of WO 2006/137326 A1 dated Dec. 2006.
Espacenet English abstract of CN 101203802 A dated Jun. 2008.
Patent Abstracts of Japan English abstract of JP 2000-19641 A dated Jan. 2000.
Espacenet English abstract of JP 2009-42372 A dated Feb. 2009.
Espacenet English abstract of CN 101363967 A dated Feb. 2009.
Espacenet English abstract of JP 2005-62312 A dated Mar. 2005.
Chinese Office Action (Notification of Filing Divisional Application) dated Dec. 23, 2013 for Chinese Patent Application No. 201080069008.3 with English translation.
Chinese Office Action (Notification of First Office Action) dated Jan. 14, 2014 for Chinese Patent Application No. 201080069001.1 with English translation.
Supplementary European Search Report dated Feb. 5, 2014 for EP Application No. 10857011.-1904.
Supplementary European Search Report dated Feb. 28, 2014 for EP Application No. 10857012.8-1560.
Japanese Office Action (Reasons of Rejection) dated May 27, 2014 in connection with counterpart Japanese Patent Application No. 2011-025648 with English translation.
Japanese Office Action (Reasons of Rejection) dated Jul. 8, 2014 in connection with counterpart Japanese Application No. 2011-502184 with English translation.
Espacenet English abstract of JP 2009-186647 A.
Japanese Office Action (Reasons of Rejection) dated Aug. 5, 2014 in connection with counterpart Japanese Patent Application No. 2011-029426 with English translation.
Supplementary European Search Report dated Sep. 12, 2014 in connection with counterpart European Application No. 10857013.
Espacenet English abstract of JP 2009-169012 A.
Espacenet English abstract of JP 7-77924 A.
Espacenet English abstract of JP 2002-165231 A.
Espacenet English abstract of JP 2004-38012 A.
Espacenet English abstract of JP 2005-62012 A.
Espacenet English abstract of JP 2006-53495 A.
Espacenet English abstract of JP 2012058718 A.
Espacenet English abstract of JP 2012058712 A.
English translation of Japanese Office Action (Reasons of Rejection) dated Nov. 11, 2014 in connection with counterpart Japanese Application No. 2011-502184.
Office Action dated Dec. 4, 2014 for counterpart U.S. Appl. No. 14/190,671.
Espacenet English abstract of JP 2000-19641 A.
Office Action dated Jan. 2, 2015 for U.S. Appl. No. 14/455,383.
Office Action dated Jan. 2, 2015 for U.S. Appl. No. 14/455,434.
Japanese Office Action (Reasons of Rejection) dated Mar. 24, 2015 in connection with related Japanese Patent Application No. 2011-029426 with English translation.
Chinese Office Action dated Jan. 23, 2015 in connection Chinese Application No. 201080069008.3 with English translation.
European Office Action dated Feb. 24, 2015 for EP Application No. 10 857 012.8-1560.
European Office Action dated Mar. 23, 2015 for EP Application No. 10 857 011.0-1904.
Japanese Office Action dated Jan. 27, 2015 for Japanese Application No. 2011-084314 with English translation.
Espacenet English abstract of JP 11-174377 A.
Espacenet English abstract of JP 2003-15079 A.
Espacenet English abstract of JP 2005-62251 A.
Espacenet English abstract of JP 2007-41504 A.
Espacenet English abstract of JP 2011-43603 A.
Chinese Office Action dated Apr. 21, 2015 for Chinese Application No. 201080069008.3 with English translation.
Chinese Office Action dated Apr. 28, 2015 for Chinese Application No. 201410573547.0 with English translation.
U.S. Office Action dated May 29, 2015 for corresponding U.S. Appl. No. 14/455,383.
Espacenet English abstract of CN 101276062 A.
Espacenet English abstract of CN 101233443 A.
F. Yu and E. Wang, "Speckle Reduction in Holography by Means of Random Spatial Sampling," Appl. Opt. 12, 1656-1659 (1973.
A. Tai and F. Yu, "Holographic speckle reduction by complementary spatial sampling," Appl. Opt. 16, 1371-1375 (1977).
Chinese Office Action dated Dec. 3, 2015 for Chinese Application No. 201410573547.0 with English translation.
Japanese Office Action dated Mar. 8, 2016 for Japanese Application No. 2015-086762 with English translation.
J-PlatPat English abstract of JP 2008-256824 A.
J-PlatPat English translation of JP 2008-256824 A.
J-PlatPat English abstract of JP 2009-294249 A.
J-PlatPat English translation of JP 2009-294249 A.
EP Office Action dated Jul. 25, 2016 for Application No. EP 16166688.8, with English translation.
Japanese Office Action (Reason of Rejection) dated Jul. 26, 2016 for Japanese Application No. 2015-177392, with English translation.
Japanese Office Action (Reason of Rejection) dated Aug. 30, 2016 for Japanese Application No. 2015-231842, with English translation.
English translation of JP 2005-62251 A.
English translation of JP 6-202575 A.
English translation of JP 2002-165231 A.
English translation of JP 9-222513 A.
English translation of JP 2009-169012 A.
English translation of JP 7-261648 A.
English translation of JP 2000-259069 A.
English translation of JP 2003-15079 A.
English translation of JP 2011-35899 A.
Espacenet English abstract of JP 2009-163901 A.
European Search Report dated Oct. 6, 2016 for Application No. EP 16 17 8008.
European Search Report dated Oct. 6, 2016 for Application No. EP 16 17 9984.

(56) References Cited

OTHER PUBLICATIONS

Japanese Office Action (Reason of Rejection) dated Oct. 25, 2016 for Japanese Application No. 2015-086762 with English translation.
Chinese Office Action (Reason of Rejection) dated Nov. 1, 2016 for Chinese Application No. 201511017518.7 with English translation.
English abstract of JP H5-346508 A.
Office Action dated Dec. 30, 2016 for U.S. Appl. No. 15/093,371.
Japanese Office Action dated Mar. 7, 2017 for Japanese Application No. 2015-177392 with English translation.
Chinese Office Action dated Aug. 1, 2017 mailed in connection with corresponding Chinese Patent Application No. 201510441015.6, with English translation.
European Search Report (ESR) dated Aug. 1, 2019 for Application No. EP 19184364.8.
Korean Office Action with an English translation dated Oct. 3, 2019 for Application No. KR 10-2019-7016145.

\* cited by examiner

| MEASUREMENT EXAMPLES | MEASURING SYSTEMS | SPECKLE CONTRASTS |
|---|---|---|
| 1 | LASER PARALLEL LIGHT | 20.1 |
| 2 | THE PRESENT INVENTION (VOLUME HOLOGRAM) | 3.0 |
| 3 | THE PRESENT INVENTION (SURFACE RELIEF CGH) | 3.7 |
| 4 | MONOCHROMATIC LED | 4.0 |

SCANNER DEVICE AND DEVICE FOR MEASURING THREE-DIMENSIONAL SHAPE OF OBJECT

RELATED APPLICATION

This application is a divisional of application Ser. No. 14/799,038 filed on Jul. 14, 2015, which is a divisional of application Ser. No. 13/702,027 filed on Dec. 4, 2012, which is an application under 35 U.S.C. 371 of International Application No. PCT/JP2010/065690 filed on Sep. 7, 2010, the entire contents of each of which are incorporated herein by reference.

TECHNICAL FIELD

The present invention relates to a scanner apparatus that projects a line pattern of light onto an object to scan it. The present invention also relates to an apparatus for measuring a three-dimensional shape of an object by projecting a line pattern of light onto the object and obtaining a image of the projected pattern to create three-dimensional shape data by analyzing the obtained image.

BACKGROUND ART

An apparatus that measures a three-dimensional shape of an object is generally called a three-dimensional scanner, and apparatuses based on various principles are known. For example, Japanese Unexamined Patent Publication No. 2001-12942 discloses a three-dimensional scanner that carries out shape measurement by detecting a state of contact between an object to be measured and a contact probe by a sensor and measuring three-dimensional positions of the object surface. Further, Japanese Unexamined Patent Publication No. H07-91930 discloses a three-dimensional scanner that carries out shape measurement by irradiating a light beam onto the respective portions of an object from a light source and measuring distances from the light source to the respective portions based on intensities of reflected lights.

On the other hand, a method for obtaining a three-dimensional shape by means of an arithmetic operation by analyzing two-dimensional images of an object imaged with CCD cameras, etc., has also been proposed. For example, Japanese Unexamined Patent Publication No. H07-91927 discloses an apparatus for measuring a three-dimensional shape by means of analysis using stereography by imaging a state of projection of pattern light onto an object from different directions with two cameras. In particular, it is generally called a light section method to measure a three-dimensional shape of an object by imaging a state of projection of a line pattern of light onto the object and analyzing obtained two-dimensional images.

Recently, the image analysis technology using a computer has been improved, so that the apparatus for shape measurement using the light section method has also been put into practical use as an apparatus to be mass-produced on a commercial basis, and is variously devised. For example, Japanese Unexamined Patent Publication No. 2001-255125 discloses a three-dimensional shape measuring apparatus in which a slit projector is disposed around an object to project a line pattern of light transmitted through a slit, and Japanese Unexamined Patent Publication No. 2010-14505 discloses a three-dimensional shape measuring apparatus capable of improving measurement accuracy by devising the arrangement of a projector and an imaging device. Further, Japanese Unexamined Patent Publication No. 2003-50112 discloses an apparatus for carrying out three-dimensional shape measurement by projecting a line pattern consisting of stripes including a large number of lines onto an object and analyzing the stripes on the image of the line pattern.

When a three-dimensional shape is thus measured by projecting a line pattern consisting of one or a plurality of lines onto an object and analyzing an image of the line pattern, it is required to project a line pattern with accuracy as high as possible. Conventionally, a line pattern is formed by condensing light by using an optical system such as a lens, or a line pattern is formed by transmitting light from a light source through a slit, however, the accuracy of the formed line pattern is not always sufficient. For example, when a method for shaping by a slit is adopted, the structure is simple, but reflection and diffraction occur on the slit inner surfaces so that the contour of the line pattern easily becomes unclear.

Further, it is desirable that a line pattern to be formed on an object surface is a pattern with brightness as high as possible in order to extract the line pattern on an image. Therefore, a high brightness discharge lamp such as a high pressure mercury lamp must be used as a light source, however, such a special light source has a comparatively short service life, and must be frequently replaced.

An ideal light source that can solve this problem is a coherent light source such as a laser light source. For example, a semiconductor laser that has been widely industrially utilized is capable of carrying out illumination with high brightness while its service life is extremely long as compared with a high brightness discharge lamp such as a high pressure mercury lamp. The semiconductor laser is also excellent in directionality, so that even without shaping by an optical system or a slit, a line pattern having a clear contour can be projected.

However, illumination using a coherent light source such as a laser poses a new problem of occurrence of speckles. Speckles form a spot-like pattern that appears when coherent light such as laser light is irradiated onto a diffusing surface, and are observed as spot-like unevenness in brightness when laser light is projected onto an object surface. Therefore, when a line pattern is projected onto an object by using a laser light source, speckles occur on the line pattern on the object surface, and brightness unevenness occurs.

For example, when one point on a screen is indicated with a laser pointer, a spot of the laser light appears as a bright glare on the screen. This is caused by the occurrence of speckle noise on the screen. It is considered that the reason why speckles are caused when coherent light is used is that coherent lights reflected by portions of the diffusing and reflecting surface of a screen, etc., interfere with each other due to extremely high coherency. For example, a detailed theoretical consideration on occurrence of speckles is described in "Speckle Phenomena in Optics, Joseph W. Goodman, Roberts & Co., 2006."

In use as a laser pointer or the like, only a small spot is seen by an observer, so that a severe problem does not occur. However, if a line pattern used for measuring a three-dimensional shape includes brightness unevenness based on such speckles, a contour shape of the line pattern on an image cannot be accurately extracted, and correct shape analysis cannot be carried out.

Of course, several detailed methods for reducing the above-described speckle noise have been proposed. For example, Japanese Unexamined Patent Publication No. H06-208089 discloses a technology for reducing speckles by irradiating laser light onto a scatter plate, utilizing scattered light obtained therefrom for illumination, and rotary driving the scatter plate by a motor. Further, Japanese Unexamined Patent Publication No. 2004-144936 discloses a technology for reducing speckles by irradiating laser light generated by a laser light source onto a scatter plate and utilizing the laser light as illumination, and oscillating this scatter plate. However, to rotate or oscillate the scatter plate, a large-scale mechanical drive mechanism is required, so that the entire apparatus is increased in size and also increased in power consumption.

Therefore, an object of the present invention is to provide a scanner apparatus and an apparatus for measuring a three-dimensional shape of an object, which have a function of projecting a line pattern onto an object by using a coherent light source, and can reduce occurrence of speckles on the surface of the object.

DISCLOSURE OF INVENTION (1) The first feature of the present invention resides in an scanner apparatus that scans an object with a line pattern of light and imports surface information of the object, comprising:

an illumination unit that projects the line pattern of light onto the object;

a pattern scanning mechanism that changes a projection position of the line pattern on the object with time; and an imaging unit that captures an image of the object onto which the line pattern is projected from a predetermined direction, and imports surface information of the object, wherein the illumination unit includes a coherent light source that generates a coherent light beam, a hologram recording medium on which an image of a scatter body having a shape corresponding to the line pattern is recorded, and a light beam scanning device that irradiates the light beam onto the hologram recording medium and scans the light beam so that an irradiation position of the light beam on the hologram recording medium changes with time, wherein an image of the scatter body is recorded as a hologram on the hologram recording medium by using reference light irradiated along an optical path, the coherent light source generates a light beam with a wavelength capable of reproducing the image of the scatter body, the light beam scanning device scans the light beam so that an irradiation direction of the light beam onto the hologram recording medium is along the optical path of the reference light, and the line pattern is projected by reproduction light of a hologram obtained from the hologram recording medium.

(2) The second feature of the present invention resides in the scanner apparatus having the first feature, wherein an image of one or a plurality of linear scatter bodies parallel to each other is recorded on the hologram recording medium, and a line pattern including one or a plurality of lines parallel to each other is projected by reproduction light of a hologram.

(3) The third feature of the present invention resides in the scanner apparatus having the second feature, wherein the pattern scanning mechanism includes a placing stage for placing an object thereon, and a conveyance device that moves the placing stage in a direction orthogonal to a line constituting the line pattern.

(4) The fourth feature of the present invention resides in the scanner apparatus having the second feature, wherein the pattern scanning mechanism includes a placing stage for placing an object thereon, and a conveyance device that moves the illumination unit in a direction orthogonal to a line constituting the line pattern with respect to the placing stage.

(5) The fifth feature of the present invention resides in the scanner apparatus having the second feature, wherein the pattern scanning mechanism includes an optical system that changes a direction of reproduction light of a hologram obtained from the illumination unit, and scans a line pattern projected by the reproduction light in a direction orthogonal to a line constituting the line pattern.

(6) The sixth feature of the present invention resides in the scanner apparatus having the first feature, wherein the hologram recording medium is divided into a plurality of divided regions, and an image of one or a plurality of linear scatter bodies is recorded in each of the divided regions, line patterns each including one or a plurality of lines are projected by reproduction lights of holograms obtained from the respective divided regions, and a line pattern projected by reproduction light of a hologram obtained from one divided region and a line pattern projected by reproduction light of a hologram obtained from another divided region are formed at spatially different positions.

(7) The seventh feature of the present invention resides in the scanner apparatus having the sixth feature, wherein the light beam scanning device scans a light beam on the divided regions in an order of a first divided region, a second divided region, a third divided region, . . . , so that an i-th line pattern is projected on an i-th position in space when scanning an i-th (i=1, 2, 3 . . . ) divided region, and the light beam scanning device commonly serves as the pattern scanning mechanism.

(8) The eighth feature of the present invention resides in the scanner apparatus having the sixth or seventh feature, wherein the hologram recording medium is divided so that a plurality of horizontally long and narrow divided regions are arranged vertically, and hologram recording is carried out so that longitudinal directions of the respective divided regions and longitudinal directions of reproduction images obtained from the respective divided regions become parallel to each other.

(9) The ninth feature of the present invention resides in the scanner apparatus having any one of the first to eighth features, wherein the light beam scanning device bends the light beam at a scanning origin, irradiates the bent light beam onto the hologram recording medium, and changes an irradiation position of the bent light beam on the hologram recording medium with time by changing a bending mode of the light beam with time, the image of the scatter body is recorded as a hologram on the hologram recording medium by using reference light that converges on a specific convergence point or reference light that diverges from a specific convergence point, and the light beam scanning device scans the light beam by setting the convergence point as the scanning origin.

(10) The tenth feature of the present invention resides in the scanner apparatus having the ninth feature, wherein the image of the scatter body is recorded on the hologram recording medium by using reference light that three-dimensionally converges or diverges along a side surface of a cone whose tip is on the convergence point.

(11) The eleventh feature of the present invention resides in the scanner apparatus having the ninth feature, wherein the image of the scatter body is recorded on the hologram recording medium by using reference light that two-dimensionally converges or diverges along a plane including the convergence point.

(12) The twelfth feature of the present invention resides in the scanner apparatus having any one of the first to eighth features, wherein the light beam scanning device changes the irradiation position of the light beam on the hologram recording medium with time by irradiating the light beam onto the hologram recording medium while moving the light beam parallel, the image of the scatter body is recorded as a hologram on the hologram recording medium by using reference light composed of a parallel light flux, and the light beam scanning device scans the light beam by irradiating the light beam onto the hologram recording medium in a direction parallel to the reference light.

(13) The thirteenth feature of the present invention resides in an object surface information acquisition method for importing surface information of an object by projecting a line pattern of light onto the object, comprising:

a preparation step of creating a hologram recording medium by recording an image of a scatter body for forming a line pattern as a hologram on a recording medium;

a projection step of irradiating a coherent light beam onto the hologram recording medium in a state where the object is disposed at a position to be irradiated with reproduction light of a hologram obtained from the hologram recording medium and scanning the light beam on the hologram recording medium so that an irradiation position changes with time, and projecting the line pattern onto the object; and an imaging step of capturing an image of the object onto which the line pattern is projected from a predetermined direction, and importing surface information of the object, wherein in the preparation step, coherent illumination light is irradiated onto the scatter body so that scattered light obtained from the scatter body is used as object light, coherent light with the same wavelength as that of the illumination light is irradiated onto the recording medium along an optical path so as to be used as reference light, and interference fringes formed by the object light and the reference light are recorded on the recording medium to prepare the hologram recording medium, and in the projection step, a light beam with a wavelength capable of reproducing the image of the scatter body is scanned so as to advance toward an irradiation position on the hologram recording medium by passing through an optical path along the optical path of the reference light.

(14) The fourteenth feature of the present invention resides in a scanner apparatus that scans an object with a line pattern of light and imports surface information of the object, comprising:

an illumination unit that projects the line pattern of light onto the object;

a pattern scanning mechanism that changes a projection position of the line pattern on the object with time; and an imaging unit that captures an image of the object onto which the line pattern is projected from a predetermined direction, and imports surface information of the object, wherein the illumination unit includes a coherent light source that generates a coherent light beam, a microlens array including a collection of a large number of independent lenses, and a light beam scanning device that irradiates the light beam onto the microlens array and scans the light beam so that an irradiation position of the light beam on the microlens array changes with time, wherein each of the independent lenses included in the microlens array has a function of refracting light irradiated from the light beam scanning device and forming a linear irradiation region on a nearby surface near the object, and is configured so that all irradiation regions formed by the independent lenses become substantially the same common region on the nearby surface.

(15) The fifteenth feature of the present invention resides in a scanner apparatus that scans an object with a line pattern of light and imports surface information of the object, comprising:

an illumination unit that projects the line pattern of light onto the object;

a pattern scanning mechanism that changes a projection position of the line pattern on the object with time; and an imaging unit that captures an image of the object onto which the line pattern is projected from a predetermined direction, and imports surface information of the object, wherein the illumination unit includes a coherent light source that generates a coherent light beam, a light beam scanning device that carries out beam scanning by controlling either or both of a direction and a position of the light beam, and an optical diffusing element that diffuses and emits an incident light beam, the light beam scanning device emits the light beam generated by the coherent light source toward the optical diffusing element, and scans the light beam so that an incidence position of the light beam on the light diffusing element changes with time, and the optical diffusing element has a function of forming a linear irradiation region on a nearby surface near the object by diffusing an incident light beam, and is configured so that formed irradiation regions become substantially the same common region on the nearby surface regardless of the incidence position of the light beam.

(16) The sixteenth feature of the present invention resides in an apparatus for measuring a three-dimensional shape of an object, comprising:

an illumination unit that projects a line pattern of light onto the object;

an imaging unit that captures an image of the object onto which the line pattern is projected from a predetermined direction; and a shape analysis unit that creates three-dimensional shape data of the object by analyzing the line pattern on the image captured with the imaging unit, wherein the illumination unit includes a coherent light source that generates a coherent light beam, a hologram recording medium on which an image of a scatter body having a shape corresponding to the line pattern is recorded, and a light beam scanning device that irradiates the light beam onto the hologram recording medium and scans the light beam so that an irradiation position of the light beam on the hologram recording medium changes with time, wherein an image of the scatter body is recorded as a hologram on the hologram recording medium by using reference light irradiated along an optical path, the coherent light source generates a light beam with a wavelength capable of reproducing the image of the scatter body, the light beam scanning device scans the light beam so that an irradiation direction of the light beam onto the hologram recording medium is along the optical path of the reference light, and the line pattern is projected by reproduction light of a hologram obtained from the hologram recording medium.

(17) The seventeenth feature of the present invention resides in the apparatus for measuring a three-dimensional shape of an object having the sixteenth feature, wherein an image of one or a plurality of linear scatter bodies is recorded on the hologram recording medium, and a line pattern including one or a plurality of lines is projected by reproduction light of a hologram.

(18) The eighteenth feature of the present invention resides in the apparatus for measuring a three-dimensional shape of an object having the sixteenth feature, wherein the hologram recording medium is divided into a plurality of divided regions, and an image of one or a plurality of linear scatter bodies is recorded in each of the divided regions, line patterns each including one or a plurality of lines are projected by reproduction lights of holograms obtained from the respective divided regions, and a line pattern projected by reproduction light of a hologram obtained from one divided region and a line pattern projected by reproduction light of a hologram obtained from another divided region are formed at spatially different positions.

(19) The nineteenth feature of the present invention resides in the apparatus for measuring a three-dimensional shape of an object having the eighteenth feature, wherein the light beam scanning device scans a light beam on the divided regions in an order of a first divided region, a second divided region, a third divided region, . . . , so that an i-th line pattern is projected on an i-th position in space when scanning an i-th (i=1, 2, 3 . . . ) divided region to change a projection position of the line pattern on the object with time.

(20) The twentieth feature of the present invention resides in the apparatus for measuring a three-dimensional shape of an object having the eighteenth or nineteenth feature, wherein the hologram recording medium is divided so that a plurality of horizontally long and narrow divided regions are arranged vertically, and hologram recording is carried out so that longitudinal directions of the respective divided regions and longitudinal directions of reproduction images obtained from the respective divided regions become parallel to each other.

(21) The twenty-first feature of the present invention resides in the apparatus for measuring a three-dimensional shape of an object having the sixteenth feature, wherein an image of a horizontal grid-like scatter body including a plurality of linear scatter bodies extending horizontally and arranged vertically parallel to each other is recorded on the hologram recording medium, and a line pattern including a plurality of lines parallel to each other is projected by reproduction light of a hologram.

(22) The twenty-second feature of the present invention resides in the apparatus for measuring a three-dimensional shape of an object having the sixteenth feature, wherein an image of a horizontal grid-like scatter body including a plurality of linear scatter bodies extending horizontally and arranged vertically parallel to each other and an image of a vertical grid-like scatter body including a plurality of linear scatter bodies extending vertically and arranged horizontally parallel to each other are superimposed and recorded on the hologram recording medium, and a reticulated grid-like line pattern is projected by reproduction light of a hologram.

(23) The twenty-third feature of the present invention resides in the apparatus for measuring a three-dimensional shape of an object having the sixteenth feature, wherein an image of a reticulated grid-like scatter body is recorded on the hologram recording medium, and a reticulated grid-like line pattern is projected by reproduction light of a hologram.

(24) The twenty-fourth feature of the present invention resides in the apparatus for measuring a three-dimensional shape of an object having any one of the sixteenth to twenty-third features, wherein a placing stage for placing an object thereon; and a conveyance device that moves one of the illumination unit and the placing stage with respect to the other.

(25) The twenty-fifth feature of the present invention resides in the apparatus for measuring a three-dimensional shape of an object having any one of the sixteenth to twenty-third features, wherein an optical system that changes a direction of reproduction light of a hologram obtained from the illumination unit so that a line pattern projected by the reproduction light is scanned.

(26) The twenty-sixth feature of the present invention resides in the apparatus for measuring a three-dimensional shape of an object having any one of the sixteenth to twenty-fifth features, wherein the imaging unit includes a plurality of cameras that capture an image of an object from different directions, respectively, and the shape analysis unit creates three-dimensional shape data of the object by analyzing line patterns on images captured with the plurality of cameras.

BEST MODE FOR CARRYING OUT THE INVENTION

<<<Section 1. Basic Configuration of Apparatus for Measuring Three-Dimensional Shape According to the Present Invention>>>

The present invention relates to a scanner apparatus using a coherent light source, and an apparatus for measuring a three-dimensional shape of an object by using the scanner apparatus. Therefore, here, a description is given of a basic configuration of the apparatus for measuring a three-dimensional shape according to the present invention.

Figure 1:
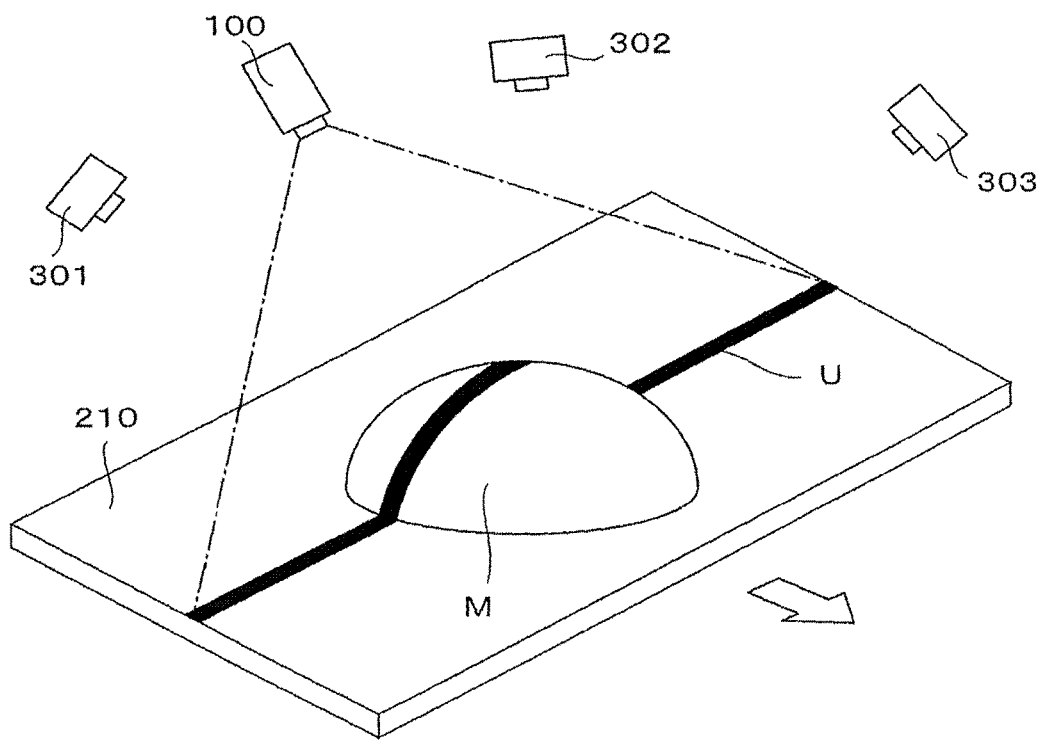
FIG. 1 is a perspective view showing a principle of measurement with an apparatus for measuring a three-dimensional shape of an object according to the present invention.

FIG. 1 is a perspective view showing a principle of measurement by the apparatus for measuring a three-dimensional shape of an object according to the present invention. Here, an example in which a three-dimensional shape of a semispherical object M is measured by using illumination from the illumination unit 100 is illustrated. As illustrated, the object M is placed on the upper surface of a placing stage 210, and when this placing stage 210 is moved in the direction illustrated by a white arrow in the drawing, the object M also moves in the same direction. On the other hand, above the object M, an illumination unit 100 is disposed, and projects a line pattern U onto the object M. This line pattern U is illustrated by a heavy black line for convenience in the drawing, however, in actuality, it is a band-shaped illumination region formed on the placing stage 210.

Above the placing stage 210, three cameras 301, 302, and 303 are disposed so as to image the object M onto which the line pattern U is projected, from different directions. The three cameras 301, 302, and 303 are attached to the placing stage 210, and move along with movement of the placing stage 210. By imaging the object M with the three cameras 301, 302 and 303 while moving the placing stage 210 in predetermined steps in the direction illustrated by a white arrow in the drawing (normally, direction orthogonal to the line pattern U), images of a state of the line pattern U projected onto various positions on the surface of the object M are obtained.

Figure 2:
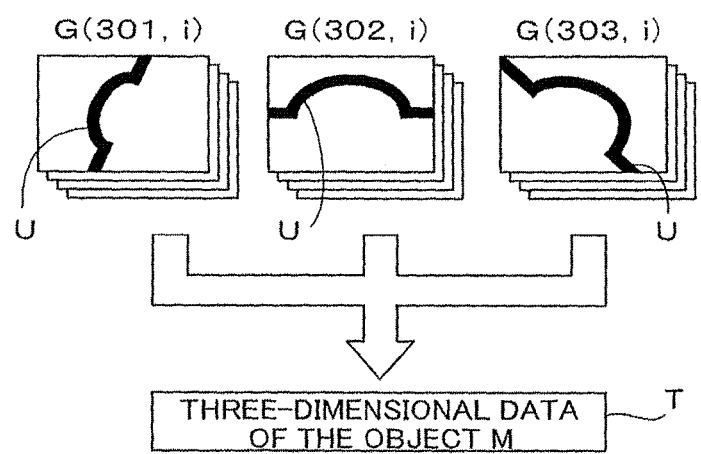
FIG. 2 is a block diagram showing a basic principle of image analysis to be applied to an image captured with the measuring apparatus shown in FIG. 1.

FIG. 2 is a block diagram showing a basic principle of processing for obtaining information on a three-dimensional shape of the object M by analyzing a large number of images thus obtained. The image G (301, i) shown at the left in FIG. 2 is an image captured with the first camera 301, the image G (302, i) shown at the center is an image captured with the second camera 302, and the image G (303, i) shown at the right is an image captured with the third camera 303. Here, i is a parameter that shows the number of steps to be taken for moving the placing stage 210, and for example, an image G (301, i) means an image captured with the first camera 301 at the i-th moving step.

Three captured images at a common number of steps i are images of the same subject (the object M and the line pattern U), however, their imaging directions are different from each other, so that the positions and shapes of the line patterns U appearing on the images are different from each other. Therefore, by analyzing the line patterns U appearing on the captured images while considering geometric arrangement information of the three cameras 301, 302, and 303 with respect to the object M, three-dimensional data T of the object M can be obtained.

Figure 3:
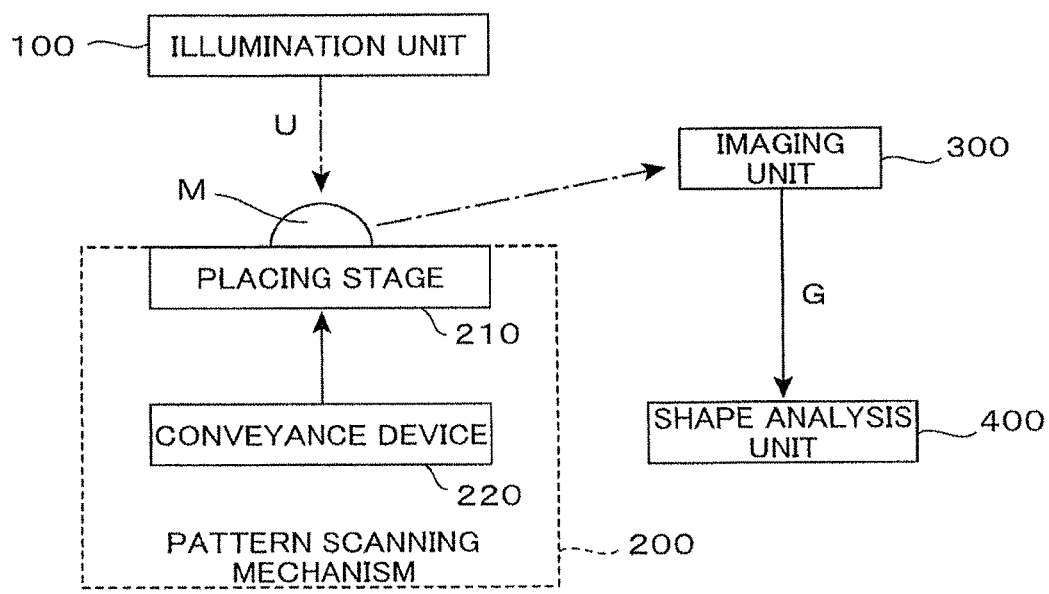
FIG. 3 is a block diagram showing a basic configuration of the apparatus for measuring a three-dimensional shape of an object according to the present invention.

FIG. 3 is a block diagram showing a basic configuration of an apparatus for measuring a three-dimensional shape of an object according to the present invention. As illustrated, this measuring apparatus includes an illumination unit 100, a pattern scanning mechanism 200, an imaging unit 300, and a shape analysis unit 400. The illumination unit 100 performs a function of projecting a line pattern U of light onto the object M as illustrated in FIG. 1.

The pattern scanning mechanism 200 has a function of changing a projection position of the line pattern U on the object M with time, and includes the placing stage 210 and a conveyance device 220 in the case of the illustrated basic embodiment. The placing stage 210 is a structure for placing the object M thereon as shown in FIG. 1, and the conveyance device 220 is a device for moving the placing stage 210 in the direction illustrated by the white arrow in the drawing. This conveyance device 220 can consist of, for example, a belt conveyor or the like. The direction of moving the placing stage 210 may be arbitrary as long as it is not parallel to a line constituting the line pattern U, however, in practical use, for efficient scanning on the object M, the direction is preferably orthogonal to the line constituting the line pattern U. In the embodiment shown in FIG. 1, for enabling movement in such a direction, the position and orientation of the illumination unit 100 are adjusted.

On the other hand, the imaging unit 300 performs a function of capturing an image of the object M onto which the line pattern U is projected from a predetermined direction and importing surface information of the object M. The example shown in FIG. 1 uses three cameras 301, 302, and 303 (CCD cameras, etc.) as the imaging unit 300, however, the number of cameras to be used is not limited to three, and a necessary number of cameras are prepared according to the shape of the object M and necessary contents of three-dimensional shape data, etc. Depending on the circumstances, although one camera may be sufficient, generally, it is preferable to adopt a configuration that a plurality of cameras are prepared to capture an image of the object M from directions different from each other.

The shape analysis unit 400, as shown in FIG. 2, carries out a process of creating three-dimensional shape data T of the object M by analyzing the line patterns U on the images G captured by the imaging unit 300 (three cameras 301 to 303). Specifically, the shape analysis unit 400 has a function of importing the captured images G supplied from the imaging unit 300 as digital data, and carries out an arithmetic operation based on an algorithm by referring to geometric information on the imaging unit 300 (the positions, orientations, and imaging optical conditions of the three cameras 301 to 303) to obtain three-dimensional shape data T of the object M.

In actuality, the shape analysis unit 400 is configured by installing a specific shape analysis program in a computer. As a specific method for such shape analysis, as described above, various algorithms have been known as a light section method (for example, a detailed description is given of the basic principle of three-dimensional shape measurement to a specific laser scanning method in Model-based Analysis and Evaluation of Point Sets from Optical 3D Laser Scanners, Shaker Verlag GmbH, Germany (published on Dec. 17, 2007): ISBN-13: 978-3832267759), and have no direct relationship to the features of the present invention, so that a detailed description of these is omitted here.

Finally, in the measuring apparatus shown in FIG. 3, the portion including the illumination unit 100, the pattern scanning mechanism 200, and the imaging unit 300 serves as a scanner apparatus that imports surface information of an object M by scanning the object M by a line pattern U of light. The measuring apparatus shown in FIG. 3 is an apparatus to which the shape analysis unit 400 that creates three-dimensional shape data T by analyzing surface information of the object M obtained by such a scanner apparatus is further added.

In the case of an apparatus for measuring a three-dimensional shape which does not need to scan a line pattern U, the pattern scanning mechanism 200 can be omitted. For example, if it is enough to measure only a shape of a circumference passing through a tip of a semispherical object M as an object to be measured in FIG. 1, it is sufficient to obtain an image of a state where a line pattern U passing through the tip of the object M is projected as illustrated, so that the pattern scanning mechanism 200 can be omitted without a problem. In the modification described in <5-4> later, the pattern scanning mechanism 200 can also be omitted.

Basic configurations of a scanner apparatus and an apparatus for measuring a three-dimensional shape according to the present invention are described above with reference to FIG. 1 to FIG. 3, however, the essential feature of the present invention is the portion of the illumination unit 100 among these components. The illumination unit 100 is a component for projecting a line pattern U onto the object M. Here, the line pattern U is an element that gives an important index in image analysis in the shape analysis unit 400, so that the line pattern U is preferably a uniform pattern that is as clear as possible and has brightness as high as possible.

Specifically, in image analysis in the shape analysis unit 400, first, a region of the line pattern U must be recognized and extracted from the captured images G shown in FIG. 2. Geometric analysis is applied to line patterns U thus extracted. Therefore, if the line pattern U is unclear or low in brightness, on the captured image G, it becomes difficult to discriminate the region of the line pattern U from the other region, and a correct region cannot be extracted.

Therefore, a conventional apparatus is devised so that a method is adopted in which a line pattern U is formed by condensing light by using an optical system such as a lens or a line pattern U is formed by transmitting light from a light source through a slit, and if necessary, a high brightness light source such as a high pressure mercury lamp is utilized. However, as described above, with this conventional method, a satisfactory line pattern U is not always formed, and the service life of the high brightness light source is comparatively short.

On the other hand, by configuring the illumination unit 100 by using a coherent light source such as a laser light source, the above-described problem can be solved. The coherent light source can generate light with excellent directionality, so that, for example, by scanning a laser beam straight on the placing stage 210, a line pattern U whose contour is very clear can be formed. A coherent light source can generate light with high brightness, so that on the captured image G, the region of the line pattern U can be easily discriminated from the other region. In addition, the coherent light source has excellent monochromaticity, so that by sorting respective pixels by color on the captured image G, only the region of the line pattern U can be extracted. Further, there is an advantage that a coherent light source such as a semiconductor laser has an extremely long service life and can be downsized as compared with a high pressure mercury lamp, etc.

In only this regard, a coherent light source is an ideal light source for an illumination unit to be installed in a scanner apparatus or an apparatus for measuring a three-dimensional shape. However, as described above, illumination using a coherent light source poses a new problem of occurrence of speckles.

In actuality, in the configuration shown in FIG. 1, when a laser light source is installed in the illumination unit 100 and a laser beam is scanned on the placing stage 210 and a line pattern U is projected, glaring speckles appear on the obtained line pattern U. Therefore, when capturing images is carried out by the imaging unit 300 by using such a line pattern U, spot-like unevenness in brightness occurs at a portion of the line pattern U on the captured image, and unless some image processing is applied thereto, it is difficult to accurately extract only the region of the line pattern U.

Of course, as an idea for reducing speckle noise, the publication listed above discloses a method in which a laser light is irradiated onto a scatter plate and the scatter plate is rotated or oscillated, however, this method requires a large-scale mechanical drive mechanism, so that the entire apparatus is increased in size and increased in power consumption as described above.

The inventor of the present invention conceived the idea of unique methods for effectively reducing speckles with some specialized ingenuity while adopting a coherent light source such as a laser light source. The illumination unit 100 according to the present invention has features based on this idea.

Figure 4:
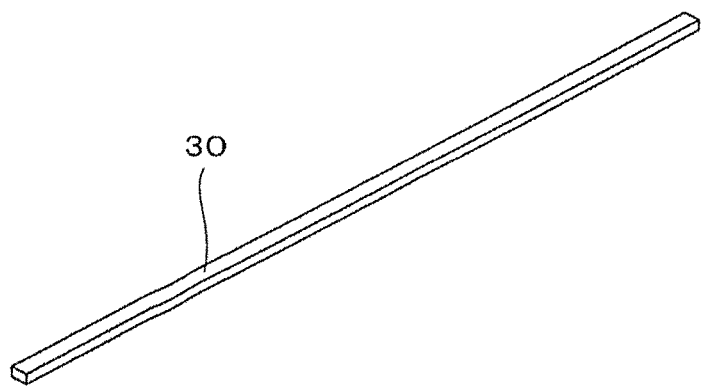
FIG. 4 is a perspective view of a linear scatter body 30 whose image is recorded on a hologram recording medium inside an illumination unit 100 shown in FIG. 3.

A first idea that the inventor of the present invention conceived was to form a line pattern U by means of a hologram reproduction image of a long and narrow scatter body in the configuration shown in FIG. 1. For example, a linear scatter body 30 as shown in FIG. 4 is prepared. This scatter body 30 may be any object as long as it has a property of uniformly scattering incident illumination light by the surface or inside. A hologram is a technique for reproducing a reproduction image of an arbitrary object in an arbitrary space by using coherent light, and is a technique for recording a three-dimensional image of an object on a medium.

Therefore, first, as a preparation step, a linear scatter body 30 as shown in FIG. 4 is prepared, and a three-dimensional image thereof is recorded as a hologram on a recording medium. Then, in the illumination unit 100, the hologram recording medium on which this recording is carried out and components necessary for reproducing the hologram are installed, and in a projection step, a line pattern U is formed by a reproduction image of the linear scatter body 30. For example, if the idea is applied to the scanner apparatus shown in FIG. 1, illumination light irradiated to the lower side of the drawing from the illumination unit 100 is to be reproduction light of the linear scatter body 30 shown in FIG. 4.

Here, by adjusting the forming position of the reproduction image so that the forming position is on the upper surface of the placing stage 210, a line pattern U is formed as a reproduction image of the linear scatter body 30 on the upper surface of the placing stage 210, and the line pattern U projected onto the object M is a pattern produced by reproduction light for forming this reproduction image. The line pattern U thus produced by coherent light has high brightness, excellent monochromaticity, and a clear contour. In addition, the pattern is formed by a reproduction image of the scatter body 30, so that a pattern with entirely uniform brightness is obtained.

However, as coherent light is used to obtain a hologram reproduction image, occurrence of speckles is unavoidable unless some ingenuity is exercised. Therefore, the inventor of the present invention conceived the idea of further devising the method to reduce speckles. As a basic concept of the idea, when reproducing a hologram, a hologram recording medium is scanned by a coherent light beam (illumination light for reproduction) so that a region that contributes to reproduction on the medium changes with time. When a reproduction image is obtained by this method, the direction of reproduction light irradiated from the hologram recording medium changes with time, so that the factor that causes speckles is dispersed temporally, and as a result, an effect of reducing speckle generation is obtained. Hereinafter, a detailed description is given of this devising.

<<<Section 2. Hologram Recording Medium to be Used in the Present Invention>>>

Figure 5:
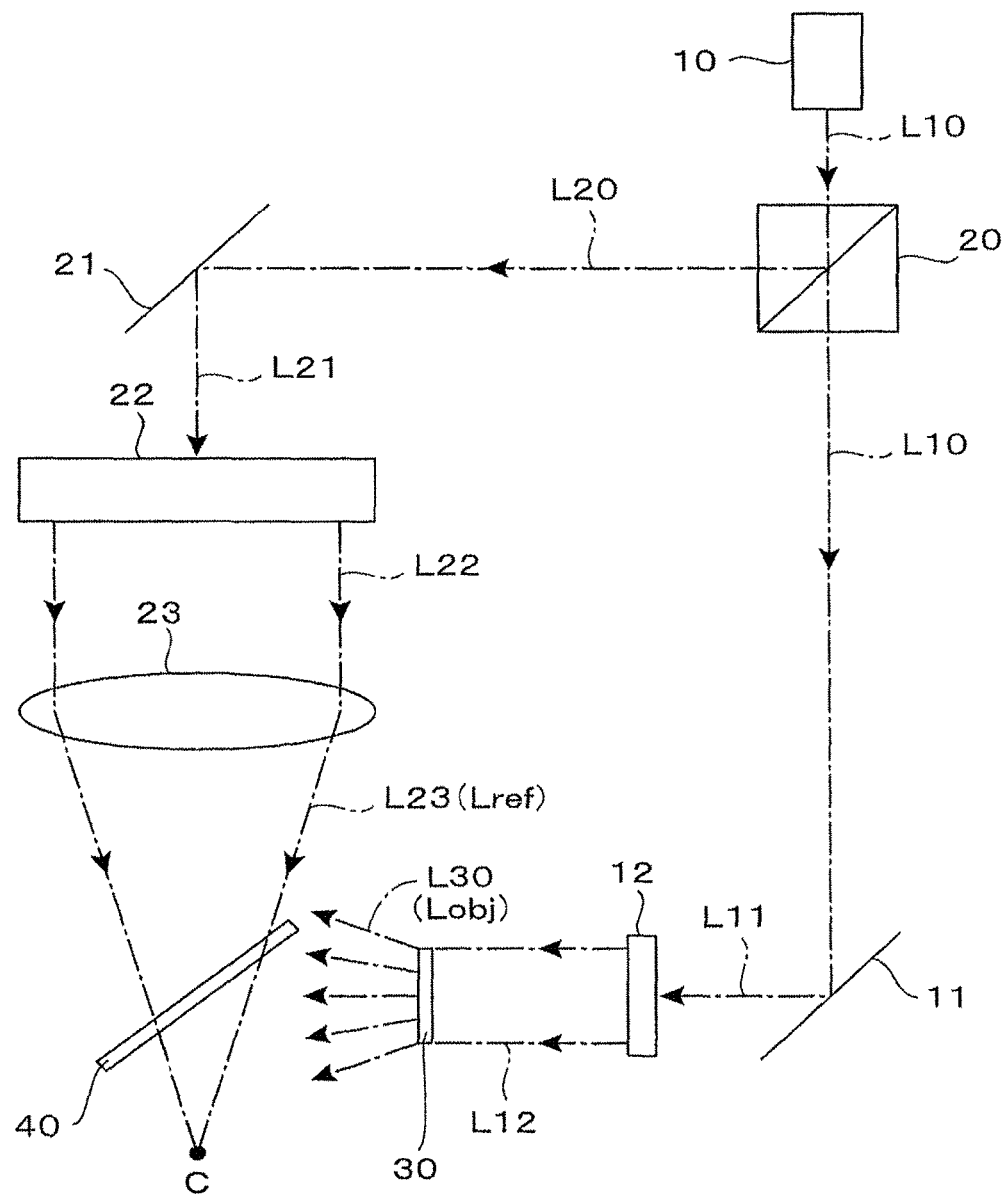
FIG. 5 is an optical system arrangement drawing showing a process of creating a hologram recording medium installed in a scanner apparatus according to the present invention.

First, a description is given of features of a hologram recording medium to be used as a component of the illumination unit 100 to be installed in a scanner apparatus (or an apparatus for measuring a three-dimensional shape of an object) according to the basic embodiment of the present invention. FIG. 5 is an optical system arrangement drawing showing a process of creating this hologram recording medium. By this optical system, a hologram recording medium is created on which an image of a scatter body is recorded.

A coherent light source 10 shown at the upper right in the drawing is a light source that produces a coherent light beam L10, and in actuality, a laser light source that generates monochromatic laser light having a circular section is used. The coherent light beam L10 produced by this laser light source is split into two beams by the beam splitter 20. Specifically, a part of the light beam L10 is directly transmitted through the beam splitter 20 and guided to the lower side of the drawing, and the other part of the light beam is reflected by the beam splitter 20 and guided as a light beam L20 to the left side of the drawing.

The light beam L10 transmitted through the beam splitter 20 serves to generate object light Lobj of a scatter body. Specifically, the light beam L10 that advanced to the lower side of the drawing is reflected by a reflecting mirror 11 to become a light beam L11, and further, expanded in diameter by the beam expander 12 to compose a parallel light flux L12, and irradiated onto the entire region of the right side surface of the scatter body 30.

The scatter body 30 is a long and narrow linear scatter body as shown in the perspective view of FIG. 4. This linear scatter body 30 is shaped corresponding to a line pattern U to be formed on the placing stage 210. In subsequent drawings, for convenience of description, the shape of the linear scatter body 30 shown in FIG. 4 is illustrated by being deformed (the entire length is shortened).

As this scatter body 30, a plate-shaped material having a property of scattering irradiated light, generally called an optical diffuser plate, may be used. In the example shown here, a transmission type scatter body (for example, opal glass plate) into which microparticles (light scatter bodies) for scattering light inside are kneaded is used. Therefore, as illustrated, the parallel light flux L12 irradiated onto the right side surface of the scatter body 30 is transmitted through the scatter body 30 and emitted as scattered light L30 from the left side surface. This scattered light L30 composes object light Lobj of the scatter body 30.

On the other hand, the light beam L20 reflected by the beam splitter 20 performs the role of generating reference light Lref. Specifically, the light beam L20 that advanced to the left side of the drawing from the beam splitter 20 is reflected by the reflecting mirror 21 to become a light beam L21, and further, expanded in diameter by the beam expander 22 to compose a parallel light flux L22, refracted by a convex lens 23 having a focal point on the point C, and then irradiated onto a hologram photosensitive medium 40. Even when the parallel light flux L22 is composed of a collection of parallel light beams not necessarily strictly parallel to each other, there is no problem in practical use, as far as the parallel light flux L22 is composed of a collection of light beams substantially parallel to each other. The hologram photosensitive medium 40 is a photosensitive medium to be used for recording a hologram image. Irradiation light L23 to be irradiated onto the hologram photosensitive medium 40 composes reference light Lref.

Finally, onto the hologram photosensitive medium 40, the object light Lobj of the scatter body 30 and the reference light Lref are irradiated. Here, the object light Lobj and the reference light Lref are coherent lights both having the same wavelength λ produced by the coherent light source 10 (laser light source), so that interference fringes of these lights are recorded on the hologram photosensitive medium 40. In other words, on the hologram photosensitive medium 40, an image of the scatter body 30 is recorded as a hologram.

Figure 6:
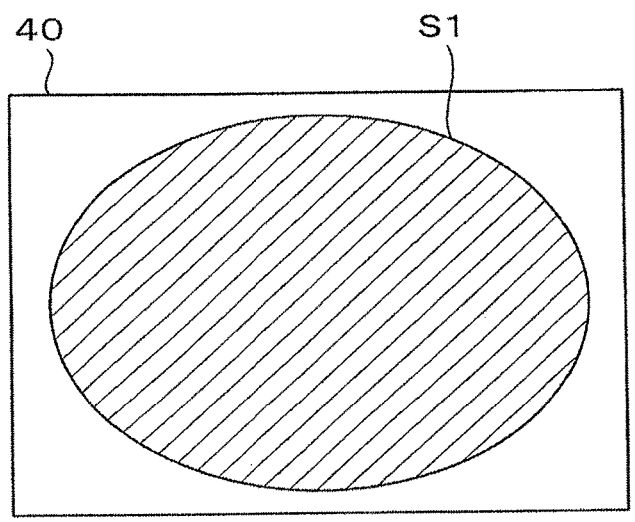
FIG. 6 is a plan view showing a position relationship between a section S1 of reference light L23 and a hologram photosensitive medium 40 in the process shown in FIG. 5.

FIG. 6 is a plan view showing the position relationship between the section S1 of the reference light L23 (Lref) and the hologram photosensitive medium 40 shown in FIG. 5. The parallel light flux L22 expanded in diameter by the beam expander 22 has a circular section, so that the reference light Lref condensed by the convex lens 23 converges in a conical shape whose tip is on the focal point C of the lens. However, in the example shown in FIG. 5, the hologram photosensitive medium 40 is disposed obliquely to the central axis of this cone, so that the section S1 cutting the reference light L23 (Lref) by the surface of the hologram photosensitive medium 40 becomes oval as shown in FIG. 6.

Figure 7:
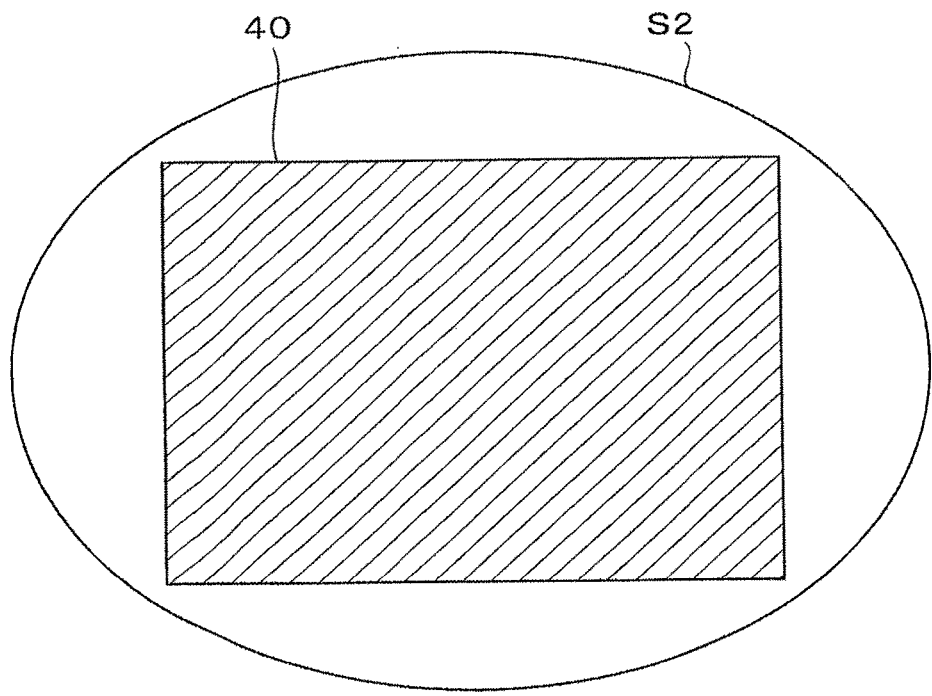
FIG. 7 is a plan view showing a position relationship between another section S2 of the reference light L23 and the hologram photosensitive medium 40 in the process shown in FIG. 5.

Thus, in the example shown in FIG. 6, the reference light Lref is irradiated into only the region hatched in the drawing of the entire region of the hologram photosensitive medium 40, so that the hologram of the scatter body 30 is recorded in only this hatched region. Of course, it is also possible that the whole hologram photosensitive medium 40 is included in the section S2 of the reference light Lref as shown in the example shown in FIG. 7 by producing a parallel light flux L22 with a larger diameter by the beam expander 22 and using a convex lens 23 with a larger diameter. In this case, as shown with hatching in the drawing, the hologram of the scatter body 30 is recorded on the entire surface of the hologram photosensitive medium 40. When creating a hologram recording medium to be used in the present invention, recording can be carried out in either of the modes shown in FIG. 6 and FIG. 7.

Figure 8:
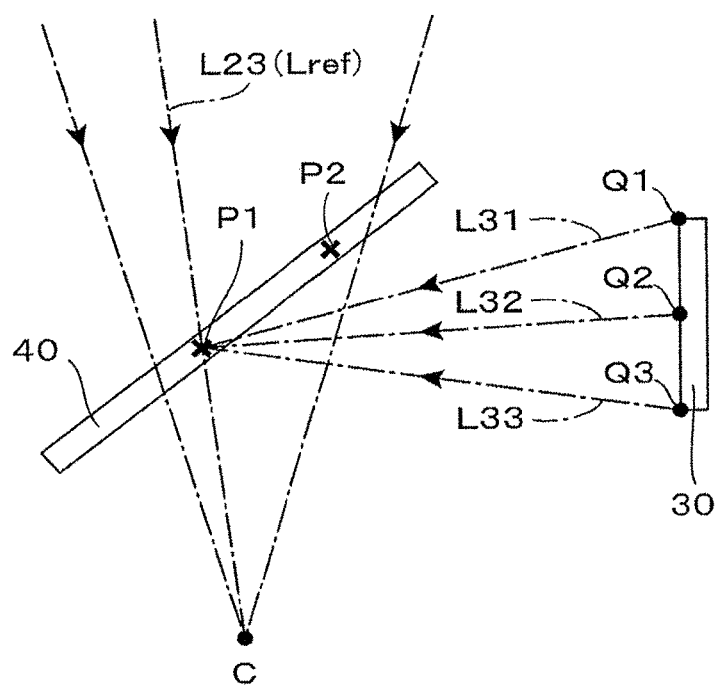
FIG. 8 is a partial enlargement view around a scatter body 30 and the hologram photosensitive medium 40 in the optical system shown in FIG. 5.

Next, a detailed description is given of the optical process of recording the image of the scatter body 30 on the hologram photosensitive medium 40. FIG. 8 is a partial enlargement view around the scatter body 30 and the hologram photosensitive medium 40 in the optical system shown in FIG. 5. As described above, the reference light Lref is obtained by condensing the parallel light flux L22 having a circular section by the convex lens 23 having the focal point C, and the reference light Lref converges in a conical shape whose tip is on the focal point C. Hereinafter, this focal point C is referred to as a convergence, point. As illustrated, the reference light L23 (Lref) irradiated onto the hologram photosensitive medium 40 converges on this convergence point C.

On the other hand, light (object light Lobj) emitted from the scatter body 30 is scattered light, and advances in various directions. For example, as illustrated, assuming an object point Q1 on the upper end of the left side surface of the scatter body 30, scattered light is emitted in all directions from this object point Q1. Similarly, scattered light is also emitted in all directions from arbitrary object points Q2 and Q3. Therefore, focusing attention on an arbitrary point P1 within the hologram photosensitive medium 40, information on interference fringes formed by object lights L31, L32, and L33 from the object points Q1, Q2, and Q3 and the reference light Lref advancing toward the convergence point C is recorded. Of course, in actuality, object points on the scatter body 30 are not only Q1, Q2, and Q3, so that similarly, information from all object points on the scatter body 30 is recorded as information on interference fringes formed by interference with the reference light Lref. In other words, on the illustrated point P1, all information of the scatter body 30 is recorded. In exactly the same manner, all information of the scatter body 30 is also recorded on the illustrated point P2. Thus, all information of the scatter body 30 is recorded on each portion of the hologram photosensitive medium 40. This is the essence of a hologram.

Hereinafter, the hologram photosensitive medium 40 on which information of the scatter body 30 is recorded by the above-described method is referred to as a hologram recording medium 45. To obtain a hologram reproduction image of the scatter body 30 by reproducing the hologram recording medium 45, coherent light with the same wavelength as that of the light used for recording is irradiated as illumination light for reproduction from a direction corresponding to the reference light Lref used for recording.

Figure 9:
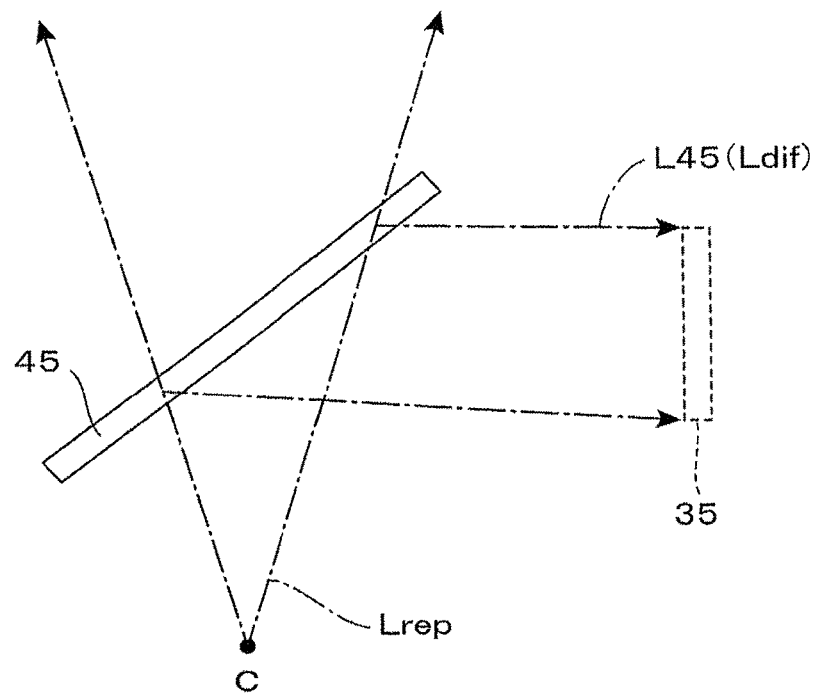
FIG. 9 is a view showing a process of reproducing an image 35 of the scatter body by using the hologram recording medium 45 created by the process shown in FIG. 5.

FIG. 9 is a view showing a process of reproducing an image 35 of the scatter body by using the hologram recording medium 45 created by the process shown in FIG. 8. As illustrated, illumination light for reproduction Lrep is irradiated onto the hologram recording medium 45 from the lower side. This illumination light for reproduction Lrep is coherent light that diverges as a spherical wave from a point light source positioned at the convergence point C, and a part of the illumination light for reproduction becomes light to irradiate the hologram recording medium 45 while diffusing in a conical shape as illustrated. The wavelength of this illumination light for reproduction Lrep is equal to the wavelength used for recording on the hologram recording medium 45 (that is, the wavelength of coherent light generated by the coherent light source 10 shown in FIG. 5).

Here, the position relationship between the hologram recording medium 45 and the convergence point C shown in FIG. 9 is exactly the same as the position relationship between the hologram photosensitive medium 40 and the convergence point C shown in FIG. 8. Therefore, the illumination light for reproduction Lrep shown in FIG. 9 corresponds to light that reverses on the optical path of the reference light Lref shown in FIG. 8. When the illumination light for reproduction Lrep meeting these conditions is irradiated onto the hologram recording medium 45, by diffracted light L45 (Ldif) thereof, the hologram reproduction image 35 (shown by the dashed line in the drawing) of the scatter body 30 is obtained. The position relationship between the hologram recording medium 45 and the reproduction image 35 shown in FIG. 9 is exactly the same as the position relationship between the hologram photosensitive medium 40 and the scatter body 30 shown in FIG. 8.

Thus, the technology for recording an image of an arbitrary object as a hologram and reproducing it is a known technology put into practical use from a long time ago. However, when creating a hologram recording medium to be utilized for general use, a parallel light flux is used as reference light Lref. To reproduce the hologram recorded by using reference light Lref consisting of a parallel light flux, illumination light for reproduction Lrep consisting of a parallel light flux is also utilized, and this is convenient.

On the other hand, when light that converges on the convergence point C is utilized as reference light Lref as shown in FIG. 8, when carrying out reproduction, as shown in FIG. 9, light that diverges from the convergence light C must be used as illumination light for reproduction Lrep. In actuality, to obtain the illumination light for reproduction Lrep shown in FIG. 9, an optical system such as a lens must be disposed at a specific position. If the position relationship between the hologram recording medium 45 and the convergence point C when carrying out reproduction does not match the position relationship between the hologram photosensitive medium 40 and the convergence point C when carrying out recording, an accurate reproduction image 35 cannot be obtained, so that the illumination conditions when carrying out reproduction are limited (when reproduction is carried out by using a parallel light flux, only the irradiation angle must be satisfied among the illumination conditions).

For this reason, a hologram recording medium created by using reference light Lref that converges on the convergence point C is not suitable for general use. Even so, the reason why light that converges on the convergence point C is used as reference light Lref in the embodiment described herein is for making light beam scanning easy when carrying out reproduction. Specifically, in FIG. 9, for convenience of description, a method for producing the reproduction image 35 of the scatter body 30 by using illumination light for reproduction Lrep diverging from the convergence point C is shown, however, in the present invention, in actuality, reproduction using the illumination light for reproduction Lrep diffusing in a conical shape as illustrated is not carried out. Instead of this, a method in which a light beam is scanned is adopted. Hereinafter, a detailed description is given of this method.

Figure 10:
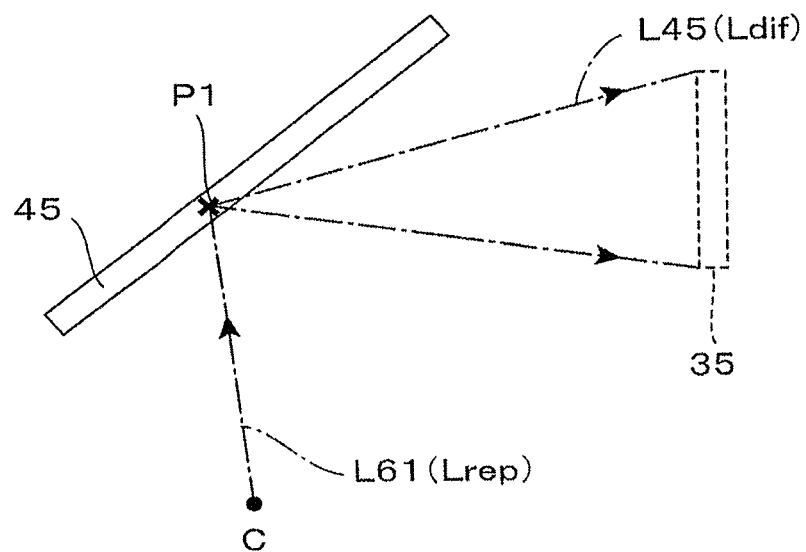
FIG. 10 is a view showing a process of reproducing an image 35 of the scatter body by irradiating only one light beam onto the hologram recording medium 45 created by the process shown in FIG. 5.

FIG. 10 is a drawing showing a process of reproducing the image 35 of the scatter body 30 by irradiating only one light beam onto the hologram recording medium 45 created by the process shown in FIG. 8. Specifically, in this example, only one light beam L61 advancing toward one point P1 within the medium from the convergence point C is given as illumination light for reproduction Lrep. Of course, the light beam L61 is coherent light with the same wavelength as that of light for recording. As described above with reference to FIG. 8, on the arbitrary point P1 within the hologram recording medium 45, all information of the scatter body 30 is recorded. Therefore, by irradiating illumination light for reproduction Lrep onto the position of the point P1 shown in FIG. 10 under conditions corresponding to the reference light Lref used for recording, the reproduction image 35 of the scatter body 30 can be produced by using only interference fringes recorded near this point P1. FIG. 10 shows a state where the reproduction image 35 is reproduced by the diffracted light L45 (Ldif) from the point P1.

Figure 11:
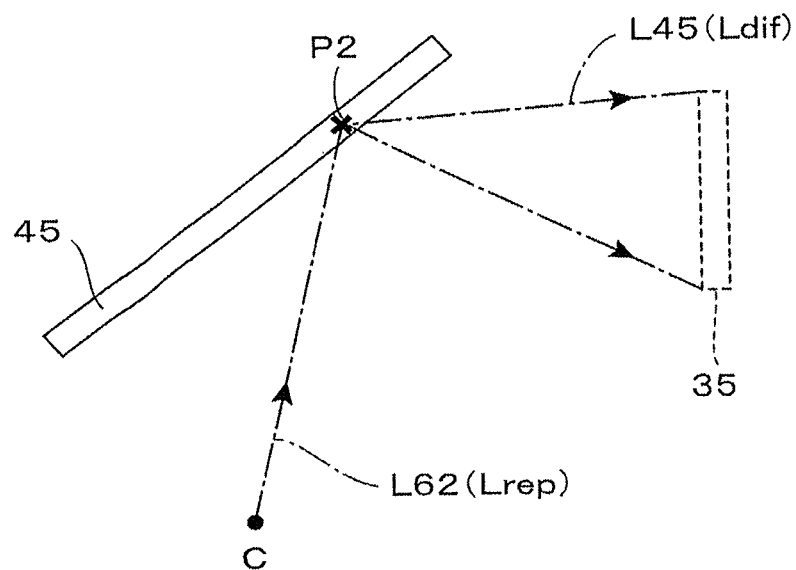
FIG. 11 is another view showing the process of reproducing the image 35 of the scatter body by irradiating only one light beam onto the hologram recording medium 45 created by the process shown in FIG. 5.

On the other hand, FIG. 11 shows an example in which only one light beam L62 advancing toward another point P2 within the medium from the convergence point C is given as illumination light for reproduction Lrep. In this case, all information of the scatter body 30 is also recorded on the point P2, so that by irradiating the illumination light for reproduction Lrep onto the position of the point P2 under conditions corresponding to the reference light Lref used for recording, the reproduction image 35 of the scatter body 30 can be produced by using only interference fringes recorded near the point P2. FIG. 11 shows a state where the reproduction image 35 is reproduced by the diffracted light L45 (Ldif) from the point P2. The reproduction image 35 shown in FIG. 10 and the reproduction image 35 shown in FIG. 11 are of the same scatter body 30 as the original image, so that the reproduction images are theoretically identical to each other and produced at the same position.

Figure 12:
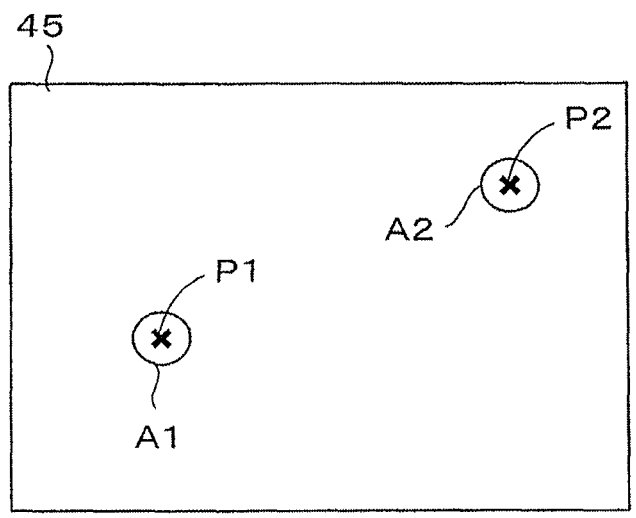
FIG. 12 is a plan view showing irradiation positions of light beams in the reproduction process shown in FIG. 10 and FIG. 11.

FIG. 12 is a plan view showing an irradiation position of a light beam in the reproduction process shown in FIG. 10 and FIG. 11. The point P1 shown in FIG. 12 corresponds to the point P1 shown in FIG. 10, and the point P2 shown in FIG. 12 corresponds to the point P2 shown in FIG. 11. The reference symbols A1 and A2 each denote sections of the illumination light for reproduction Lrep. The shapes and sizes of the sections A1 and A2 depend on the shapes and sizes of the sections of the light beams L61 and L62. They also depend on the irradiation positions on the hologram recording medium 45. Here, for convenience, circular sections A1 and A2 are shown, however, in actuality, when light beams L61 and L62 having circular sections are used, the sectional shapes become oval shapes flattened according to the irradiation positions.

Thus, the contents of the interference fringes recorded near the point P1 and near the point P2 shown in FIG. 12 are completely different from each other, however, whichever point a light beam that becomes illumination light for reproduction Lrep is irradiated onto, the same reproduction image 35 is obtained at the same position. This is because the illumination light for reproduction Lrep is a light beam advancing toward each point P1 and P2 from the convergence point C, so that the illumination light for reproduction Lrep in the direction corresponding to the direction of the reference light Lref when carrying out recording shown in FIG. 8 is given to each point.

The same applies, of course, to an arbitrary point on the hologram recording medium 45 although FIG. 12 illustrates only two points P1 and P2. Therefore, when a light beam is irradiated onto an arbitrary point on the hologram recording medium 45, as long as the light beam is light from the convergence point C, the same reproduction image 35 is obtained at the same position. In fact, as shown in FIG. 6, when a hologram is recorded on only a region (hatched region in the drawing) that is a part of the hologram photosensitive medium 40, the reproduction image 35 is obtained only when a light beam is irradiated onto a point within the region.

Finally, the hologram recording medium 45 described herein has features that it is a medium on which an image of the scatter body 30 is recorded as a hologram by using the reference light Lref that converges on the specific convergence point C, and when a light beam passing through this convergence point C is irradiated as illumination light for reproduction Lrep onto an arbitrary position, a reproduction image 35 of the scatter body 30 is produced. Therefore, when a light beam passing through the convergence point C is scanned as illumination light for reproduction Lrep on the hologram recording medium 45, by diffracted lights Ldif obtained from respective irradiation points, the same reproduction image 35 is reproduced at the same position.

<<<Section 3. Illumination Unit According to Basic Embodiment of the Present Invention>>>

The present invention has a feature that a special illumination unit having a speckle reducing function is adopted in a scanner apparatus or an apparatus for measuring a three-dimensional shape of an object. Therefore, here, a description is given of a configuration of the illumination unit 100 according to the basic embodiment of the present invention with reference to the side view of FIG. 13. As illustrated, this illumination unit 100 includes a hologram recording medium 45, a coherent light source 50, and a light beam scanning device 60.

Here, the hologram recording medium 45 is a medium having the features described in Section 2, on which the image 35 of the scatter body 30 is recorded. The coherent light source 50 generates a coherent light beam L50 with the same wavelength as the wavelength of light (object light Lobj and reference light Lref used when creating the hologram recording medium 45.

On the other hand, the light beam scanning device 60 bends the light beam L50 generated by the coherent light source 50 at the scanning origin B and irradiates the light beam onto the hologram recording medium 45, and scans the light beam by changing the bending mode of the light beam L50 with time so that the irradiation position of the bent light beam L60 on the hologram recording medium 45 changes with time. This device is generally known as a scanning mirror device. In the drawing, for convenience of description, the bending mode at the timing t1 is illustrated by an alternate long and short dashed line, and the bending mode at the timing t2 is illustrated by an alternate long and two short dashed line. Specifically, at the timing t1, the light beam L50 is bent at the scanning origin B and irradiated as a light beam L60(t1) onto the point P(t1) of the hologram recording medium 45, however, at the timing t2, the light beam L50 is bent at the scanning origin B and irradiated as a light beam L60(t2) onto the point P(t2) of the hologram recording medium 45.

In the drawing, for convenience of description, only the bending modes at the two timings t1 and t2 are shown, however, in actuality, in a period from the timing t1 to the timing t2, the bending direction of the light beam smoothly changes and the irradiation position of the light beam L60 on the hologram recording medium 45 gradually moves from the point P(t1) to the point P(t2) in the drawing. Specifically, in the period from the timing t1 to the timing t2, the irradiation position of the light beam L60 is scanned from the point P(t1) to the point P(t2) on the hologram recording medium 45.

Figure 13:
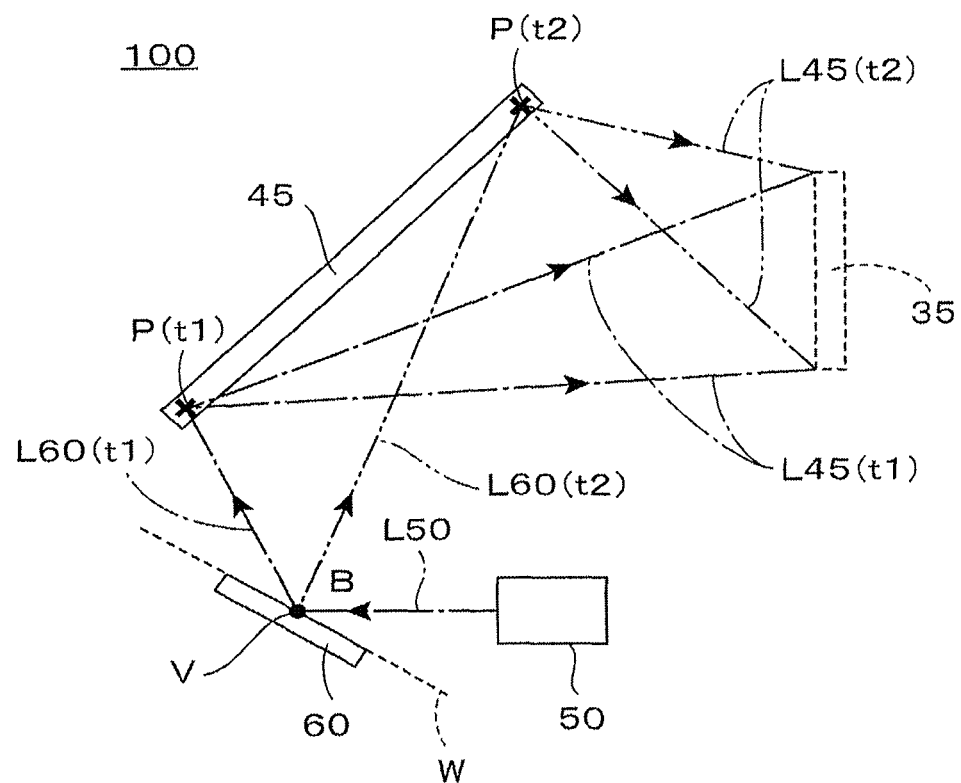
FIG. 13 is a side view showing a configuration of an illumination unit 100 to be used in a scanner apparatus according to a basic embodiment of the present invention.

Here, by matching the position of the scanning origin B with the position of the convergence point C shown in FIG. 8 (in other words, by making the position relationship between the hologram recording medium 45 and the scanning origin B in FIG. 13 equal to the position relationship between the hologram photosensitive medium 40 and the convergence point C in FIG. 8), on each irradiation position of the hologram recording medium 45, the light beam L60 is irradiated in a direction corresponding to the reference light Lref shown in FIG. 8 (direction reversing the optical path of the reference light Lref shown in FIG. 8). Therefore, at each irradiation position of the hologram recording medium 45, the light beam L60 functions as correct illumination light for reproduction Lrep for reproducing a hologram recorded there.

For example, at the timing t1, the reproduction image 35 of the scatter body 30 is produced by the diffracted light L45(t1) from the point P(t1), and at the timing t2, the reproduction image 35 of the scatter body 30 is produced by the diffracted light L45(t2) from the point P(t2). Of course, in the period from the timing t1 to t2, the reproduction image 35 of the scatter body 30 is also produced similarly by diffracted lights from respective positions onto which the light beam L60 is irradiated. Specifically, as long as the light beam L60 advances from the scanning origin B toward the hologram recording medium 45, whichever position on the hologram recording medium 45 the light beam L60 is irradiated onto, the same reproduction image 35 is produced at the same position by diffracted light from the irradiation position.

This phenomenon occurs because, as shown in FIG. 8, the image of the scatter body 30 is recorded as a hologram on the hologram recording medium 45 by using the reference light L23 that converges on the specific convergence point C, and the light beam scanning device 60 scans the light beam L60 by using this convergence point C as a scanning origin B. Of course, even when scanning by the light beam scanning device 60 is stopped and the irradiation position of the light beam L60 is fixed to a point on the hologram recording medium 45, the same reproduction image 35 is continuously produced at the same position. The reason why the light beam L60 is scanned in spite of this is for reducing speckle noise.

Figure 14:
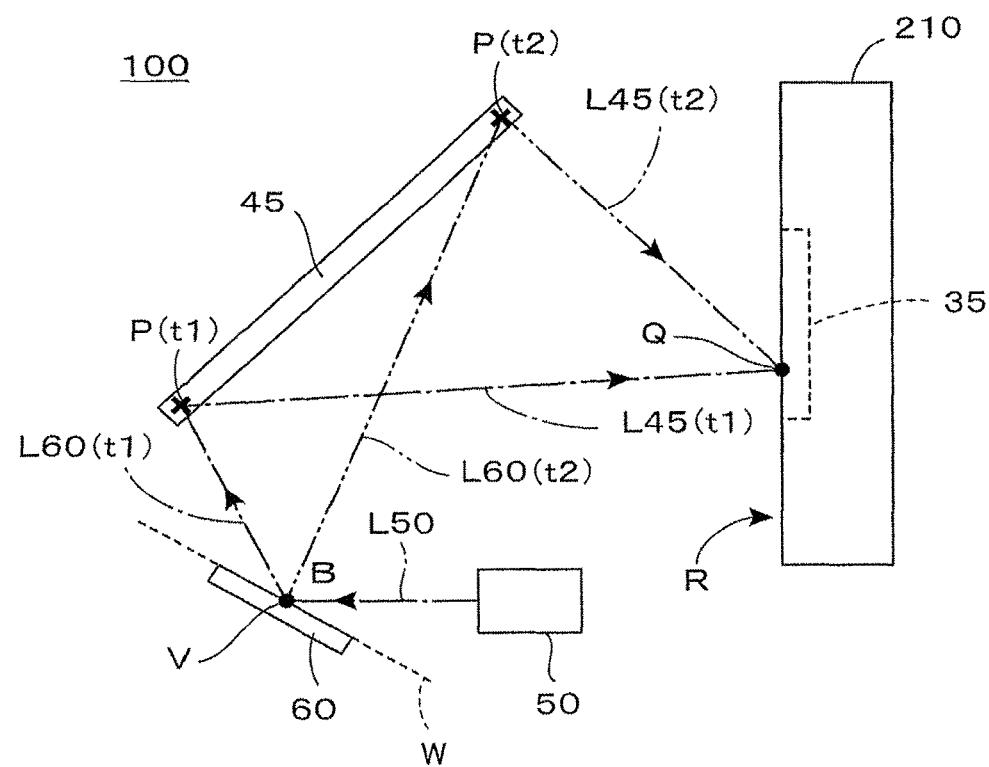
FIG. 14 is a side view showing a state where a placing stage 210 is illuminated by using the illumination unit 100 shown in FIG. 13.

FIG. 14 is a side view showing a state where the placing stage 210 is illuminated by using the illumination unit 100 shown in FIG. 13. Here, for convenience of illustration, the state where the placing stage 210 disposed at the right end is illuminated from the left side is shown, however, when this illumination unit 100 is used in the apparatus for measuring a three-dimensional shape shown in FIG. 1, the illumination unit 100 illuminates the placing stage 210 disposed below the illumination unit from above.

As described above, the illumination unit 100 is a device that uses reproduction light of the image 35 of the scatter body obtained from the hologram recording medium 45 as illumination light. Here, a case where, to illuminate the left side surface (the upper surface in the configuration shown in FIG. 1) of the placing stage 210 by the illumination unit 100, the placing stage 210 is disposed at a position at which the left side surface of the placing stage 210 matches the left side surface of the reproduction image 35 of the scatter body as illustrated, is considered. In this case, the left side surface of the placing stage 210 becomes a light receiving surface R, and diffracted light from the hologram recording medium 45 is irradiated onto the light receiving surface R.

Therefore, an arbitrary attention point Q is set on the light receiving surface R, and diffracted light reaching this attention point Q is considered. First, at the timing t1, the light beam L50 output from the coherent light source 50 is bent at the scanning origin B as illustrated by an alternate long and short dashed line in the drawing, and irradiated as a light beam L60(t1) onto the point P(t1). Then, diffracted light L45(t1) from the point P(t1) reaches the attention point Q. On the other hand, at the timing t2, the light beam L50 output from the coherent light source 50 is bent at the scanning origin B as illustrated by the alternate long and two short dashed line in the drawing, and irradiated as a light beam L60(t2) onto the point P(t2). Then, diffracted light L45(t2) from the point P(t2) reaches the attention point Q.

Finally, by this diffracted light, at the position of the attention point Q, the reproduction image corresponding to the position of the attention point Q on the scatter body 30 is always produced, however, the incidence angle of the diffracted light with respect to the attention point Q differs between the timing t1 and the timing t2. In other words, when the light beam L60 is scanned, although the reproduction image 35 formed on the light receiving surface R does not change, the incidence angle of diffracted light that reaches the respective points on the light receiving surface R changes with time. This change in incidence angle with time greatly contributes to speckle reduction.

As described above, the reason why speckles occur when using coherent light is because coherent lights reflected by the respective portions of the light receiving surface R have extremely high coherence and interfere with each other. However, in the present invention, by scanning the light beam L60, the incidence angle of the diffracted light onto each portion of the light receiving surface R (or a surface of an object M) changes with time, so that the interference mode also changes with time and has multiplicity. Therefore, the factor that causes speckles is dispersed temporally, so that the situation where a spot-like pattern having a physiological harmful effect is constantly observed can be eased. This is an advantageous feature of the illumination unit 100 shown in FIG. 14.

Figure 15:
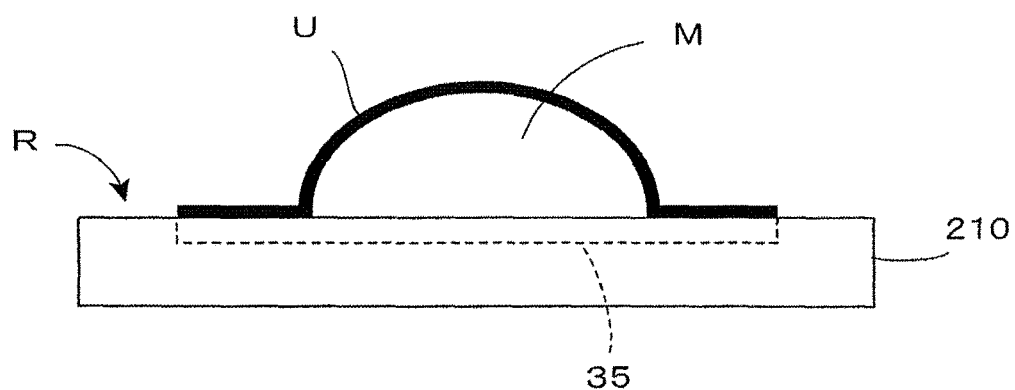
FIG. 15 is a side view showing a state where a line pattern U is projected onto an object M by using the illumination unit 100 shown in FIG. 13.

A scanner apparatus and an apparatus for measuring a three-dimensional shape of an object according to the present invention project a line pattern U onto an object M by using the illumination unit 100 having the described features. FIG. 15 is a side view showing a state where a line pattern U is projected onto an object M by using the illumination unit 100 shown in FIG. 13. The line pattern U is conventionally a pattern without thickness in actuality, however, here, for convenience of description, it is illustrated by a heavy black line.

The illustrated example shows a state where the hologram reproduction image 35 is formed on the light receiving surface R forming the upper surface of the placing stage 210 for placing an object M. Therefore, the portion formed on the light receiving surface R of the line pattern U becomes the hologram reproduction image 35 itself, however, the portion formed on the upper surface of the object M is a pattern consisting of a region in which hologram reproduction light is shielded and scattered by the surface of the object M. Therefore, the contour portion of the latter portion is slightly blurred and unclear as compared with the former portion, however, this does not pose a problem in practical use as long as the distance between the illumination unit 100 and the light receiving surface R is sufficiently larger than the height of the object M.

For the same reason, the forming position of the hologram reproduction image 35 does not necessarily have to accurately match the position of the upper surface of the placing stage 210, and for example, the hologram reproduction image 35 may be formed at the upper end position of the object M. As described above, there is no problem in practical use as long as the distance between the illumination unit 100 and the light receiving surface R is set to be sufficiently larger than the height of the object M and the hologram reproduction image 35 is formed on a nearby surface near the object M.

Thus, by using the illumination unit 100 according to the present invention, speckles can be reduced while a high brightness line pattern U with monochromaticity is projected onto the object M by using coherent light. Moreover, the light beam scanning device 60 can be realized by a comparatively small-sized device, so that as compared with a conventional device that rotates or oscillates a scatter body, the illumination unit 100 can be made smaller in size and also smaller in power consumption.

<<<Section 4. Detailed Description of Components of Illumination Unit>>>

The illumination unit 100 shown in FIG. 13 includes, as described in Section 3, the hologram recording medium 45, the coherent light source 50, and the light beam scanning device 60. Here, a further detailed description is given of these components.

<4-1> Coherent Light Source

First, as the coherent light source 50, a light source that generates a coherent light beam L50 with the same wavelength as the wavelength of light (object light Lobj and reference light Lref) used for creating the hologram recording medium 45 is used. In fact, the wavelength of the light beam L50 to be generated by the coherent light source 50 does not necessarily have to be completely equal to the wavelength of the light used for creating the hologram recording medium 45, and as long as the light beam has an approximate wavelength, a reproduction image of a hologram can be obtained. In conclusion, the coherent light source 50 to be used in the present invention is a light source that generates a coherent light beam L50 with a wavelength capable of reproducing the image 35 of the scatter body.

In actuality, the same light source as the coherent light source 10 shown in FIG. 5 can be utilized as it is as the coherent light source 50. In the case of the embodiment described herein, a DPSS (Diode Pumped Solid State) laser device capable of emitting laser light with a wavelength $\lambda=532$ nm (green) was used as the coherent light source 50. The DPSS laser can obtain comparatively high-output laser light with a desired wavelength although the DPSS laser is small in size, so that it is a coherent light source to be suitably utilized for a scanner apparatus or an apparatus for measuring a three-dimensional shape of an object according to the present invention.

This DPSS laser device has a coherent length longer than that of a general semiconductor laser, so that speckles easily occur, and therefore, the DPSS laser device is conventionally recognized as unsuitable for the illumination purpose. Conventionally, in order to reduce speckles, an effort was made to broaden a range of emission wavelength of laser and reduce the coherent length as small as possible. On the other hand, in the present invention, even when a light source with a long coherent length is used, due to the above-described principle, occurrence of speckles can be effectively reduced, so that even when a DPSS laser device is used as a light source, occurrence of speckles does not pose a problem in practical use. In this regard, by utilizing the present invention, an effect of widening the selection of the light source is obtained.

<4-2> Light Beam Scanning Device

Figure 16:
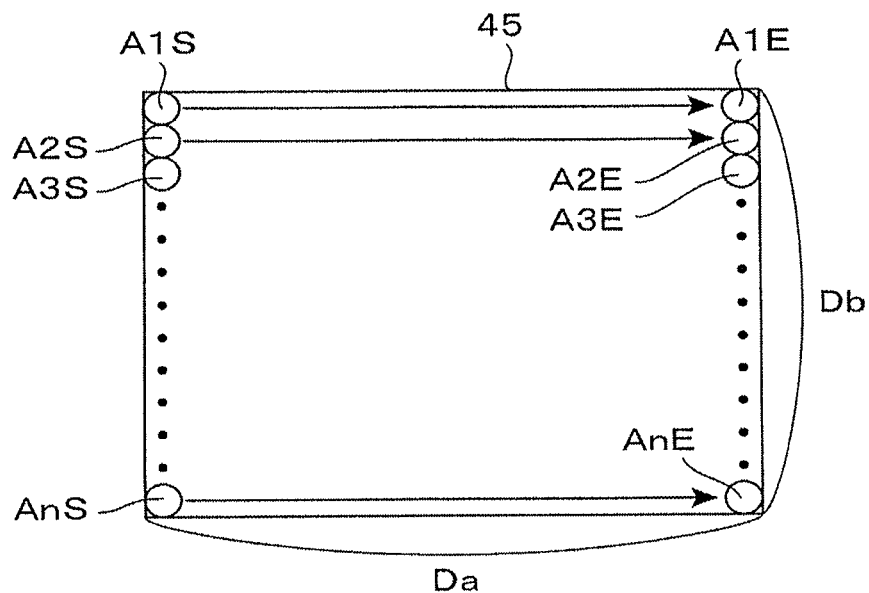
FIG. 16 is a plan view showing a first example of a scanning mode of a light beam on the hologram recording medium 45 in the illumination unit 100 shown in FIG. 13.

The light beam scanning device 60 is a device having a function of scanning a light beam on the hologram recording medium 45. Here, a description is given of a detailed method of beam scanning by this light beam scanning device 60. FIG. 16 is a plan view showing a first example of a scanning mode of a light beam on the hologram recording medium 45 in the illumination unit 100 shown in FIG. 13. In this example, as the hologram recording medium 45, a medium with a lateral width Da=12 mm and a longitudinal width Db=10 mm is used, and as a light beam L60 to scan on the medium, a laser beam having a circular section with a diameter of 1 mm is used. As illustrated, a method is adopted in which, in the same manner as scanning of an electronic beam in a CRT, the irradiation position of the light beam L60 is scanned in the horizontal direction from the start region A1S to the end region A1E of the first line, and then, scanned in the horizontal direction from the start region A2S to the end region A2E of the second line . . . , and last, scanned in the horizontal direction from the start region AnS to the end region AnE of the n-th line, and returned to the start region A1S of the first line again and repeats the same operation.

Figure 17:
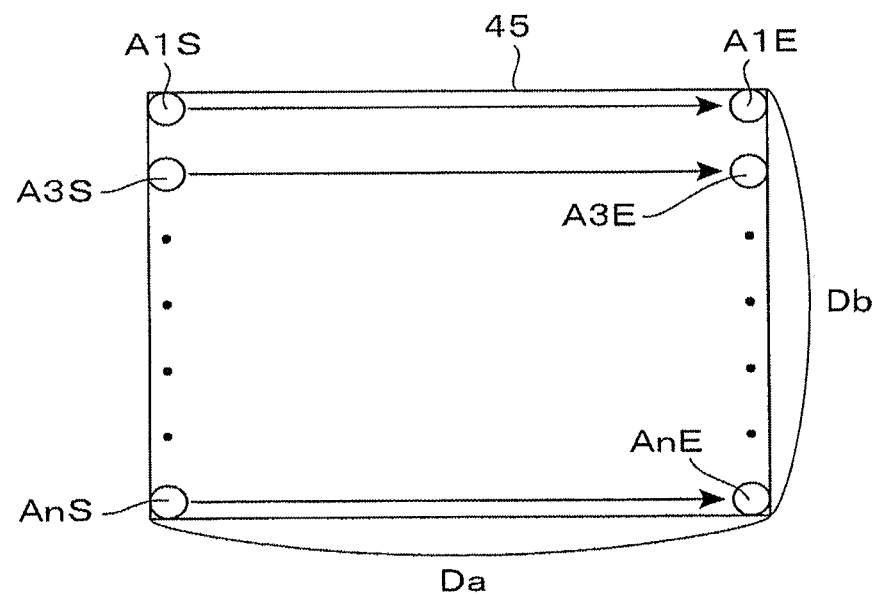
FIG. 17 is a plan view showing a second example of a scanning mode of a light beam on the hologram recording medium 45 in the illumination unit 100 shown in FIG. 13.
Figure 18:
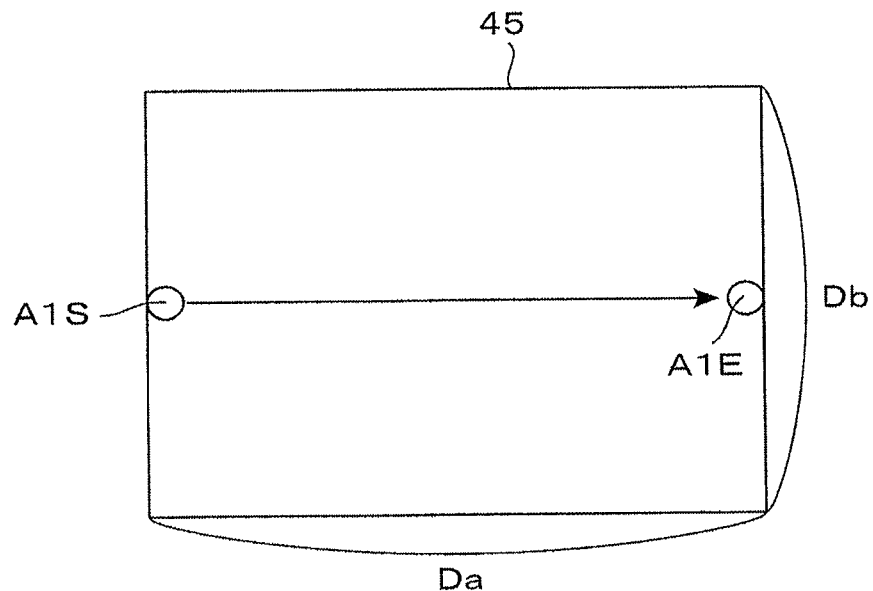
FIG. 18 is a plan view showing a third example of a scanning mode of a light beam on the hologram recording medium 45 in the illumination unit 100 shown in FIG. 13.

With the scanning method shown in FIG. 16, the entire surface of the hologram recording medium 45 is scanned by a light beam, however, in the present invention, the entire surface of the hologram recording medium 45 does not necessarily have to be completely scanned. For example, FIG. 17 shows an example in which only odd-numbered lines are scanned by the scanning method shown in FIG. 16, and scanning of even-numbered lines is omitted. Thus, in the case of scanning on every other line, hologram information recorded in a region that is a part of the hologram recording medium 45 does not contribute to image reproduction at all, however, this does not pose any particular problem. FIG. 18 shows an example of a more extreme scanning method in which scanning on only one line in the horizontal direction from the start region A1S to the end region A1E is repeated at the center position of the longitudinal width Db.

Of course, the scanning direction can be freely set, and after the first line is scanned from the left to the right, the second line may be scanned from the right to the left. The scanning direction is not necessarily limited to being straight, and scanning that draws a circle on the hologram recording medium 45 is also possible.

As in the example shown in FIG. 6, when the reference light Lref is irradiated onto and recorded on only the region (hatched region) that is a part of the hologram photosensitive medium 40, no hologram is recorded on the other region (white region on the outer side). In this case, if the white region on the outer side is also scanned, the reproduction image 35 cannot be obtained, so that the illumination becomes temporarily dark. Therefore, in practical use, only the region on which a hologram is recorded is preferably scanned.

As described above, scanning of a light beam on the hologram recording medium 45 is carried out by the light beam scanning device 60. This light beam scanning device 60 has a function of bending the light beam L50 from the coherent light source 50 at the scanning origin B (convergence point C when recording a hologram) and irradiating the light beam onto the hologram recording medium 45. Further, by changing the bending mode (the bending direction and the amount of the bending angle) with time, scanning is carried out so that the irradiation position of the bent light beam L60 onto the hologram recording medium 45 changes with time. A device having this function is utilized as a scanning mirror device in various optical systems.

For example, in the example shown in FIG. 13, as the light beam scanning device 60, for convenience, a simple reflecting mirror is illustrated, however, in actuality, drive mechanisms that turn this reflecting mirror in biaxial directions are provided. Specifically, when a scanning origin B is set at the center position of the reflecting surface of the illustrated reflecting mirror, and a V axis and a W axis passing through this scanning origin B and orthogonal to each other on the reflecting surface are defined, a mechanism that turns the reflecting mirror around the V axis (axis perpendicular to the paper surface of the drawing) and a mechanism that turns the reflecting mirror around the W axis (axis illustrated by the dashed line in the drawing) are provided.

Thus, by using a reflecting mirror capable of turning around the V axis and the W axis independently, the reflected light beam L60 can be scanned in the horizontal direction and the vertical direction on the hologram recording medium 45. For example, in the above-described mechanism, by turning the reflected light around the V axis, the irradiation position of the light beam L60 can be scanned in the horizontal direction on the hologram recording medium 45 shown in FIG. 16, and by turning the reflected light around the W axis, the irradiation position can be scanned in the vertical direction.

In conclusion, as long as the light beam scanning device 60 has a function of bending the light beam L60 so that the light beam swings on a plane including the scanning origin B, the irradiation position of the light beam L60 can be scanned in a one-dimensional direction on the hologram recording medium 45. As in the example shown in FIG. 18, to operate the scanning device to scan the light beam only in the horizontal direction, the light beam scanning device 60 needs to have just the function of scanning the irradiation position of the light beam in a one-dimensional direction on the hologram recording medium 45.

On the other hand, to operate the scanning device so as to scan the irradiation position of the light beam L60 in two-dimensional directions on the hologram recording medium 45, the light beam scanning device 60 is provided with a function of bending the light beam L60 so that the light beam swings on a first plane including the scanning origin B (in FIG. 13, by turning the reflecting mirror around the V axis, the light beam L60 swings on a plane included in the paper surface), and a function of bending the light beam L60 so that the light beam swings on a second plane that includes the scanning origin B and is orthogonal to the first plane (in FIG. 13, by turning the reflecting mirror around the W axis, the light beam L60 swings on a plane perpendicular to the paper surface).

As a scanning mirror device for scanning the irradiation position of a light beam in a one-dimensional direction, a polygon mirror is widely utilized. As a scanning mirror device for scanning the irradiation position in two-dimensional directions, a pair of polygon mirrors may be combined and used, or devices such as a gimbal mirror, a galvano mirror, and a MEMS mirror are known. Further, other than normal mirror devices, a total reflection prism, a refracting prism, and an electro-optic crystal (KTN crystal, etc.) or the like can also be utilized as the light beam scanning device 60.

If the diameter of the light beam L60 becomes close to the size of the hologram recording medium 45, the effect of reducing speckles may be lost, so that care must be taken for this. In the example shown in FIG. 16 to FIG. 18, as described above, the hologram recording medium 45 has a lateral width Da=12 mm and a longitudinal width Db=10 min, and the light beam L60 is a laser beam having a circular section with a diameter of 1 mm. Under these dimensional conditions, the effect of reducing speckles is sufficiently obtained. This is because any region on the hologram recording medium 45 is just temporarily irradiated with the light beam L60, and diffracted light is not continuously output from the same region.

Figure 19:
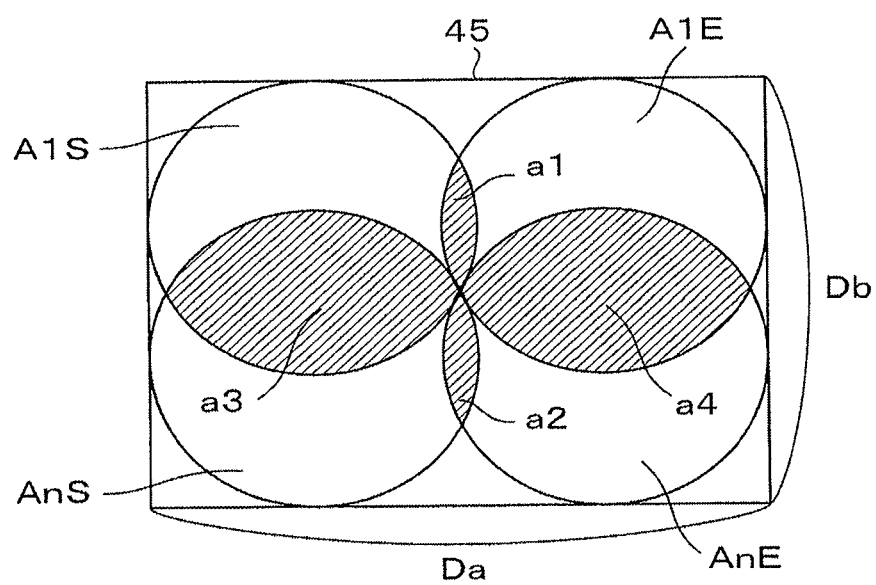
FIG. 19 is a plan view showing a fourth example of a scanning mode of a light beam on the hologram recording medium 45 in the illumination unit 100 shown in FIG. 13.

However, for example, as in the example shown in FIG. 19, when a light beam with a diameter close to the size of the hologram recording medium 45 is irradiated, a region (hatched region in the drawing) from which diffracted light is continuously output is formed. Specifically, even when the irradiation position of the light beam L60 is scanned in the horizontal direction from the start region A1S to the end region A1E of the first line, the hatched region a1 in the drawing is always irradiated with the light beam. Similarly, even when the irradiation position is scanned in the horizontal direction from the start region AnS to the end region AnE of the n-th line, the region a2 is always irradiated with the light beam. In the case of scanning in the vertical direction, the start regions of the respective lines overlap in the region a3, and the end regions of the respective lines overlap in the region a4, so that these regions are always irradiated with the light beam even after the line to be scanned is changed.

Eventually, these hatched regions cannot benefit from light beam scanning, and diffracted light is continuously output therefrom. As a result, diffracted light emitted from such a region is continuously incident on the light receiving surface R of the illuminating object at the same angle, and becomes a factor that causes speckles. Therefore, the diameter of the light beam L60 should not be increased as the size of the hologram recording medium 45 gets closer.

This harmful effect also occurs when the scanning pitch is set to be smaller than the diameter of the light beam L60. For example, FIG. 16 shows an example in which the scanning pitch in the vertical direction is set to be equal to the diameter of the light beam L60, and FIG. 17 shows an example in which the scanning pitch in the vertical direction is set to twice the diameter of the light beam L60. When the scanning pitch in the vertical direction (vertical scanning direction) is thus set to be equal to or larger than the diameter of the light beam, the scanning region of the i-th line and the scanning region of the (i+1)-th line do not overlap each other, however, if the scanning pitch is less than the diameter of the light beam, an overlapping region occurs and may become a factor that causes speckles as described above.

A scanning speed slower than a capturing time of the imaging unit 300 (an exposure time of the CCD camera) also becomes a factor that generates speckles. For example, if scanning is carried out at a low speed in which it takes an hour to scan one line, this is the same as not scanning in terms of the capturing time of the imaging unit 300, and speckles appear on a captured image. The reason why speckles are reduced by scanning a light beam is that, as described above, an incidence angle of light to be irradiated onto the respective portions of the light receiving surface R (or the surface of the object M) is multiplexed by time. Therefore, to obtain a sufficient effect of reducing speckles by beam scanning, the time during which the same interference conditions that lead to occurrence of speckles are maintained is reduced to be shorter than the capturing time of the imaging unit 300, and conditions that lead to occurrence of speckles are changed with time during the exposure time for capturing one image.

<4-3> Hologram Recording Medium

The detailed production process of the hologram recording medium 45 is as described in Section 2 above. Specifically, the hologram recording medium 45 to be used in the present invention is a medium that records an image of the scatter body 30 as a hologram by using reference light that converges on the specific convergence point C. Therefore, herein, a description is given of a detailed mode of a hologram recording medium to be suitably utilized in the present invention.

There are some physical modes of holograms. The inventor of the present invention considers that a volume hologram is most preferably utilized in the present invention. In particular, a volume hologram using a photopolymer is optimally used.

Generally, a hologram utilized as an anticounterfeit seal on a cash card and a cash voucher, etc., is called a surface relief (embossed) hologram, and hologram interference fringes are recorded by the surface uneven structure. Of course, the hologram recording medium 45 that records the image of the scatter body 30 as a surface relief hologram (generally called a holographic diffuser) can also be utilized for carrying out the present invention. However, in the case of this surface relief hologram, scattering by the surface uneven structure may become a new factor that causes production of speckles, and therefore, this is not preferable from the viewpoint of speckle reduction. In the case of a surface relief hologram, multi-order diffracted light is generated, so that the diffraction efficiency is deteriorated, and further, the diffraction performance (performance that determines how large the diffraction angle can be increased) is also limited.

On the other hand, in the case of a volume hologram, hologram interference fringes are recorded as refractive index distribution inside a medium, so that the hologram is not affected by scattering by the surface uneven structure. Generally, the diffraction efficiency and diffraction performance of a volume hologram are better than those of a surface relief hologram. Therefore, when carrying out the present invention, a medium that records the image of the scatter body 30 as a volume hologram is optimally utilized as the hologram recording medium 45.

However, even in the case of a volume hologram, if it is of a type that is recorded by utilizing a photosensitive medium including a silver halide material, scattering by silver halide particles may become a new factor that produces speckles, so that it is preferable to avoid use of this type. For this reason, the inventor of the present invention considers that a volume hologram using a photopolymer is optimum as the hologram recording medium 45 to be used in the present invention. A detailed chemical composition of such a volume hologram using a photopolymer is described in, for example, Japanese Patent No. 2849021.

However, in terms of mass production, a surface relief hologram is better than a volume hologram. For a surface relief hologram, an original plate having an uneven structure on the surface is prepared, and by press working by using this original plate, mass production of media is possible. Therefore, when it is demanded to reduce the production cost, a surface relief hologram is utilized.

As a physical mode of a hologram, an amplitude modulation hologram formed by recording interference fringes as a shading pattern on a plane has become widely popular. However, this amplitude modulation hologram is low in diffraction efficiency, and light absorption occurs at a dark pattern portion, so that when it is utilized in the present invention, sufficient illumination efficiency cannot be secured. However, in the production process thereof, a simple method in which a shading pattern is printed on a plane can be adopted, and this is advantageous in terms of production cost. Therefore, an amplitude modulation hologram can also be adopted in the present invention depending on the use.

In the recording method shown in FIG. 5, a so-called Fresnel type hologram recording medium is created, however, a hologram recording medium of a Fourier transform type obtained by recording the scatter body 30 through a lens can also be created. In this case, as appropriate, the illumination efficiency may be improved by providing a lens on the optical path of the diffracted light L45 to condense light, however, even without a lens, a function as an illumination unit 100 can be sufficiently performed.

<<<Section 5. Modification of Illumination Unit to be Used in the Present Invention>>>

A basic embodiment of a scanner apparatus and an apparatus for measuring a three-dimensional shape of an object according to the present invention has been described so far. This basic embodiment has a feature that the object M is illuminated by using an illumination unit 100 having a unique feature as shown in FIG. 13.

Specifically, to carry out illumination by utilizing the illumination unit 100, first, a preparation step of creating the hologram recording medium 45 is carried out by recording the image 35 of the scatter body 30 for composing a line pattern U as a hologram on the recording medium 40, and the illumination unit 100 is configured by using the hologram recording medium 45 created in this preparation step. Then, in the state where the object M is disposed at a position to be irradiated with reproduction light of a hologram obtained from the hologram recording medium 45, a projection step of irradiating a coherent light beam L60 onto the hologram recording medium 45 and scanning the light beam L60 on the hologram recording medium 45 so that the irradiation position changes with time, and projecting the line pattern U onto the object M, and an imaging step of imaging the object M onto which the line pattern U is projected from a predetermined direction and importing surface information of the object M, are carried out to obtain surface information of the object M.

In this case, in the preparation step, as shown in FIG. 5, coherent illumination light L12 is irradiated onto the scatter body 30, and scattered light L30 obtained from the scatter body 30 is used as object light Lobj. Then, coherent light L23 that is irradiated onto the recording medium 40 along a predetermined optical path and has the same wavelength as that of the illumination light L12 is used as reference light Lref. Then, by recording interference fringes formed by the object light Lobj and the reference light Lref on the recording medium 40, the hologram recording medium 45 is created. In the projection step, as shown in FIG. 13, scanning is carried out so that a light beam L60 with the same wavelength as that of the reference light Lref (or an approximate wavelength capable of reproducing a hologram) advances toward an irradiation position on the hologram recording medium 45 by passing through an optical path along the optical path of the reference light Lref (in other words, the light beam L60 is given from a direction optically conjugate toward the reference light Lref), and reproduction light of the image 35 of the scatter body 30, obtained from the hologram recording medium 45, is projected as illumination light.

Here, a description is given of several modifications of the illumination unit 100 which is installed in the above-described basic embodiment of a scanner apparatus or an apparatus for measuring a three-dimensional shape of an object <5-1> Hologram Recording Medium on the Assumption of One-Dimensional Scanning In the process of creating the hologram recording medium shown in FIG. 5, the parallel light flux L22 is condensed by the convex lens 23 (lens having a focal point at the position of the convergence point C) and irradiated as reference light Lref onto the medium 40. Specifically, along a side surface of a cone whose tip is on the convergence point C (theoretically, innumerable cones with radiuses different from each other are present), the image of the scatter body 30 is recorded by using the reference light Lref that three-dimensionally converges on the convergence point C.

The use of the reference light Lref that three-dimensionally converges is on the assumption that the light beam L60 is three-dimensionally scanned (beam is scanned by combining turning around the V axis and turning around the W axis of the reflecting mirror) so that its optical path three-dimensionally diverges from the scanning origin B in the illumination unit 100 shown in FIG. 13. Three-dimensional scanning of the light beam L60 is for two-dimensionally scanning the irradiation position of the light beam on the hologram recording medium 45 (for scanning in the horizontal direction and scanning in the vertical direction in FIG. 16).

Figure 20:
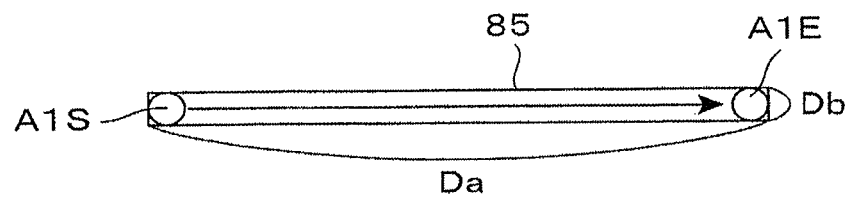
FIG. 20 is a plan view showing a scanning mode of a light beam when a band-shaped hologram recording medium 85 is used.

However, the scanning of the irradiation position of the light beam on the hologram recording medium 45 does not necessarily have to be two-dimensionally scanned. For example, in FIG. 18, an example of scanning of the light beam only in the horizontal direction is illustrated. Thus, on the assumption that the irradiation position of the light beam is one-dimensionally scanned, it is rational that the hologram recording medium is also created on the same assumption. In detail, on the assumption of one-dimensional scanning, instead of creating the hologram recording medium 45 as shown in FIG. 18, creating a band-shaped hologram recording medium 85 shown in FIG. 20 is sufficient.

When this hologram recording medium 85 is used, as scanning by the light beam scanning device 60, scanning of one line from the start region A1S on the left end to the end region A1E on the right end is repeated. In this case, scanning of one line from the left to the right may be repeated, or reciprocatory scanning may be carried out in such a manner that scanning from the right to the left is carried out after scanning from the left to the right. When the light beam L60 to be used is a laser beam having a circular section with a diameter of 1 mm, the longitudinal width Db=1 mm of the hologram recording medium 85 shown in FIG. 20 is sufficient. Therefore, as compared with the case where the hologram recording medium 45 shown in FIG. 18 is used, further space-saving is realized, and the apparatus can be downsized as a whole.

Figure 21:
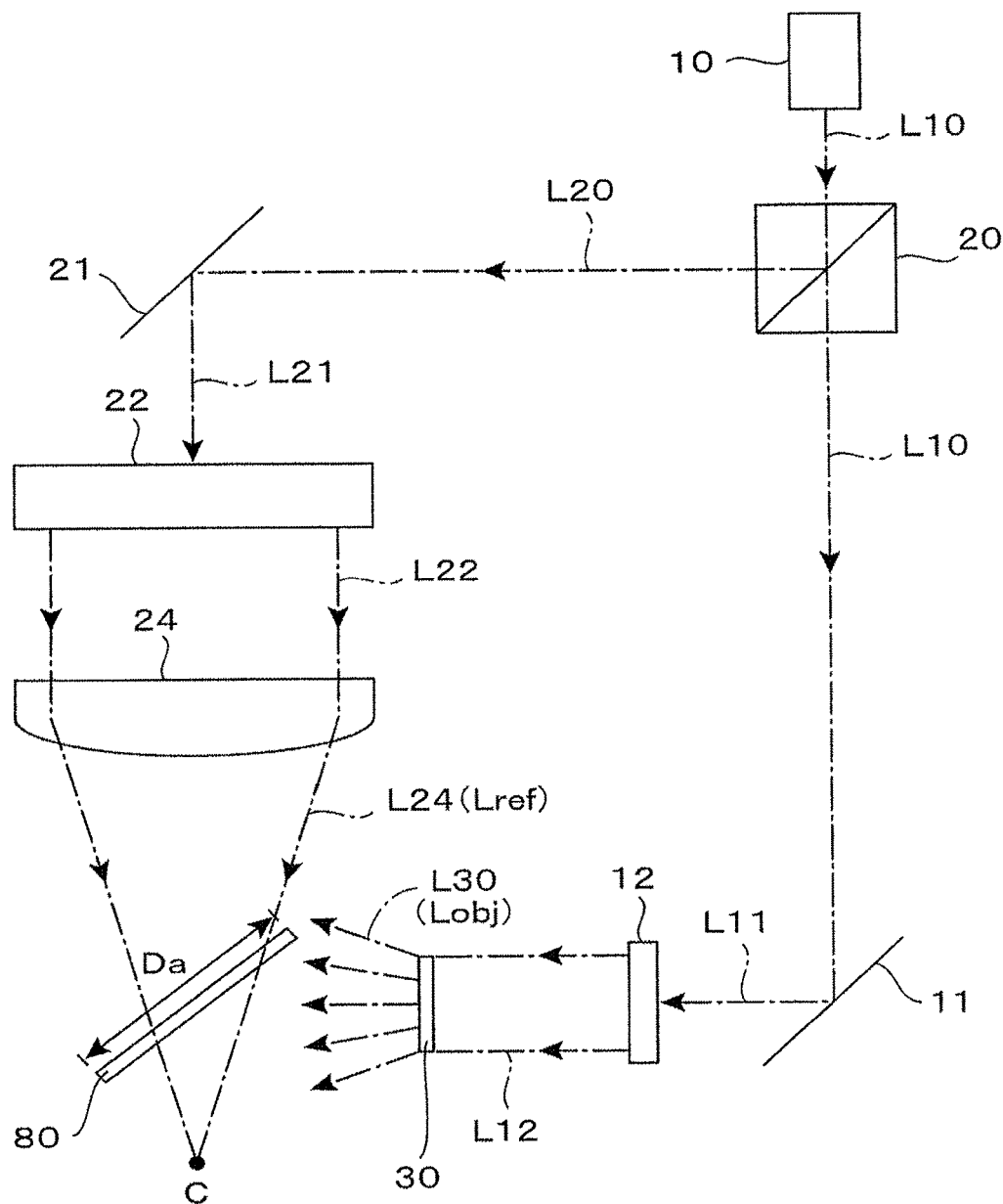
FIG. 21 is an optical system arrangement drawing showing a process of creating the band-shaped hologram recording medium 85 shown in FIG. 20.

The hologram recording medium 85 on the assumption of one-dimensional scanning can be created by using the optical system shown in FIG. 5, however, instead of this, it may also be created by using the optical system shown in FIG. 21 In the optical system shown in FIG. 21, the convex lens 23 in the optical system shown in FIG. 5 is replaced by a cylindrical lens 24, and the hologram photosensitive medium 40 having a rectangular plane is replaced by a hologram photosensitive medium 80 having a long and narrow band-shaped plane, and other components are the same. The lateral width Da of the hologram photosensitive medium 80 is equal to the lateral width of the hologram photosensitive medium 40, however, the longitudinal width Db (width in the direction perpendicular to the paper surface in FIG. 21) is approximate to the diameter of the light beam (approximately 1 mm in the example described above).

The cylindrical lens 24 is a lens having a columnar surface having a central axis perpendicular to the paper surface of FIG. 21, and in FIG. 21, when a condensing axis passing through the convergence point C and perpendicular to the paper surface is defined, the cylindrical lens performs a as function of condensing the parallel light flux L22 on the condensing axis. However, due to the properties of the cylindrical lens, light refraction occurs only within a plane parallel to the paper surface, and does not occur in the direction perpendicular to the paper surface. In other words, focusing attention on a plane (paper surface of FIG. 21) orthogonal to the central axis of the column of the cylindrical lens and including the convergence point C, the light L24 that two-dimensionally converges along this plane is given as reference light Lref.

Thus, in the present application, "light converges on the convergence point C" means not only three-dimensional convergence by the convex lens 23 shown in the optical system in FIG. 5, but also two-dimensional convergence by the cylindrical lens 24 shown in the optical system in FIG. 21. To create the hologram recording medium 85 on the assumption of one-dimensional scanning as illustrated in FIG. 20, as shown in the optical system in FIG. 21, by using a cylindrical lens 24 having a columnar surface whose central axis is parallel to a condensing axis passing through the convergence point C (axis passing through the convergence point C and perpendicular to the paper surface in the example shown in the drawing), a light flux L22 of substantially parallel coherent light is condensed on the condensing axis, and by using light L24 that two-dimensionally converges on the convergence point C as reference light Lref, the hologram image of the scatter body 30 is recorded.

<5-2> Hologram Recording Medium Consisting of CGH

The process of creating a hologram recording medium described above adopts a pure optical method in which light is actually irradiated onto a hologram photosensitive medium and interference fringes generated there are fixed by chemical change of the photosensitive medium. On the other hand, recently, a method in which this optical process is simulated on a computer, information on interference fringes is calculated by carrying out an arithmetic operation, and results of the calculation are fixed onto a medium by a certain physical means, has been established. A hologram created by this method is generally called a computer generated hologram (CGH).

The hologram recorded on the hologram recording medium used in the present invention may be such a computer generated hologram. Specifically, instead of creating a hologram recording medium by the optical process described in Section 1, a simulation operation using virtual object light from a virtual scatter body and virtual reference light is carried out to obtain information on interference fringes generated on a virtual recording surface, and this information is recorded on a medium by a physical method, whereby creating a computer generated hologram.

Figure 22:
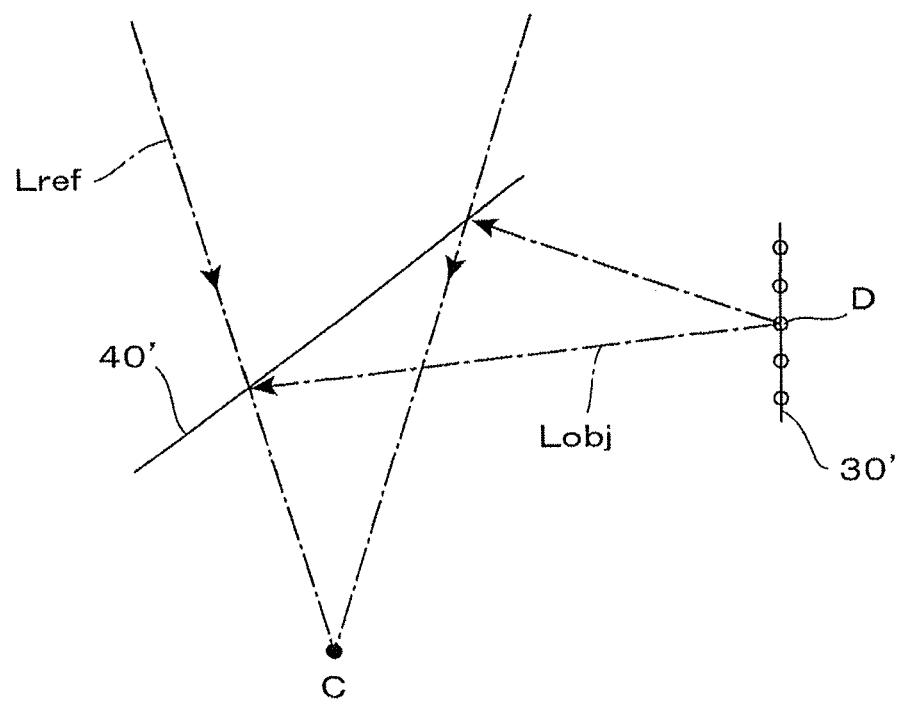
FIG. 22 is a side view showing the principle of creating a hologram recording medium as a component of a scanner apparatus according to the present invention by means of CGH.

FIG. 22 is a side view showing the principle of creating a hologram recording medium as a component of the illumination unit according to the present invention by means of CGH, and illustrates a method of simulating the optical phenomenon shown in FIG. 8 on a computer. Here, the virtual scatter body 30' shown in FIG. 22 corresponds to the real scatter body 30 shown in FIG. 8, and the virtual recording surface 40' shown in FIG. 22 corresponds to the real hologram photosensitive medium 40 shown in FIG. 8. The illustrated object light Lobj is virtual light emitted from the virtual scattered plate 30', and the illustrated reference light Lref is virtual light with the same wavelength as that of the object light Lobj. This method is completely the same as the method described above in that reference light Lref is light that converges on the convergence point C. At the respective points on the recording surface 40', information on interference fringes of the virtual object light Lobj and reference light Lref is arithmetically operated.

Figure 23:
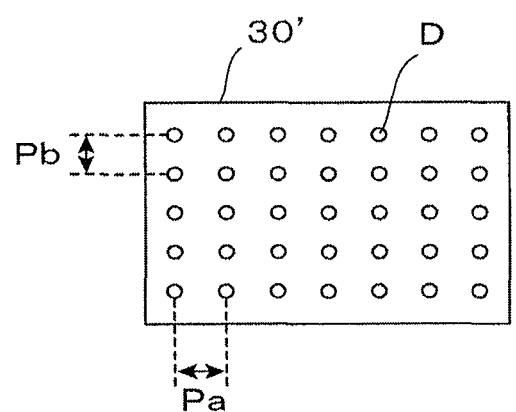
FIG. 23 is a front view of a virtual scatter body 30' shown in FIG. 22.

As the virtual scatter body 30', for example, a fine three-dimensional shape model expressed by a polygon, etc., can be used, however, here, a simple model including a large number of point light sources D aligned in a grid pattern on a plane is used. FIG. 23 is a front view of the virtual scatter body 30' shown in FIG. 22, and small white circles indicate point light sources D, respectively. As illustrated, a large number of point light sources D are aligned in a grid pattern at a pitch Pa horizontally and a pitch Pb vertically. The pitches Pa and Pb are parameters that determine the surface roughness of the scatter body.

The inventor of the present invention set the pitches Pa and Pb of the point light sources D to approximately the size of 10 μm and arithmetically operated information on interference fringes generated on the recording surface 40', and based on the results, formed an uneven pattern on the real medium surface to create a surface relief CGH. Then, when an illumination unit 100 was configured by using this CGH as the hologram recording medium 45, an excellent illumination environment in which speckles were reduced was obtained.

Figures 24, 25:
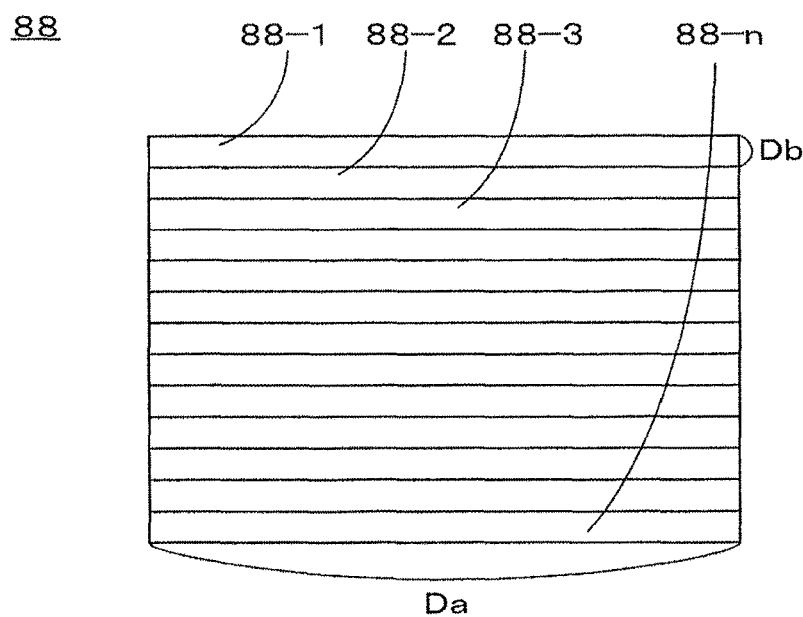
FIG. 24 is a table showing experimental results in which a speckle reducing effect is obtained according to the present invention.
FIG. 25 is a plan view showing a hologram recording medium 88 to be used in a modification of a scanner apparatus according to the present invention.

FIG. 24 is a table showing experiment results in which a speckle reducing effect was obtained by the present invention. Generally, a method using numerical values called speckle contrasts (unit: %) as parameters showing the degrees of speckles generated on a light receiving surface R is proposed. The speckle contrast is defined as a numerical value obtained by dividing the standard deviation in brightness unevenness actually generated by a brightness average value in a condition where a uniform brightness distribution should normally be obtained. As the speckle contrast value becomes larger, the degree of speckle generation on the light receiving surface becomes higher, and a spot-like pattern of brightness unevenness is more conspicuously presented to an observer.

The table of FIG. 24 shows results of measurement of speckle contrasts on an upper surface of the placing stage 210 obtained by using four measuring systems utilizing the illumination unit 100 shown in FIG. 13 or a conventional illumination unit in contrast, to illuminate the placing stage 210. The measurement examples 1 to 3 each show results obtained by using the same DPSS laser device capable of emitting green laser light as the coherent light source 50 in the illumination unit 100. A diffusion angle of the hologram recording media used in the measurements (a maximum view angle from a point on the hologram recording media toward the reproduction image 35) is set to 20° in both the examples 2 and 3.

First, the measurement result shown as the measurement example 1 was obtained by using, instead of the illumination unit 100 shown in FIG. 13, a measuring system in which the light beam L50 from the coherent light source 50 is expanded to become a parallel light flux by the beam expander and this parallel light flux (laser parallel light) is directly irradiated onto the placing stage 210. In this case, as shown in the table, a speckle contrast of 20.1% was obtained. This shows a state where a spot-like pattern of brightness unevenness is very clearly observed on the placing stage 210 by the naked eye, which is an unsuitable level for a practical three-dimensional shape measurement.

On the other hand, the measurement results shown as measurement examples 2 and 3 were both obtained by carrying out illumination by utilizing the illumination unit 100 shown in FIG. 13. Here, the measurement example 2 shows a result obtained by utilizing a volume hologram created by an optical method as the hologram recording medium 45, and the measurement example 3 shows a result obtained by utilizing a surface relief CGH described above as the hologram recording medium 45. In these results, speckle contrasts lower than 4% were obtained, and this shows an extremely excellent state where a pattern of brightness unevenness is hardly observed by the naked eye (it is generally said that a feeling of discomfort is not given to an observer if the speckle contrast is not more than 5%). Therefore, in both of the case where a volume hologram created by an optical method is utilized and the case where a surface relief CGH is utilized as the hologram recording medium 45, a practically satisfactory three-dimensional shape measuring apparatus can be configured. The reason why a result (3.0%) better than the result (3.7%) of the measurement result 3 was obtained in the measurement example 2 is considered that the resolution of the real scatter body 30 that becomes the original image is higher than the resolution of the virtual scatter body 30' (a collection of point light sources shown in FIG. 23).

The measurement result shown as the last measurement example 4 was obtained by using a measuring system in which light from a green LED light source is directly irradiated onto the placing stage 210 instead of using the illumination unit 100. Originally, an LED light source is not a coherent light source, so that it is not necessary to consider the problem of occurrence of speckles, and as shown in the table, an excellent result of a speckle contrast of 4.0% was obtained. A reason why the result of the measurement example 4 using incoherent light is inferior to the results of measurement examples 2 and 3 using coherent light is considered that brightness unevenness occurred in light itself emitted by the LED light source.

<5-3> Scanning Mode of Line Pattern U

In the apparatus for measuring a three-dimensional shape of an object according to a basic embodiment shown in FIG. 3, a pattern scanning mechanism 200 is provided. The pattern scanning mechanism 200 shown herein includes a placing stage 210 for placing an object M thereon, and a conveyance device 220 that moves this placing stage 210 in a direction orthogonal to a line constituting the line pattern U. Specifically, in FIG. 1, by moving the placing stage 210 in the direction of the white arrow, the object M is scanned by the line pattern U.

However, the configuration of the pattern scanning mechanism 200 is not limited to the configuration of the example described above. For example, the conveyance device 220 is required to have a function of moving one of the illumination unit 100 and the placing stage 210 with respect to the other. Therefore, instead of moving the placing stage 210, the illumination unit 100 may be moved in the direction orthogonal to a line constituting the line pattern U with respect to the placing stage 210.

As the pattern scanning mechanism 200, a mechanical device as in the example described above does not necessarily have to be adopted, and an optical scanning mechanism may also be adopted. For example, by configuring the pattern scanning mechanism 200 by an optical system (for example, a polygon mirror) that changes the direction of reproduction light of a hologram obtained from the illumination unit 100, the line pattern U to be projected by the reproduction light can be optically scanned in the direction orthogonal to a line constituting the line pattern U.

In another method for scanning the line pattern U to be projected onto the object M, the hologram recording medium is divided in advance into a plurality of divided regions, and different holograms for producing different reproduction images of the line pattern U at different positions are recorded in the respective divided regions. Specifically, the line pattern U to be projected onto the object M is formed by reproduction light of a hologram obtained from the hologram recording medium, so that a plurality of holograms for producing reproduction images at respective different positions are recorded in advance, and by reproducing these in order, scanning substantially equivalent to scanning to be carried out by the pattern scanning mechanism 200 described above is carried out.

FIG. 25 is a plan view showing a hologram recording medium 88 to be used in such a modification. As illustrated, the hologram recording medium 88 is divided into a plurality of n divided regions 88-1, 88-2, 88-3, . . . , 88-n, and in the respective divided regions 88-1, 88-2, 88-3, . . . , 88-n, images of the linear scatter body 30 shown in FIG. 4 are recorded, respectively.

As described in <5-1> above, on the assumption of one-dimensional scanning by a light beam, by carrying out recording on the hologram photosensitive medium 80 having a long and narrow band-shaped plane by the recording method using the cylindrical lens 24 shown in FIG. 21, the long and narrow hologram recording medium 85 having the longitudinal width Db as shown in FIG. 20 can be created. The hologram recording medium 88 shown in FIG. 25 is equivalent to, so-called, n band-shaped hologram recording media 85 shown in FIG. 20 arranged vertically. In actuality, the interference fringes of holograms recorded in the respective divided regions 88-1, 88-2, 88-3, . . . , 88-n are the same as the interference fringes recorded on the band-shaped hologram recording medium 85 shown in FIG. 20.

As compared with the hologram recording medium 45 used in the basic embodiment that has been described so far, in the case of the hologram recording medium 88 shown in FIG. 25, the position of the reproduction image 35 differs. Specifically, when carrying out reproduction by using the former hologram recording medium, as shown in FIG. 16, whichever position on the medium a light beam is irradiated onto, the position at which the reproduction image 35 is produced is the same. This is because an image of the linear scatter body 30 is recorded on the entire surface of the hologram recording medium 45. On the other hand, when carrying out reproduction by using the latter hologram recording medium, depending on a divided region onto which a light beam is irradiated, the position at which the reproduction image 35 is produced differs. This is because separate independent images of the linear scatter body 30 are recorded in the divided regions, respectively.

Figure 26:
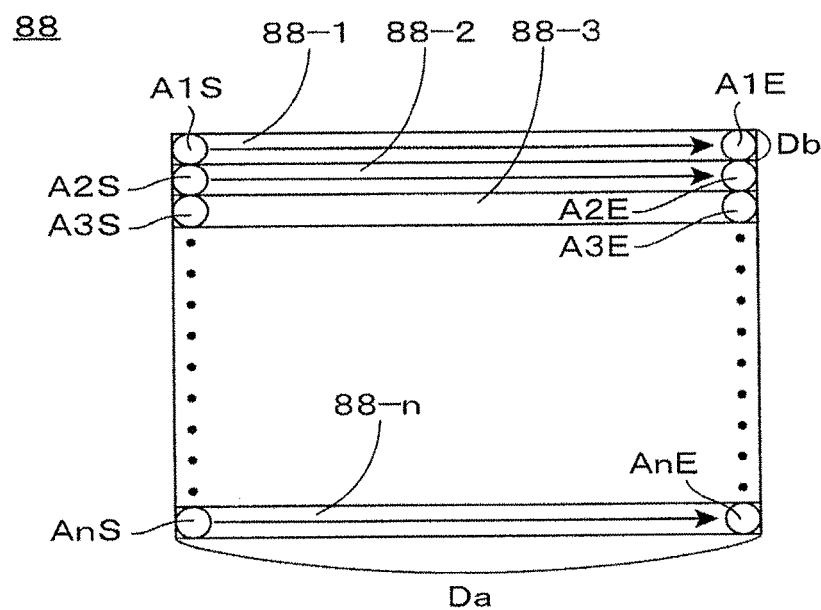
FIG. 26 is a plan view showing a scanning mode of a light beam on the hologram recording medium 88 shown in FIG. 25.

FIG. 26 is a plan view showing a scanning mode of a light beam on the hologram recording medium 88 shown in FIG. 25. For example, when reproduction is carried out for the first divided region 88-1, this divided region 88-1 is scanned from the start region A1S to the end region A1E in the horizontal direction, and a reproduction image to be produced at this time forms a first line pattern U1 shown in FIG. 27. When reproduction is carried out for the second divided region 88-2, the divided region 88-2 is scanned from the start region A2S to the end region A2E in the horizontal direction, and a reproduction image to be produced at this time forms a second line pattern U2 shown in FIG. 27. The same operation is applied to the subsequent regions, and last, when reproduction is carried out for the n-th divided region 88-n, this divided region 88-n is scanned from the start region AnS to the end region AnE in the horizontal direction, and a reproduction image to be produced at this time forms an n-th line pattern Un shown in FIG. 27.

Finally, by reproduction lights of holograms obtained from the respective divided regions 88-1, 88-2, 88-3, . . . , 88-n, line patterns U1, U2, U3, . . . , Un each consisting of one line are projected. In other words, a line pattern projected by reproduction light of a hologram obtained from an arbitrary divided region and a line pattern projected by reproduction light of a hologram obtained from another arbitrary divided region are formed at spatially different positions.

Figure 27:
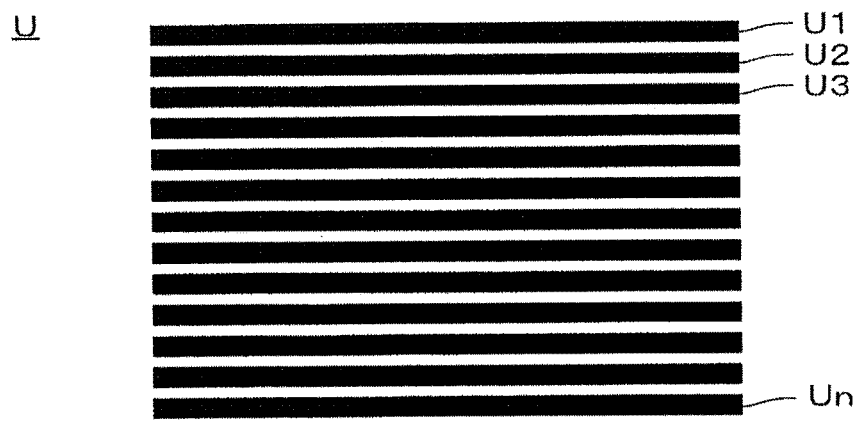
FIG. 27 is a plan view showing a line pattern U to be formed on a light receiving surface R on the placing stage 210 by a reproduction image of the hologram recording medium 88 shown in FIG. 25.

Therefore, as shown in FIG. 26, when all divided regions of the hologram recording medium 88 are scanned with a light beam, a unified line pattern U consisting of n line patterns U1, U2, U3, . . . , Un is formed on the placing stage 210 as shown in FIG. 27, however, in actuality, this unified line pattern U does not appear entirely simultaneously, but successively appears in order of lines.

Assuming that, in the illumination unit 100 shown in FIG. 13, the hologram recording medium 88 shown in FIG. 25 is used instead of the hologram recording medium 45, and as shown in FIG. 26, by the light beam scanning device 60, the divided regions are scanned with a light beam in such an order of the first divided region 88-1, the second divided region 88-2, the third divided region 88-3, . . . .

In this case, while the light beam scans the i-th=1, 2, 3, . . . ) divided region 88-i, an i-th line pattern Ui is projected on an i-th position in space. Specifically, line patterns Ui each consisting of one line appear in order in such a manner that the first line pattern U1 shown in FIG. 27 appears while the first divided region 88-1 is scanned, and the second line pattern U2 shown in FIG. 27 appears while the second divided region 88-2 is scanned, and so forth. This is the same as scanning the object M with the line pattern Ui.

In the above-described example, an image of one linear scatter body 30 is recorded in each of the divided regions, however, it is also possible that an image of a plurality of linear scatter bodies 30 is recorded in each of the divided regions. In this case, while the i-th (i=1, 2, 3 . . . ) divided region 88-i is scanned with a light beam, a line pattern Ui consisting of a plurality of lines is projected on the i-th position in space.

Thus, by carrying out scanning as shown in FIG. 26 with the light beam scanning device 60 on the hologram recording medium 88 shown in FIG. 25, the light beam scanning device 60 commonly serves as the pattern scanning mechanism 200 in the basic embodiment described above, Therefore, it becomes unnecessary to provide the pattern scanning mechanism 200 separately.

The n divided regions formed on the hologram recording medium 88 may be regions respectively having arbitrary shapes, in theory. However, to record an image of a long and narrow linear scatter body 30 as shown in FIG. 4, in practical use, as in the example shown in FIG. 25, preferably, a plurality of horizontally long and narrow divided regions 88-1, 88-2, 88-3, . . . , 88-n are formed so as to be arranged vertically, and hologram recording is carried out so that the longitudinal directions of the respective divided regions 88-1, 88-2, 88-3, . . . , 88-n and the longitudinal directions of reproduction images 35 obtained from the respective divided regions 88-1, 88-2, 88-3, . . . , 88-n become parallel to each other. The reason for this is that diffraction performance (performance showing what angle the incident light can be refracted at) of interference fringes recorded on the hologram recording medium is limited, and recording a long and narrow original image in a long and narrow recording region upon matching their longitudinal directions is more efficient.

<5-4> Shape of Line Pattern U

In <5-3> described above, an embodiment on the assumption that a line pattern projected onto an object M is scanned is described, however, in an apparatus for measuring a three-dimensional shape of an object according to the present invention, scanning of a line pattern is not always required (of course, scanning of a light beam is required for reducing speckles. In the present invention, scanning of a light beam on a hologram recording medium and scanning of a line pattern on an object M are completely different from each other).

The reason for scanning a line pattern in the embodiment that has been described so far is for measuring an entire shape of an object M on the assumption that the line pattern consists of one line. For example, in the example shown in FIG. 1, unless scanning of a line pattern U is carried out, only the shape of the portion along the circumference passing through the tip of the semispherical object M can be measured. The entire shape of the object M can be measured only by scanning the line pattern U on the object M in the direction of the white arrow of the drawing.

However, the line pattern does not necessarily have to consist of one line. Specifically, by recording an original image originally consisting of a plurality of lines on a hologram recording medium, a hologram reproduction image also becomes a line pattern consisting of a plurality of lines, so that the line pattern of stripes consisting of a plurality of lines is projected onto the object M at one time. Therefore, even without scanning the line pattern on the object M, the entire shape of the object M can be measured.

Figure 28:
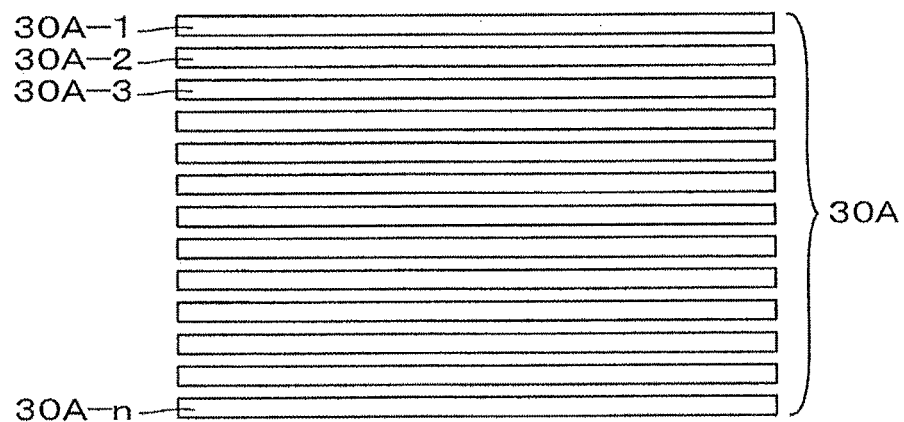
FIG. 28 is a plan view showing a shape of a first scatter body 30A to be recorded on a hologram recording medium to be used in a scanner apparatus according to a modification of the present invention.

FIG. 28 is a plan view showing a shape of a scatter body 30A to be recorded on a hologram recording medium to be used in such a modification. In the basic embodiment that has been described so far, one long and narrow linear scatter body 30 shown in FIG. 4 is recorded as a hologram, and a reproduction image thereof is utilized as a line pattern U, however, the scatter body to be recorded as a hologram does not necessarily have to be one linear scatter body, but may be a plurality of linear scatter bodies.

The scatter body 30A shown in FIG. 28 is a collective scatter body that should be called a horizontal grid-like scatter body consisting of a plurality of n linear scatter bodies 30A-1, 30A-2, 30A-3, . . . , 30A-n parallel to each other. By carrying out reproduction by using a hologram recording medium on which this scatter body 30A is recorded as a hologram, a line pattern U including a plurality of n lines U1, U2, U3, . . . , Un parallel to each other can be projected by reproduction light of the hologram. Specifically, a line pattern U of stripes as shown in FIG. 27 can be projected onto the object M, and the object M onto the surface of which the stripes are projected can be imaged with the imaging unit 300. The shape analysis unit 400 creates three-dimensional shape data T showing the entire shape of the object M by analyzing the shape of the stripes projected onto the object M on the captured image.

Figure 29:
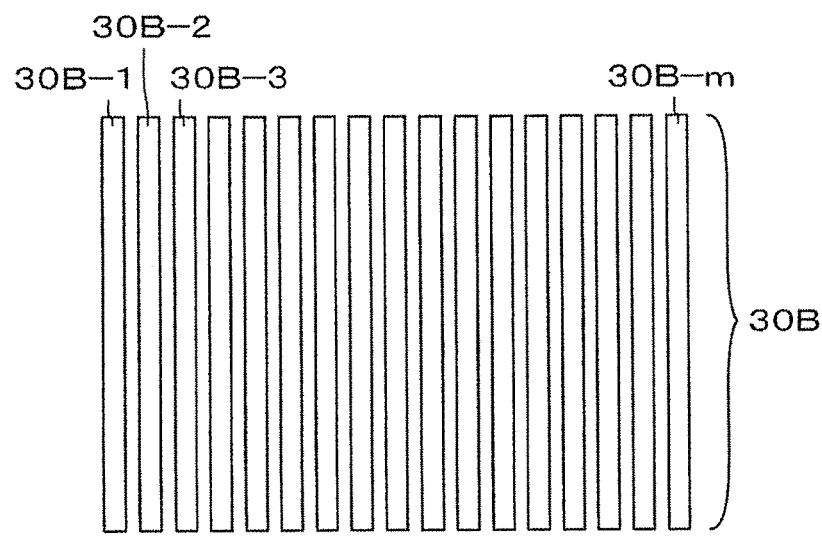
FIG. 29 is a plan view showing a shape of a second scatter body 30B to be recorded on the hologram recording medium to be used in the scanner apparatus according to the modification of the present invention.

Of course, instead of the stripes shown in FIG. 27, a reticulated grid-like line pattern including vertical and horizontal stripes crossing each other can be projected. In detail, an image of the horizontal grid-like scatter body 30A consisting of n linear scatter bodies 30A-1, 30A-2, 30A-3, . . . , 30A-n extending horizontally and arranged parallel to each other vertically as shown in FIG. 28, and an image of the vertical grid-like scatter body 30B consisting of in linear scatter bodies 30B-1, 30B-2, 30B-3, . . . , 30B-m extending vertically and arranged parallel to each other horizontally as shown in FIG. 29, are superimposed and recorded on the hologram recording medium.

By carrying out reproduction by using the hologram recording medium on which the scatter bodies 30A and 30B are thus superimposed and recorded as a hologram, a reticulated grid-like line pattern including vertical stripes and horizontal stripes overlapping each other can be projected by reproduction light of the hologram. The imaging unit 300 can image the object M onto the surface of which such a reticulated grid-like pattern is projected, so that the shape analysis unit 400 can create three-dimensional shape data T showing the entire shape of the object M by analyzing the shape of the reticulated grid-like pattern projected onto the object M on the captured image.

To superimpose and record the horizontal grid-like scatter body 30A and the vertical grid-like scatter body 30B as a hologram, the process of recording a hologram is repeatedly applied twice to the same hologram photosensitive medium 40 by using the optical system as shown in FIG. 5. Specifically, first, a process of recording the horizontal grid-like scatter body 30A shown in FIG. 28 is carried out, and second, a process of recording the vertical grid-like scatter body 30B shown in FIG. 29 is carried out. Alternately, a layer on which the horizontal grid-like scatter body 30A is recorded and a layer on which the vertical grid-like scatter body 30B is recorded are prepared separately, and are stuck together.

Figure 30:
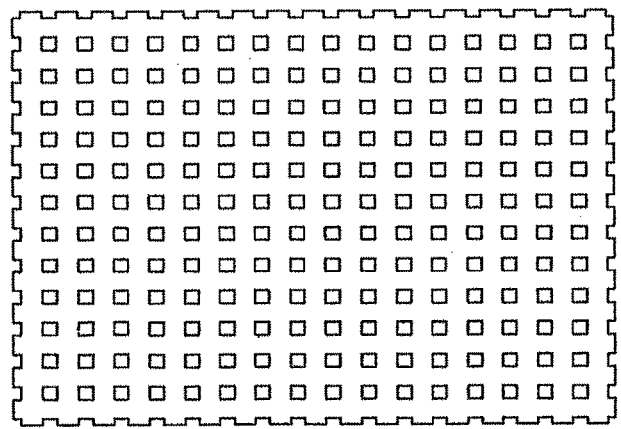
FIG. 30 is a plan view showing a shape of a third scatter body 30C to be recorded on the hologram recording medium to be used in the scanner apparatus according to the modification of the present invention.

As another method for projecting a reticulated grid-like line pattern, it is also possible that a reticulated grid-like scatter body 30C as shown in FIG. 30 is prepared in advance, and an image of this reticulated grid-like scatter body 30C is recorded on the hologram recording medium. In this case, by reproduction light of the hologram, a reticulated grid-like line pattern is also projected.

Thus, the line pattern U to be projected onto the object M in the present invention does not necessarily have to be a pattern consisting of one line as shown in FIG. 1, and may be a stripe pattern consisting of a plurality of lines as shown in FIG. 27, or may be a reticulated grid-like pattern obtained by superimposing vertical and horizontal stripe patterns. By projecting a stripe pattern or a reticulated grid-like pattern onto the object M, the entire shape of the object M can be measured without using the pattern scanning mechanism 200.

Of course, if necessary, the pattern scanning mechanism 200 is further provided and a stripe pattern or a reticulated grid-like pattern is scanned on the object M. For example, in the state where a line pattern U consisting of stripes shown in FIG. 27 is projected, by scanning the whole of this line pattern U downward in the drawing so that a new pattern U1 after scanning comes to the position below the pattern Un, line pattern projection covering a wider region is realized.

Alternatively, it is also possible that a hologram recording medium from which a line pattern U consisting of only odd-numbered patterns U1, U3, U5 . . . is reproduced is prepared by removing even-numbered patterns U2, U4, U6 . . . from the line pattern U including n lines shown in FIG. 27, and by carrying out scanning by using the pattern scanning mechanism 200, the odd-numbered patterns U1, U3, U5 . . . are moved to the positions of the removed even-numbered patterns U2, U4, U6 . . . so that the line pattern U including n lines is projected as a result.

Thus, the line pattern U to be used in the present invention may be any line pattern as long as it includes a line component. The shape analysis unit 400 can create three-dimensional shape data T by analyzing the line component projected onto the object M.

Therefore, the scatter body to be recorded on the hologram recording medium is not limited to the linear scatter body 30 as shown in FIG. 4, but may have any shape as long as the shape is usable as a line pattern U. The scatter body 30A shown in FIG. 28, the scatter body 30B shown in FIG. 29, and the scatter body 30C shown in FIG. 30 are examples of such a scatter body. Finally, in the present invention, an image of a scatter body having a shape corresponding to a line pattern U including a line component is recorded on a hologram recording medium.

The scatter bodies 30A, 30B, and 30C shaped as shown in FIG. 28 to FIG. 30 can be created by combining a plurality of the linear scatter bodies 30 shown in FIG. 4. In practical use, one scatter plate (for example, a plate generally called an optical diffuser plate such as an opal glass plate) on the upper surface of which a mask that shields light in partial regions is superimposed is used as an original image of a scatter body.

For example, to record an image of the scatter body 30A shown in FIG. 28, a mask that transmits light only in regions corresponding to the illustrated linear scatter bodies 30A-1, 30A-2, 30A-3, . . . , 30A-n and shields light in other regions is prepared, and a translucent scatter plate on the upper surface of which the mask is covered is used as the scatter body 30 shown in FIG. 5 to carry out hologram recording. The same applies to recording of an image of the scatter body 30B shown in FIG. 29 or the scatter body 30C shown in FIG. 30. Also in the case of recording an image of, the linear scatter body 30 shown in FIG. 4, a mask that transmits light in only a long and narrow slit region is superimposed on the upper surface of a translucent scatter plate and used for recording.

<5-5> Geometric Variation for Creating Hologram Recording Medium

In Section 2, a method for recording a hologram image of the scatter body 30 on the hologram photosensitive medium 40 is described with reference to FIG. 5. This method is a method for creating a reflection type hologram recording medium by using reference light that converges on the convergence point C, and the geometric arrangement of necessary components is as shown in the side view of FIG. 31.

Figure 31:
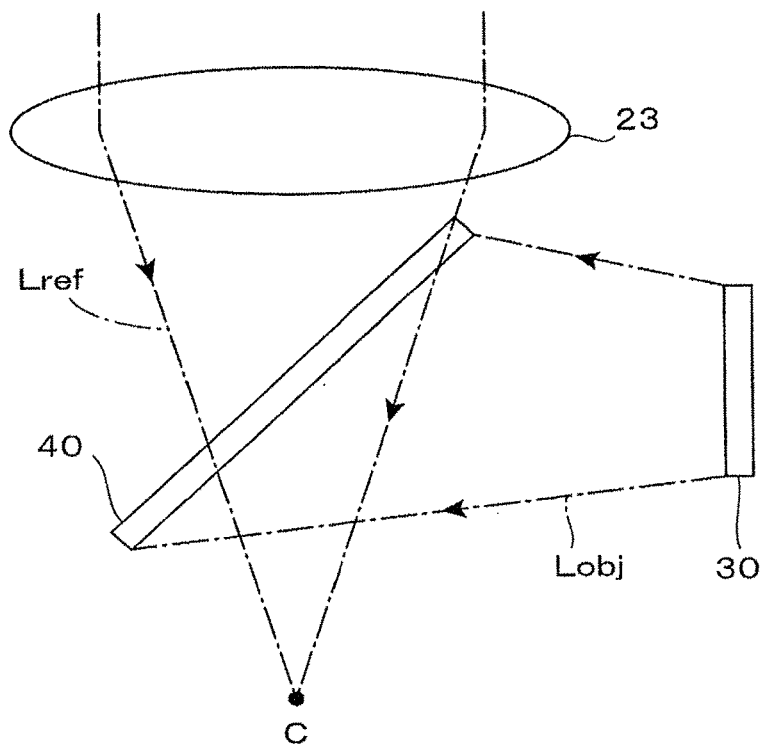
FIG. 31 is a side view showing a process of creating a reflection type hologram recording medium by using convergent reference light.
Figure 32:
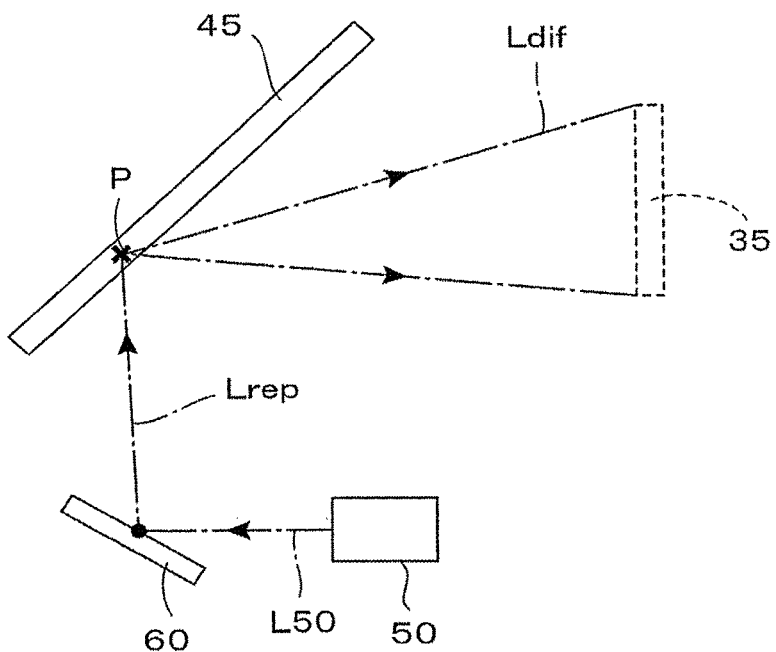
FIG. 32 is a side view showing a reproduction process of the reflection type hologram recording medium 45 created by the method shown in FIG. 31.

In the example shown in FIG. 31, the convergent reference light Lref advancing toward the convergence point C is produced by the convex lens 23, and the medium 40 is disposed between the convex lens 23 and the convergence point C. The medium 40 is disposed obliquely as illustrated, and onto the lower surface side thereof, object light Lobj from the scatter body 30 is irradiated. The hologram recording medium created by this method becomes a reflection type medium. Specifically, when carrying out reproduction, as shown in FIG. 32, a light beam that functions as illumination light for reproduction Lrep is irradiated onto the lower surface side of the medium 45, and the reproduction image 35 is produced by reflected diffracted light Ldif from the point P.

Thus, in the examples described above, a hologram recorded on the hologram recording medium 45 is a reflection type hologram, and reflected diffracted light of a light beam is used as illumination light. On the other hand, it is also possible that a hologram recorded on the hologram recording medium 45 is a transmission type hologram, and transmitted diffracted light of the light beam is used as illumination light.

Figure 33:
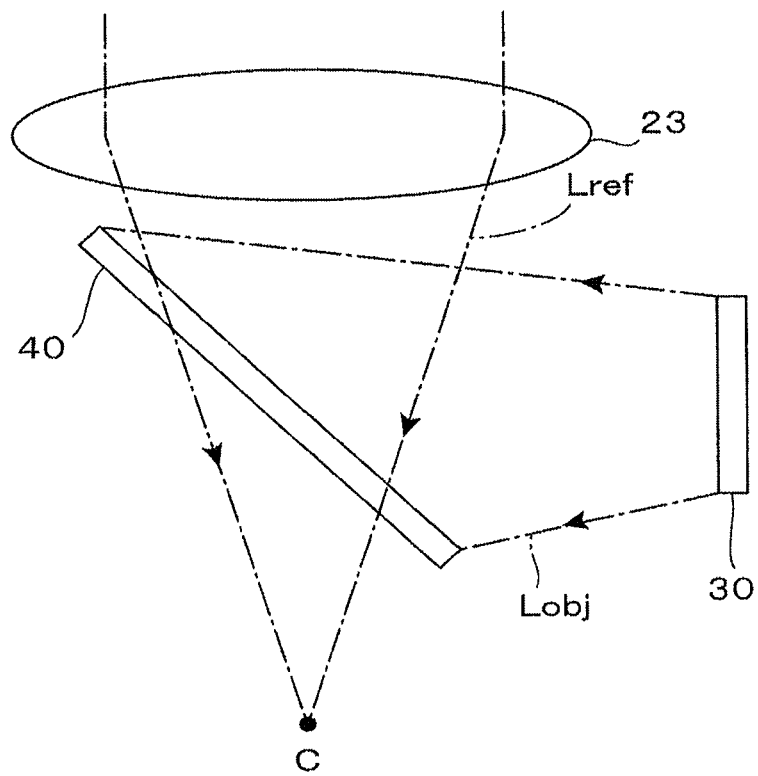
FIG. 33 is a side view showing a process of creating a transmission type hologram recording medium by using convergent reference light.
Figure 34:
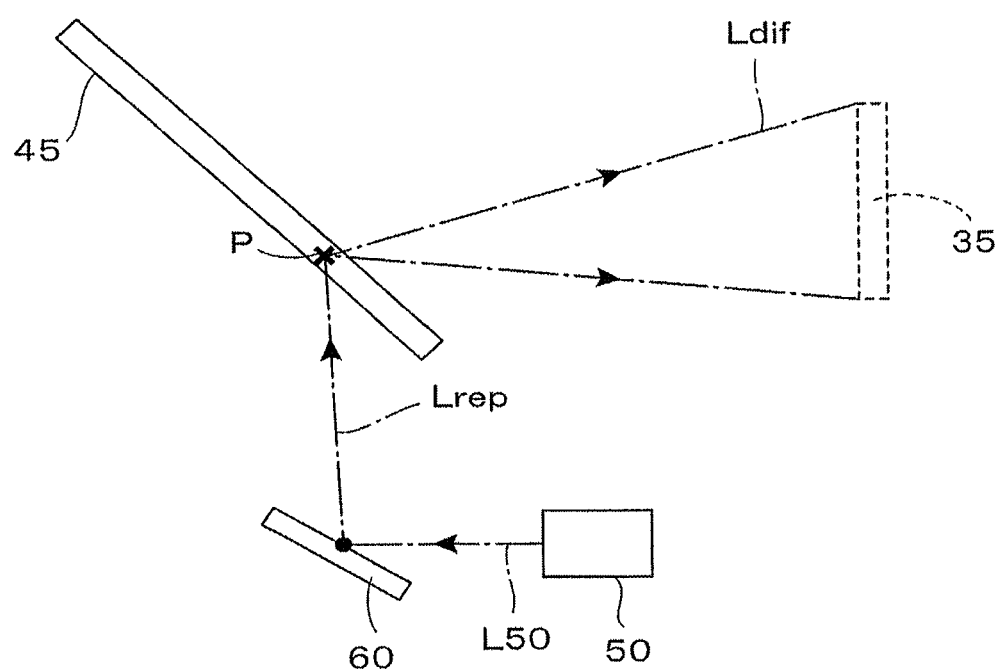
FIG. 34 is a side view showing a reproduction process of the transmission type hologram recording medium 45 created by the method shown in FIG. 33.

FIG. 33 is a side view showing geometric arrangement when creating such a transmission type hologram. The difference from the arrangement shown in FIG. 31 is the orientation of the medium 40. In the method for creating a reflection type hologram shown in FIG. 31, reference light Lref is irradiated onto the upper surface of the medium, and object light Lobj is irradiated onto the lower surface of the medium. By thus irradiating the reference light and the object light onto surfaces on the sides opposite to each other, a reflection type hologram can be recorded. On the other hand, in the method shown in FIG. 33, both of the reference light Lref and the object light Lobj are irradiated onto the upper surface of the medium 40. Thus, by irradiating reference light and object light from the same side, a transmission type hologram can be recorded. Specifically, when carrying out reproduction, as shown in FIG. 34, a light beam functioning as illumination light for reproduction Lrep is irradiated onto the lower surface side of the medium 45, and the reproduction image 35 is produced by transmitted diffracted light Ldif from the point P.

Although the examples described above are methods for creating a reflection type or transmission type hologram recording medium by using reference light that converges on the convergence point C, a reflection type or transmission type hologram recording medium can also be created by using reference light that diverges from the convergence point C instead. However, in this case, a preparatory hologram recording medium must be created in advance. Hereinafter, a description is given of processes for carrying out this method in order.

Figure 35:
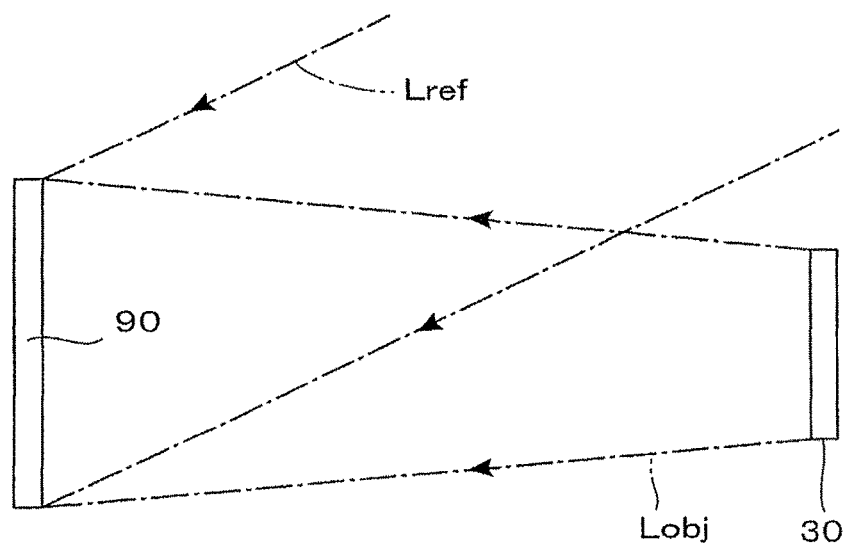
FIG. 35 is a side view showing a preparation process when a hologram recording medium is created by using divergent reference light.

First, as shown in FIG. 35, the preparatory hologram photosensitive medium 90 and the scatter body 30 are disposed, and parallel reference light Lref is irradiated onto the medium 90 obliquely from the upper right as illustrated. Then, interference fringes generated by the object light Lobj from the scatter body 30 and the reference light Lref are recorded on the medium 90. Thus, when carrying out recording, by irradiating object light and reference light from the same side, a transmission type hologram is recorded. Here, the medium 90 onto which a hologram is thus recorded is referred to as a preparatory hologram recording medium 95.

Figure 36:
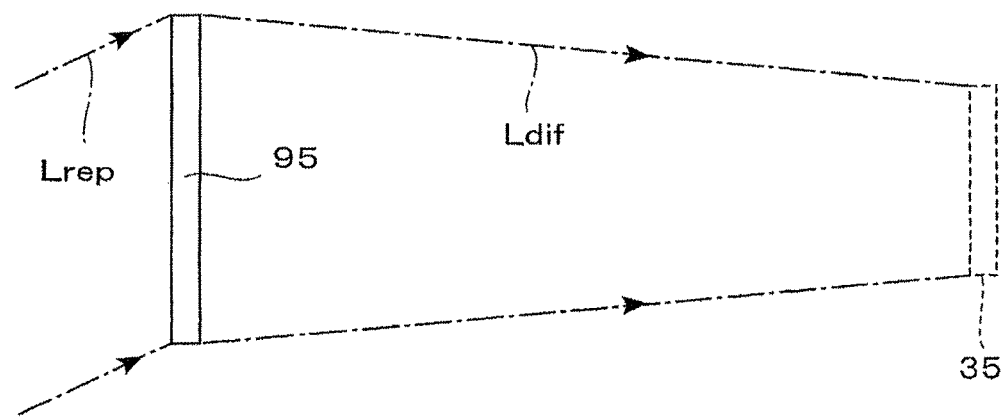
FIG. 36 is a side view showing a reproduction process of the preparatory hologram recording medium 95 created in the preparation process shown in FIG. 35.

FIG. 36 is a side view showing a reproduction process of the preparatory hologram recording medium 95. As illustrated, when parallel illumination light for reproduction Lrep is irradiated obliquely onto the medium 95 from the lower left, by transmitted diffracted light Ldif, the reproduction image 35 is produced on the right side in the drawing. Here, the extension of the direction of the illumination light for reproduction Lrep matches the direction of the reference light Lref shown in FIG. 35, and the production position of the reproduction image 35 matches the position at which the scatter body 30 is disposed shown in FIG. 35.

Figure 37:
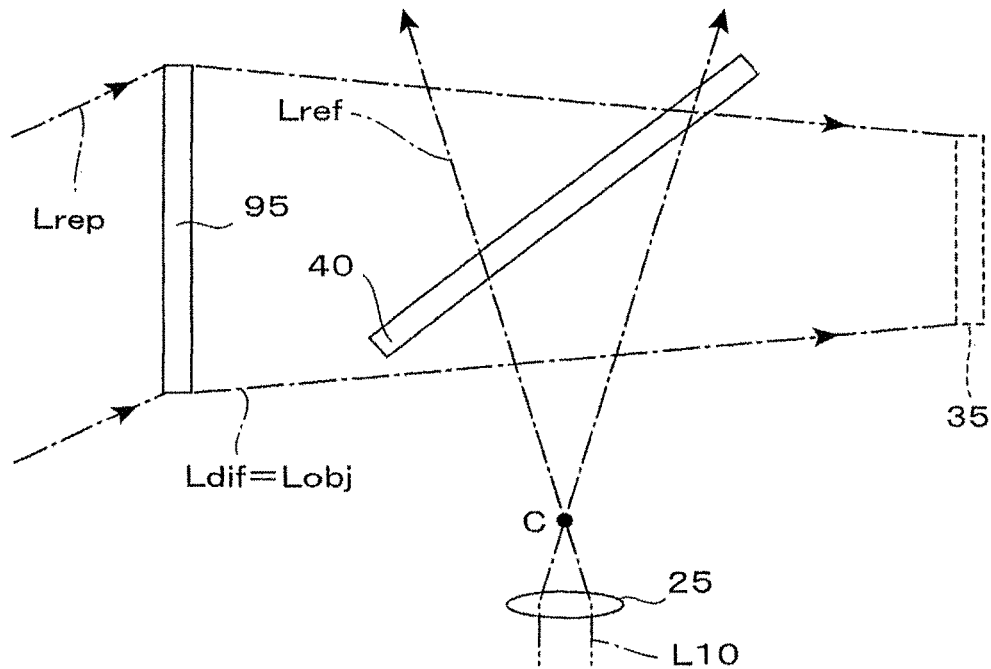
FIG. 37 is a side view showing a process of creating a reflection type hologram recording medium by using divergent reference light.

Subsequently, a process of recording an image of the scatter body 30 on the hologram photosensitive medium 40 by using the reproduction image 35 generated by the preparatory hologram recording medium 95 as a substitute for the real scatter body 30 is carried out. Specifically, as shown in FIG. 37, the hologram photosensitive medium 40 is disposed on the right side of the preparatory hologram recording medium 95, and by irradiating parallel illumination light for reproduction Lrep onto the medium 95 obliquely from the lower left, the reproduction image 35 is produced on the right side in the drawing. In this case, the light emitting rightward from the medium 95 is transmitted diffracted light Ldif for reproducing the reproduction image 35 and at the same time, functions as object light Lobj for the medium 40.

On the other hand, from the lower side in the drawing, divergent reference light Lref is irradiated onto the medium 40. This divergent reference light Lref is light diverging from the convergence point C (when a point light source is present on the convergence point C, light output from this point light source), and a bundle of rays diffusing in a conical shape is irradiated onto the medium 40. In the illustrated example, by producing a point light source by condensing the parallel light flux L10 on the convergence point C by the convex lens 25 having a focal point at the position of the convergence point C, divergent reference light Lref is generated. By using, for example, a microlens with a diameter of approximately 1 mm as the convex lens 25, divergent reference light Lref can be generated by utilizing a laser beam with a sectional diameter of approximately 1 mm output from the laser light source as the parallel light flux L10.

In the method shown in FIG. 37, the object light Lobj is irradiated onto the upper surface of the medium 40, and the reference light Lref is irradiated onto the lower surface of the medium 40. By thus irradiating reference light and object light onto surfaces on the sides opposite to each other, a reflection type hologram can be recorded. Therefore, the hologram recording medium 45 created by the method shown in FIG. 37 is substantially the same reflection type hologram as the hologram recording medium 45 created by the method shown in FIG. 31. Therefore, when carrying out reproduction, the geometric arrangement shown in FIG. 32 is adopted.

Figure 38:
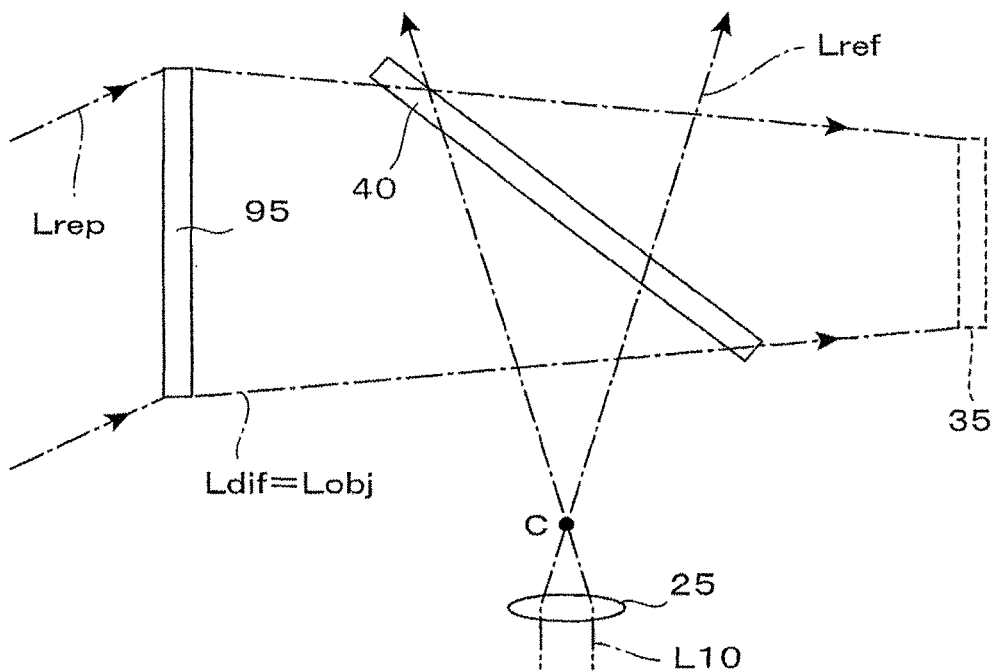
FIG. 38 is a side view showing a process of creating a transmission type hologram recording medium by using divergent reference light.

On the other hand, FIG. 38 is a side view showing an example in which a transmission type hologram is created by using divergent reference light Lref. The difference from the arrangement shown in FIG. 37 is the orientation of the medium 40. In the method for creating a reflection type hologram shown in FIG. 37, the object light Lobj is irradiated onto the upper surface of the medium, and the reference light Lref is irradiated onto the lower surface of the medium. On the other hand, in the method shown in FIG. 38, both of the object light Lobj and the reference light Lref are irradiated onto the lower surface of the medium 40. By thus irradiating reference light and object light from the same side, a transmission type hologram can be recorded. The hologram recording medium 45 created by the method shown in FIG. 38 is substantially the same transmission type hologram as the hologram recording medium 45 created by the method shown in. FIG. 33. Therefore, when carrying out reproduction, the geometric arrangement shown in FIG. 34 is adopted.

Figure 39:
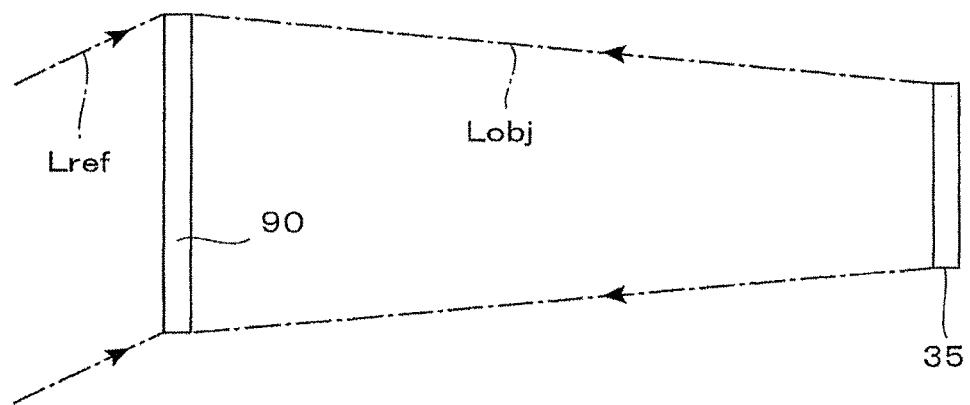
FIG. 39 is a side view showing another preparation process when a hologram recording medium is created by using divergent reference light.

In the recording processes shown in FIG. 37 and FIG. 38, the transmission type hologram created by the method shown in FIG. 35 is used as the preparatory hologram recording medium 95, however, the reflection type hologram created by the method shown in FIG. 39 may also be used as the preparatory hologram recording medium 95. In the method shown in FIG. 39, reference light Lref is irradiated onto the preparatory hologram photosensitive medium 90 from the left side, and object light Lobj is irradiated from the right side, so that the created preparatory hologram recording medium 95 is a reflection type hologram.

Figure 40:
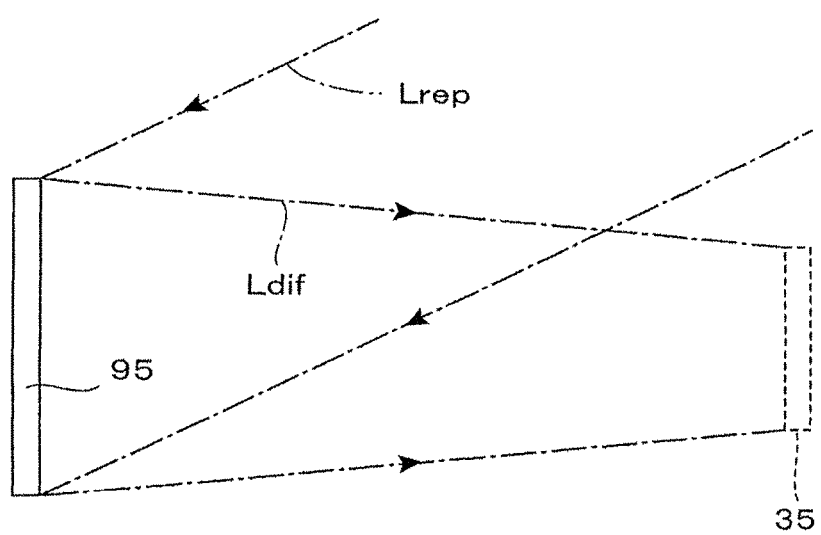
FIG. 40 is a side view showing a reproduction process of the preparatory hologram recording medium 95 created in the preparation process shown in FIG. 39.

When carrying out reproduction by using this reflection type preparatory hologram recording medium 95, as shown in FIG. 40, illumination light for reproduction Lrep is irradiated onto the medium 95 from the right side, and the reproduction image 35 is produced by the obtained reflected diffracted light Ldif. Therefore, in the process shown in FIG. 37 and FIG. 38, the illumination light for reproduction Lrep is irradiated from the right side instead of from the left side.

<5-6> Parallel-Moving Scanning of Light Beam

In the embodiments described above, a method in which the light beam scanning device 60 in the illumination unit 100 bends a light beam at a scanning origin B and scans the bent light beam by changing the bending mode (bending direction and the amount of the bending angle) with time is adopted. However, the scanning method of the light beam scanning device 60 is not limited to the method in which a light beam is bent at the scanning origin B.

For example, a scanning method in which a light beam is moved parallel can also be adopted. However, in this case, the method for recording the scatter body 30 on the hologram recording medium 45 must also be changed. Specifically, as in the example shown in FIG. 41, reference light Lref composed of a parallel light flux is irradiated onto the hologram photosensitive medium 40, and information on interference fringes formed by interference with object light Lobj from the scatter body 30 is recorded. In other words, on the hologram recording medium 46 thus created, the image 35 of the scatter body 30 is recorded as a hologram by using the reference light Lref composed of a parallel light flux.

Figure 41:
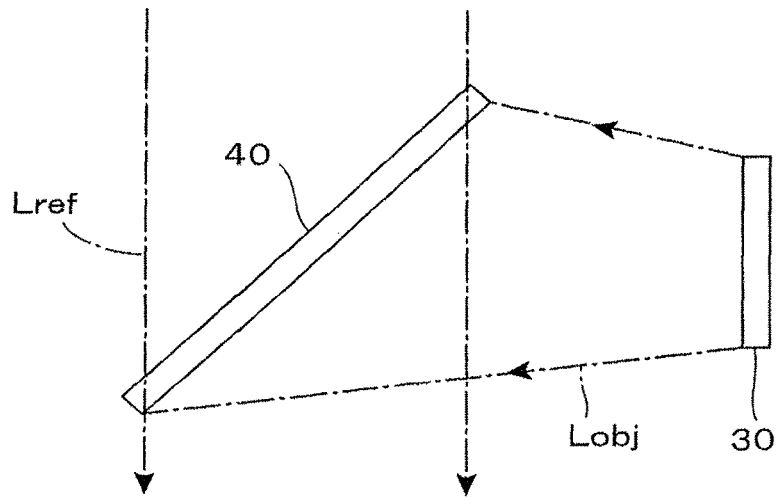
FIG. 41 is an optical system arrangement drawing showing a process of creating a hologram recording medium as a component of a scanner apparatus according to a modification of the present invention.
Figure 42:
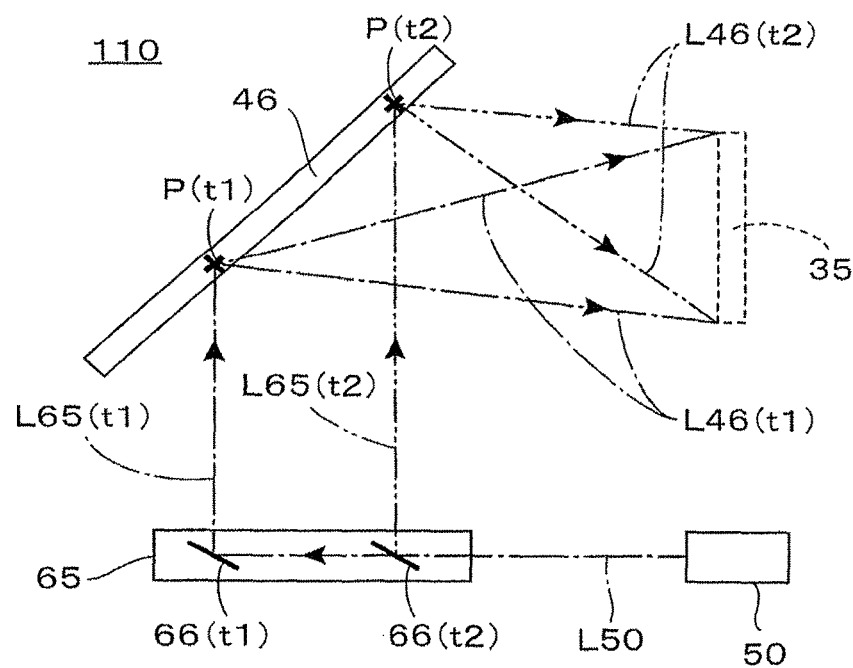
FIG. 42 is a side view showing a basic configuration of an illumination unit 110 used for a scanner apparatus according to the modification of the present invention.

FIG. 42 is a side view of an illumination unit 110 using the hologram recording medium 46 created by the method shown in FIG. 41. As illustrated, this illumination unit 110 includes the hologram recording medium 46, the coherent light source 50, and the light beam scanning device 65.

Here, the hologram recording medium 46 is a medium created by the method shown in FIG. 41, on which the image 35 of the scatter body 30 is recorded as a hologram by utilizing reference light Lref composed of a parallel light flux. The coherent light source 50 is a light source that generates a coherent light beam L50 with the same wavelength (or an approximate wavelength capable of reproducing a hologram) as the wavelength of light (object light Lobj and reference light Lref) used for creating the hologram recording medium 46.

On the other hand, the light beam scanning device 65 has a function of irradiating the light beam L50 generated by the coherent light source 50 onto the hologram recording medium 46, and at this time, carries out scanning so that the light beam L65 is irradiated onto the hologram recording medium 46 from a direction parallel to the reference light Lref used in the creating process shown in FIG. 41. In detail, scanning is carried out so that the light beam L65 is irradiated onto the hologram recording medium 46 while being moved parallel so that the irradiation position of the light beam L65 on the hologram recording medium 46 changes with time.

The light beam scanning device 65 that carries out scanning in this manner can consist of, for example, a movable reflecting mirror 66 and a drive mechanism that drives the movable reflecting mirror 66. Specifically, as shown in FIG. 42, a movable reflecting mirror 66 is disposed at a position at which the movable reflecting mirror can receive the light beam L50 generated by the coherent light source 50, and a drive mechanism that slides the movable reflecting mirror 66 along the optical axis of the light beam L50 is provided. In practical use, the light beam scanning device 65 having a function equivalent to the function described above can consist of a micromirror device utilizing a MEMS. Alternatively, also by making the light beam L60 bent at the position of the scanning origin B by the light beam scanning device 60 shown in FIG. 13 pass through a convex lens having a focal point on the scanning origin B, a light beam that moves parallel can also be produced.

In the example shown in FIG. 42, the hologram recording medium 46 irradiated with the light beam L65 reflected by the movable reflecting mirror 66 generates diffracted light based on recorded interference fringes, and by this diffracted light, the reproduction image 35 of the scatter body 30 is produced. The illumination unit 110 carries out illumination by utilizing the reproduction light thus obtained of the reproduction image 35 as illumination light.

In FIG. 42, for convenience of description, the position of the light beam at the timing t1 is illustrated by an alternate long and short dashed line, and the position of the light beam at the timing t2 is illustrated by an alternate long and two short dashed line. Specifically, at the timing t1, the light beam L50 is reflected at the position of the movable reflecting mirror 66(t1), and irradiated as a light beam L65(t1) onto the point P(t1) of the hologram recording medium 46. On the other hand, at the timing t2, the light beam L50 is reflected at the position of the movable reflecting mirror 66(t2) (the illustrated movable reflecting mirror 66(t2) is the movable reflecting mirror 66(t1) after it moved), and irradiated as a light beam L65(t2) onto the point P(t2) of the hologram recording medium 46.

In the drawing, for convenience, only scanning modes at the two timings t1 and t2 are shown, however, in actuality, in the period from the timing t1 to t2, the light beam L65 moves parallel in the left-right direction in the drawing and the irradiation position of the light beam L65 on the hologram recording medium 46 gradually moves from the point P(t1) to P(t2) in the drawing. Specifically, in the period from the timing t1 to t2, the irradiation position of the light beam L65 is scanned from the point P(t1) to P(t2) on the hologram recording medium 46. Here, an example in which the light beam L65 is moved parallel in a one-dimensional direction (the left-right direction in the drawing) is described, and of course, by providing a mechanism that moves the light beam L65 parallel in a direction perpendicular to the paper surface of the drawing as well (for example, a mechanism including a reflecting mirror disposed on the XY stage), the light beam can be moved parallel in two-dimensional directions.

Here, the light beam L65 is scanned so as to become always parallel to the reference light Lref used in the creating process shown in FIG. 41, so that at each irradiation position on the hologram recording medium 46, the light beam L65 functions as correct illumination light for reproduction Lrep for reproducing a hologram recorded there.

For example, at the timing t1, the reproduction image 35 of the scatter body 30 is produced by diffracted light L46(t1) from the point P(t1), and at the timing t2, the reproduction image 35 of the scatter body 30 is produced by diffracted light L46 (t2) from the point P(t2). Of course, in the period from the timing t1 to t2, by diffracted lights from the respective positions onto which the light beam L65 is irradiated, the reproduction image 35 of the scatter body 30 is also produced in the same manner. Specifically, as long as the light beam L65 is scanned to move parallel, whichever position on the hologram recording medium 46 the light beam L65 is irradiated onto, the same reproduction image 35 is produced at the same position by diffracted light from the irradiation position.

Finally, the illumination unit 110 shown in FIG. 42 has a function to project a linear pattern U with hologram reproduction light in the same manner as in the illumination unit 100 shown in FIG. 13. In conclusion, in the present invention, an image of the scatter body is recorded as a hologram on a hologram recording medium by using reference light irradiated along an optical path, and by the light beam scanning device, a light beam is scanned so that the irradiation direction of the light beam onto the hologram recording medium is along (optically conjugate toward) the optical path of the reference light.

<5-7> Utilization of Microlens Array

In the embodiments that have been described so far, a hologram recording medium on which a hologram image of a scatter body is recorded is prepared, and coherent light is scanned on this hologram recording medium, and obtained diffracted light is utilized as illumination light. Here, a description is given of a modification utilizing a microlens array instead of this hologram recording medium.

Figure 43:
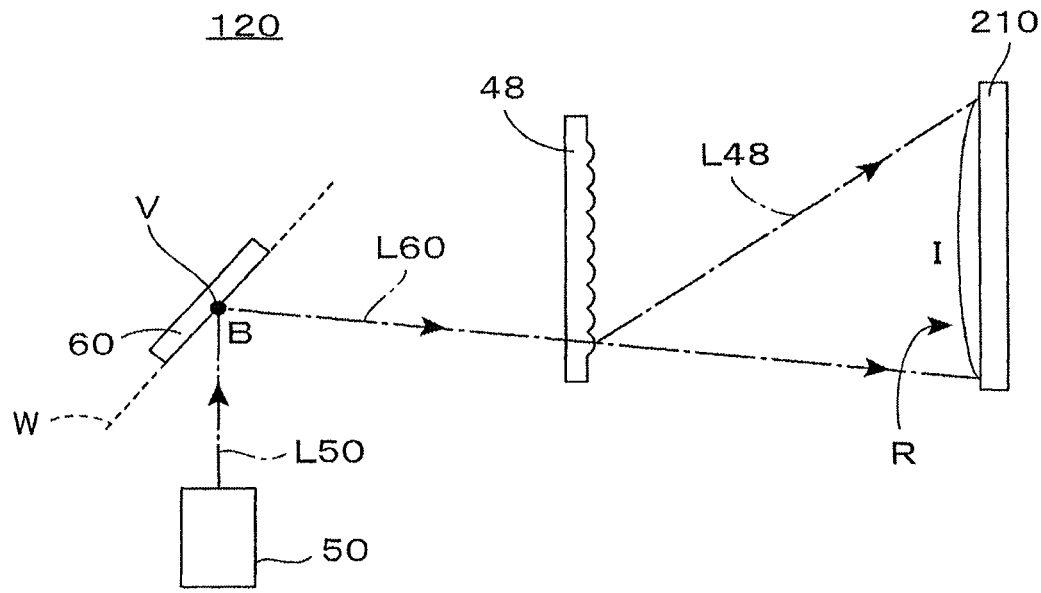
FIG. 43 is a side view showing a basic configuration of an illumination unit 120 used for a scanner apparatus according to another modification of the present invention.

FIG. 43 is a side view of this modification utilizing a microlens array. An illumination unit 120 according to this modification includes a microlens array 48, a coherent light source 50, and a light beam scanning device 60. The coherent light source 50 is a light source that generates a coherent light beam L50 as in the embodiments described above, and in detail, a laser light source can be used.

The light beam scanning device 60 is a device for scanning a light beam L50 generated by a coherent light source 50 as in the embodiments described above. In detail, the light beam scanning device 60 has a function of bending the light beam at a scanning origin B and irradiating the light beam onto the microlens array 48, and carries out scanning so that an irradiation position of the light beam L60 on the microlens array 48 changes with time by changing the bending mode of the light beam L50 with time.

On the other hand, the microlens array 48 is an optical element consisting of a collection of a large number of independent lenses. Each of the independent lenses constituting this microlens array 48 has a function of refracting light incident from the scanning origin B, and forming an irradiation region I on a nearby surface R near the object M (the upper surface (the left surface in the drawing) of the placing stage 210 on which the object M is placed in the case of the illustrated example) disposed at a position.

This irradiation region I is a region in which the line pattern U in the embodiments described above is formed, and in the example described herein, becomes a linear irradiation region vertically long and narrow in the drawing. Specifically, the width in the direction perpendicular to the paper surface of the drawing is the width of the line pattern U to be projected (alternatively, the direction perpendicular to the paper surface of the drawing may be the longitudinal direction of the line pattern U to be projected).

The important point here is that all irradiation regions I formed by the independent lenses become the same common region on the nearby surface R. In other words, all of the lights passing through the independent lenses form the same irradiation region I at the same position on the nearby surface R. As a microlens array having this function, for example, a microlens array called "fly-eye lens" is commercially available.

Figure 44:
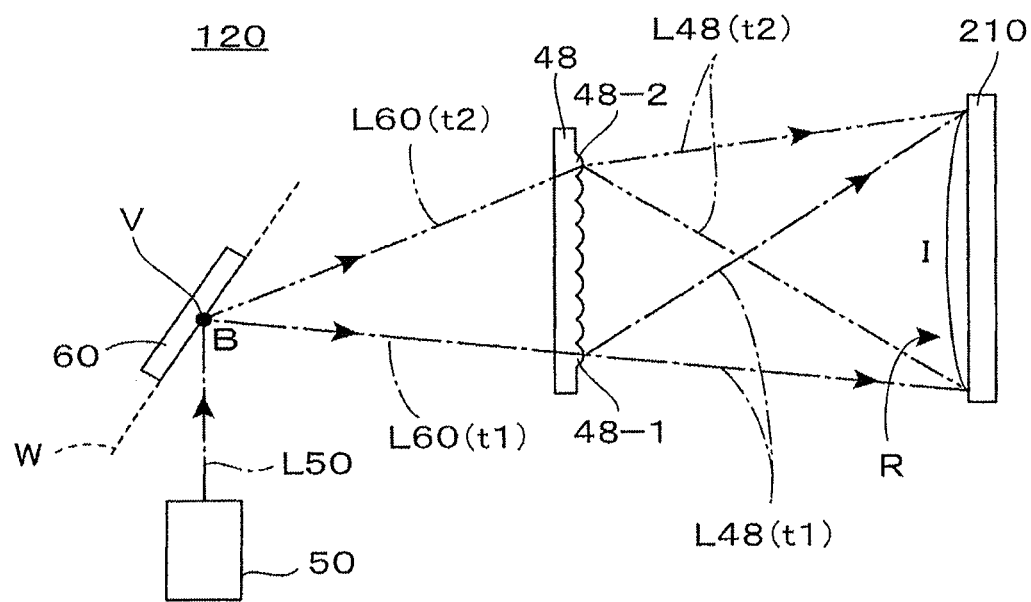
FIG. 44 is a side view showing an operation principle of the illumination unit 120 shown in FIG. 43.

FIG. 44 is a side view showing an operation principle of the illumination unit 100 shown in FIG. 43. Here, for convenience of description, a bending mode at the timing t1 of the light beam L60 is illustrated by an alternate long and short dashed line, and a bending mode at the timing t2 is illustrated by an alternate long and two short dashed line. Specifically, at the timing t1, the light beam L50 is bent at the scanning origin B and incident as a light beam L60(t1) on the independent lens 48-1 positioned below the microlens array 48. Concerning the light beam incident from the scanning origin B, this independent lens 48-1 has a function of diffusing the light beam and irradiating the light beam onto a two-dimensional irradiation region I on the nearby surface R near the object M (in this example, the upper surface of the placing stage 210). Therefore, on the nearby surface R, an irradiation region I vertically long and narrow as illustrated is formed, and this irradiation region I forms a line pattern U.

At the timing t2, the light beam L50 is bent at the scanning origin B, and incident as a light beam L60(t2) on the independent lens 48-2 positioned above the microlens array 48. Concerning the light beam incident from the scanning origin B, this independent lens 48-2 has a function of diffusing the light beam and irradiating the light beam onto a two-dimensional irradiation region I on the nearby surface R. Therefore, at the timing t2, the irradiation region I (line pattern U) is also formed on the nearby surface R as illustrated.

In the drawing, for convenience, only operation states at the two timings of t1 and t2 are illustrated, however, in actuality, the bending, direction of the light beam smoothly changes in the period from the timing t1 to t2, and the irradiation position of the light beam L60 on the microlens array 48 gradually moves from the lower side to the upper side in the drawing. Specifically, in the period from the timing t1 to t2, the irradiation position of the light beam L60 is scanned up and down on the microlens array 48. Of course, when a microlens array 48 including a large number of independent lenses two-dimensionally arranged is used, a light beam is scanned on this two-dimensional arrangement by the light beam scanning device 60.

Due to the properties of the microlens array 48 described above, whichever independent lens the light beam L60 is incident on, the two-dimensional irradiation region I (line pattern U) formed on the nearby surface R is common. Specifically, regardless of the scanning state of the light beam, the same irradiation region I (line pattern U) is constantly formed on the nearby surface R. Therefore, by disposing the object M in this irradiation region I, the line pattern U is always projected onto the surface of the object M. Of course, the line pattern U can be scanned on the object M by providing a pattern scanning mechanism 200 if necessary.

Finally, in the case of the illumination unit 120 shown herein, the light beam scanning device 60 has a function of irradiating the light beam L60 onto the microlens array 48, and scanning the light beam so that an irradiation position of the light beam L60 on the microlens array 48 changes with time. On the other hand, each of the independent lenses constituting the microlens array 48 has a function of refracting light irradiated from the light beam scanning device 60 and forming a linear irradiation region I on a nearby surface R near the object M, and is configured so that all irradiation regions I formed by the independent lenses become substantially the same common region on the nearby surface R. Therefore, this linear irradiation region I can be utilized as a line pattern U in the embodiments described above.

In the case of this illumination unit 120, similar to the illumination unit 100 according to the basic embodiment that has been described so far, an incidence angle of light to be irradiated onto the respective portions of the nearby surface R is multiplexed by time, and the light beam L60 is scanned, so that occurrence of speckles is reduced.

<5-8> Utilization of Optical Diffusing Element

As a basic embodiment, an example in which an illumination unit is configured by using a hologram recording medium on which a hologram image of a scatter body 30 is recorded has been described so far, and in <5-7> above, an example in which an illumination unit is configured by using a microlens array instead of using a hologram recording medium has been described. In these illumination units, ultimately, the hologram recording medium and the microlens array serve as an optical diffusing element having a function of diffusing an incident light beam and forming a linear irradiation region on a surface. In addition, the optical diffusing element has a feature that formed irradiation regions become the same common region on a nearby surface near the object M regardless of the incidence position of the light beam.

Therefore, to configure an illumination unit according to the present invention, the above-described hologram recording medium and microlens array do not necessarily have to be used, and generally, an illumination unit can be configured by using an optical diffusing element having the above-described features.

In conclusion, an illumination unit to be used in an apparatus according to the present invention can be essentially configured by using a coherent light source that generates a coherent light beam, a light beam scanning device that carries out beam scanning by controlling either or both of the direction and position of the light beam, and an optical diffusing element that diffuses and emits the incident light beam.

Hero, the light beam scanning device is only required to have a function of emitting a light beam generated by the coherent light source toward the optical diffusing element, and scanning the light beam so that an incidence position of the light beam on the optical diffusing element changes with time. The optical diffusing element is only required to have a function of diffusing the incident light beam and projecting a linear irradiation region onto a specific nearby surface near an object, and be configured so that formed irradiation regions become substantially the same common region on the nearby surface regardless of the incidence position of the light beam.

INDUSTRIAL APPLICABILITY

A scanner apparatus according to the present invention can be widely utilized for uses in which an object is optically scanned. In the examples described above, this scanner apparatus is utilized in an apparatus for measuring a three-dimensional shape of an object, however, the use of this scanner apparatus is not necessarily limited to use in an apparatus for measuring a three-dimensional shape. For example, the scanner apparatus is also applicable to scanning of information on a two-dimensional object such as a paper surface.

On the other hand, an apparatus for measuring a three-dimensional shape of an object according to the present invention can measure three-dimensional shapes of various objects without contact, so that the apparatus can be widely industrially utilized in the fields of processing and inspecting various objects.

The invention claimed is:

1. A linear illumination device that projects a line pattern of light onto an object, comprising:
   a coherent light source that generates a coherent light beam,
   a hologram recording medium on which an image of a scatter body having a shape corresponding to the line pattern is recorded, and
   a light beam scanning device that irradiates the light beam onto the hologram recording medium and scans the light beam so that an irradiation position of the light beam on the hologram recording medium changes with time, wherein
   the image of the scatter body is recorded as a hologram on the hologram recording medium as a form of interference fringes which reproduce the image of the scatter body when the light beam is given as illumination light advancing toward the respective irradiation points on the hologram recording medium along respective particular optical paths,
   wherein the image of the scatter body recorded on the hologram recording medium is reproduced as a reproduction image when the light beam irradiates from a single irradiation position on the hologram recording medium,
   wherein multiple reproduction images of the scatter body are produced as the light beam moves between irradiation positions on the hologram recording medium, wherein the multiple reproduction images are identical to each other and produced at a same position irrespective of the actual irradiation position used to create the reproduction image,
   the coherent light source generates a light beam with a wavelength capable of reproducing the reproduction image of the scatter body,
   the light beam scanning device scans the light beam so that an irradiation direction of the light beam onto the hologram recording medium is along one of said particular optical paths, and
   the line pattern is projected by reproduction light of the hologram obtained from the hologram recording medium.

2. The linear illumination device according to claim 1, wherein
   an image of one or a plurality of linear scatter bodies parallel to each other is recorded on the hologram recording medium, and a line pattern including one or a plurality of lines parallel to each other is projected by reproduction light of a hologram.

3. The linear illumination device according to claim 1, wherein
   the hologram recording medium is divided into a plurality of divided regions, and an image of one or a plurality of linear scatter bodies is recorded in each of the divided regions, line patterns each including one or a plurality of lines are projected by reproduction lights of holograms obtained from the respective divided regions, and a line pattern projected by reproduction light of a hologram obtained from one divided region and a line pattern projected by reproduction light of a hologram obtained from another divided region are formed at spatially different positions.

4. The linear illumination device according to claim 3, wherein
   the light beam scanning device scans a light beam on the divided regions in an order of a first divided region, a second divided region, a third divided region, . . . , so that an i-th line pattern, wherein i=1, 2, 3 . . . , is projected on an i-th position in space when scanning an i-th divided region and the light beam scanning device has a function of changing a projecting position of the line pattern onto the object with time.

5. The linear illumination device according to claim 3, wherein
the hologram recording medium is divided so that a plurality of horizontally long and narrow divided regions are arranged vertically, and hologram recording is carried out so that longitudinal directions of the respective divided regions and longitudinal directions of reproduction images obtained from the respective divided regions become parallel to each other.

6. The linear illumination device according to claim 1, wherein
the light beam scanning device bends the light beam at a scanning origin, irradiates the bent light beam onto the hologram recording medium, and changes an irradiation position of the bent light beam on the hologram recording medium with time by changing a bending mode of the light beam with time,
the image of the scatter body is recorded as a hologram on the hologram recording medium by using reference light that converges on a specific convergence point or reference light that diverges from a specific convergence point, and
the light beam scanning device scans the light beam by setting the convergence point as the scanning origin.

7. The linear illumination device according to claim 6, wherein
the image of the scatter body is recorded on the hologram recording medium by using reference light that three-dimensionally converges or diverges along a side surface of a cone whose tip is on the convergence point.

8. The linear illumination device according to claim 6, wherein
the image of the scatter body is recorded on the hologram recording medium by using reference light that two-dimensionally converges or diverges along a plane including the convergence point.

9. The linear illumination device according to claim 1, wherein
the light beam scanning device changes the irradiation position of the light beam on the hologram recording medium with time by irradiating the light beam onto the hologram recording medium while moving the light beam parallel,
the image of the scatter body is recorded as a hologram on the hologram recording medium by using reference light composed of a parallel light flux, and
the light beam scanning device scans the light beam by irradiating the light beam onto the hologram recording medium in a direction parallel to the reference light.

10. The linear illumination device according to claim 4, wherein
the hologram recording medium is divided so that a plurality of horizontally long and narrow divided regions are arranged vertically, and hologram recording is carried out so that longitudinal directions of the respective divided regions and longitudinal directions of reproduction images obtained from the respective divided regions become parallel to each other.

* * * * *